United States Patent
Baseotto et al.

(10) Patent No.: US 10,786,772 B2
(45) Date of Patent: *Sep. 29, 2020

(54) AIR CLEANER ARRANGEMENTS; COMPONENTS; AND, METHODS

(71) Applicant: Donaldson Company, Inc., Minneapolis, MN (US)

(72) Inventors: Michel Baseotto, Hasselt (BE); Roberto Merckx, Vilboorde (BE); Julien Dils, Linter (BE); Paul Coulonvaux, Ramillies (BE)

(73) Assignee: Donaldson Company, Inc., Minneapolis, MN (US)

( * ) Notice: Subject to any disclaimer, the term of this patent is extended or adjusted under 35 U.S.C. 154(b) by 39 days.

This patent is subject to a terminal disclaimer.

(21) Appl. No.: 16/186,770

(22) Filed: Nov. 12, 2018

(65) Prior Publication Data

US 2019/0076772 A1 Mar. 14, 2019

Related U.S. Application Data

(63) Continuation of application No. 14/996,491, filed on Jan. 15, 2016, now Pat. No. 10,124,285, which is a
(Continued)

(51) Int. Cl.
*B01D 46/24* (2006.01)
*B01D 46/00* (2006.01)

(52) U.S. Cl.
CPC ..... *B01D 46/2414* (2013.01); *B01D 46/0002* (2013.01); *B01D 46/0004* (2013.01); *B01D 46/0005* (2013.01); *B01D 46/009* (2013.01); *B01D 46/0012* (2013.01); *B01D 46/0023* (2013.01); *B01D 46/2411* (2013.01); *B01D 2265/021* (2013.01); *B01D 2265/026* (2013.01);
(Continued)

(58) Field of Classification Search
CPC ............ B01D 46/2414; B01D 46/0002; B01D 46/0004; B01D 46/0005; B01D 2265/021; B01D 2265/026; B01D 2271/027
See application file for complete search history.

(56) References Cited

U.S. PATENT DOCUMENTS

| 2,771,156 A | 11/1956 | Kasten et al. |
| 2,887,177 A | 2/1958 | Mund et al. |

(Continued)

FOREIGN PATENT DOCUMENTS

| BE | 1011567 A3 | 11/1989 |
| DE | 2947655 | 6/1980 |

(Continued)

OTHER PUBLICATIONS

International Search Report and Written Opinion dated Nov. 3, 2008.
(Continued)

*Primary Examiner* — Robert Clemente
(74) *Attorney, Agent, or Firm* — Merchant & Gould P.C.

(57) ABSTRACT

An air cleaner assembly and components therefor are provided. Features are described providing for installation of a preferred filter cartridge in a housing. A filter cartridge arrangement is described and shown. Methods of assembly and use are also described.

20 Claims, 33 Drawing Sheets

Related U.S. Application Data continuation of application No. 13/936,525, filed on Jul. 8, 2013, now Pat. No. 9,238,189, which is a continuation of application No. 13/305,230, filed on Nov. 28, 2011, now Pat. No. 8,480,778, which is a continuation of application No. 12/218,822, filed on Jul. 16, 2008, now Pat. No. 8,066,791.

(60) Provisional application No. 60/961,521, filed on Jul. 20, 2007, provisional application No. 61/126,222, filed on Apr. 30, 2008.

(52) U.S. Cl.
CPC .... *B01D 2265/028* (2013.01); *B01D 2267/40* (2013.01); *B01D 2271/027* (2013.01); *B01D 2279/60* (2013.01)

(56) References Cited

U.S. PATENT DOCUMENTS

| | | |
|---|---|---|
| 2,945,559 A | 3/1959 | Buckman |
| 3,002,870 A | 10/1961 | Belgarde et al. |
| 3,019,854 A | 2/1962 | O'Bryant |
| 3,025,963 A | 3/1962 | Bauer |
| 3,048,959 A | 8/1962 | Lowther |
| 3,078,650 A | 2/1963 | Anderson et al. |
| 3,160,488 A | 12/1964 | Wilber |
| 3,169,844 A | 2/1965 | Young |
| 3,209,917 A | 10/1965 | Yelinek |
| 3,290,870 A | 12/1966 | Jensen |
| 3,342,021 A | 9/1967 | Yelinek et al. |
| 3,342,335 A | 9/1967 | Gamundi et al. |
| 3,354,012 A | 11/1967 | Forman et al. |
| 3,357,163 A | 12/1967 | Burger et al. |
| 3,413,780 A | 12/1968 | Amlott et al. |
| 3,423,909 A | 1/1969 | Bennett et al. |
| 3,452,519 A | 7/1969 | Bianchetta |
| 3,488,928 A | 1/1970 | Tarala |
| 3,584,439 A | 6/1971 | Gronholz |
| 3,616,618 A | 11/1971 | Gronholz et al. |
| 3,672,130 A | 6/1972 | Sullivan et al. |
| 3,676,242 A | 7/1972 | Prentice |
| 3,695,437 A | 10/1972 | Shaltis |
| 3,710,560 A | 1/1973 | Maddocks |
| 3,716,436 A | 2/1973 | Pall et al. |
| 3,807,150 A | 4/1974 | Maracle |
| 3,841,953 A | 10/1974 | Lohkamp et al. |
| 3,878,014 A | 4/1975 | Melead |
| 4,006,000 A | 2/1977 | Tortorici et al. |
| 4,036,616 A | 7/1977 | Bryns |
| 4,062,781 A | 12/1977 | Strauss et al. |
| 4,128,251 A | 12/1978 | Gaither et al. |
| 4,135,899 A | 1/1979 | Gauer |
| 4,158,449 A | 6/1979 | Sun et al. |
| 4,159,197 A | 6/1979 | Schuler et al. |
| 4,162,906 A | 7/1979 | Sullivan et al. |
| 4,211,543 A | 7/1980 | Tokar et al. |
| 4,222,755 A | 9/1980 | Grotto |
| 4,227,898 A | 10/1980 | Kamekawa et al. |
| 4,235,611 A | 11/1980 | Brownell |
| 4,278,455 A | 7/1981 | Nardi |
| 4,303,426 A | 12/1981 | Battis |
| 4,312,651 A | 1/1982 | Esaki et al. |
| 4,349,363 A | 9/1982 | Patel et al. |
| 4,350,509 A | 9/1982 | Alseth et al. |
| 4,364,751 A | 12/1982 | Copley |
| 4,402,830 A | 9/1983 | Pall |
| 4,410,427 A | 10/1983 | Wydeven |
| 4,452,616 A | 6/1984 | Gillingham et al. |
| 4,488,889 A | 12/1984 | McCarroll |
| 4,491,460 A | 1/1985 | Tokar |
| 4,498,915 A | 2/1985 | Witchell |
| 4,537,608 A | 8/1985 | Koslow |
| 4,588,426 A | 5/1986 | Virgille et al. |
| 4,589,983 A | 5/1986 | Wydevan |
| 4,600,420 A | 7/1986 | Wydeven et al. |
| 4,609,465 A | 9/1986 | Miller |
| 4,720,292 A | 1/1988 | Engel et al. |
| 4,728,423 A | 3/1988 | Kuwajima |
| 4,764,191 A | 8/1988 | Morelli |
| 4,801,383 A | 1/1989 | Hoffmann et al. |
| 4,818,261 A | 4/1989 | Beckon |
| 4,838,901 A | 6/1989 | Schmidt et al. |
| 4,925,469 A | 5/1990 | Clement et al. |
| 4,925,561 A | 5/1990 | Ishii et al. |
| 4,950,317 A | 8/1990 | Dottermans |
| 4,963,170 A | 10/1990 | Weber et al. |
| 5,030,264 A | 7/1991 | Klotz et al. |
| 5,045,192 A | 9/1991 | Terhune |
| 5,049,326 A | 9/1991 | Matsumoto et al. |
| 5,064,458 A | 11/1991 | Machado |
| 5,071,456 A | 12/1991 | Binder et al. |
| 5,082,476 A | 1/1992 | Kahlbaugh et al. |
| 5,112,417 A | 5/1992 | Sayles |
| 5,116,499 A | 5/1992 | Deibel |
| 5,118,417 A | 6/1992 | Deibel |
| 5,120,337 A | 6/1992 | Benzler et al. |
| 5,125,941 A | 6/1992 | Ernst et al. |
| 5,137,557 A | 8/1992 | Behrendt et al. |
| 5,160,519 A | 11/1992 | Svensson et al. |
| 5,167,683 A | 12/1992 | Behrendt et al. |
| 5,211,846 A | 5/1993 | Kott et al. |
| 5,213,596 A | 5/1993 | Kume et al. |
| 5,222,488 A | 6/1993 | Forsgren |
| 5,238,476 A | 8/1993 | Svensson et al. |
| 5,250,179 A | 10/1993 | Spearman |
| 5,277,157 A | 1/1994 | Teich |
| 5,290,445 A | 3/1994 | Buttery |
| 5,350,515 A | 9/1994 | Stark et al. |
| 5,401,285 A | 3/1995 | Gillingham et al. |
| 5,415,677 A | 5/1995 | Ager et al. |
| 5,431,168 A | 7/1995 | Webster, Jr. |
| 5,435,870 A | 7/1995 | Takagaki et al. |
| 5,442,721 A | 8/1995 | Kalada et al. |
| 5,484,466 A | 1/1996 | Brown et al. |
| 5,487,767 A | 1/1996 | Brown |
| 5,494,497 A | 2/1996 | Lee |
| 5,543,007 A | 8/1996 | Takagaki et al. |
| 5,545,241 A | 8/1996 | Vanderauwera et al. |
| 5,547,480 A | 8/1996 | Coulonvaux |
| 5,556,440 A | 9/1996 | Mullins et al. |
| 5,562,825 A | 10/1996 | Yamada et al. |
| 5,575,826 A | 11/1996 | Gillingham et al. |
| 5,601,717 A | 2/1997 | Villette et al. |
| 5,605,555 A | 2/1997 | Patel et al. |
| 5,605,625 A | 2/1997 | Mills |
| 5,611,922 A | 3/1997 | Stene |
| 5,613,992 A | 3/1997 | Engel |
| 5,632,791 A | 5/1997 | Oussoren et al. |
| 5,645,718 A | 7/1997 | Hardison et al. |
| 5,683,479 A | 11/1997 | Gillingham et al. |
| 5,683,660 A | 11/1997 | Wirth et al. |
| 5,685,985 A | 11/1997 | Brown et al. |
| 5,690,712 A | 11/1997 | Engel |
| 5,700,304 A | 12/1997 | Foo |
| 5,720,788 A | 2/1998 | Puckett et al. |
| 5,720,790 A | 2/1998 | Kometani et al. |
| 5,730,768 A | 3/1998 | Kaminaga et al. |
| 5,730,769 A | 3/1998 | Dungs et al. |
| 5,736,040 A | 4/1998 | Duerrstein et al. |
| 5,740,774 A | 4/1998 | Kennedy |
| 5,741,421 A | 4/1998 | Erdmannsdoerfer et al. |
| 5,753,117 A | 5/1998 | Jiang |
| 5,755,842 A | 5/1998 | Patel et al. |
| 5,755,844 A | 5/1998 | Arai et al. |
| 5,772,883 A | 6/1998 | Rothman et al. |
| D398,098 S | 7/1998 | Gillingham et al. |
| 5,792,247 A | 8/1998 | Gillingham et al. |
| D398,046 S | 9/1998 | Gillingham et al. |
| 5,800,581 A | 9/1998 | Gielink et al. |
| D399,944 S | 10/1998 | Gillingham et al. |
| 5,820,646 A | 10/1998 | Gillingham et al. |
| D401,306 S | 11/1998 | Ward |

(56) References Cited

U.S. PATENT DOCUMENTS

| | | |
|---|---|---|
| 5,853,439 A | 12/1998 | Gieseke et al. |
| 5,863,313 A | 1/1999 | Coulonvaux |
| 5,865,863 A | 2/1999 | DeSousa et al. |
| 5,882,367 A | 3/1999 | Morgan et al. |
| 5,893,937 A | 4/1999 | Moessinger |
| 5,895,574 A | 4/1999 | Friedmann et al. |
| 5,897,676 A | 4/1999 | Engel et al. |
| 5,902,364 A | 5/1999 | Tokar et al. |
| 5,916,435 A | 6/1999 | Spearman et al. |
| 5,919,279 A | 7/1999 | Merritt et al. |
| 5,921,982 A | 7/1999 | Lesh et al. |
| 5,938,804 A | 8/1999 | Engel et al. |
| D414,544 S | 9/1999 | Ward et al. |
| 5,951,729 A | 9/1999 | Ernst et al. |
| 5,972,063 A | 10/1999 | Dudrey et al. |
| D416,308 S | 11/1999 | Ward et al. |
| D417,268 S | 11/1999 | Gillingham |
| 5,984,109 A | 11/1999 | Kalmar et al. |
| 6,004,366 A | 12/1999 | Engel et al. |
| 6,039,778 A | 3/2000 | Coulonvaux |
| 6,048,386 A | 4/2000 | Gillingham et al. |
| 6,051,042 A | 4/2000 | Coulonvaux |
| D425,189 S | 5/2000 | Gillingham et al. |
| D428,128 S | 7/2000 | Gillingham et al. |
| 6,090,177 A | 7/2000 | Moessinger et al. |
| 6,096,208 A | 8/2000 | Connelly et al. |
| 6,099,606 A | 8/2000 | Miller et al. |
| 6,149,700 A | 11/2000 | Morgan et al. |
| 6,152,979 A | 11/2000 | Cappuyns |
| 6,171,275 B1 | 1/2001 | Webster, Jr. |
| 6,179,890 B1 | 1/2001 | Ramos et al. |
| D437,401 S | 2/2001 | Ramos et al. |
| 6,190,432 B1 | 2/2001 | Gieseke et al. |
| 6,210,469 B1 | 4/2001 | Tokar |
| 6,221,122 B1 | 4/2001 | Gieseke et al. |
| 6,231,630 B1 | 5/2001 | Ernst et al. |
| 6,235,195 B1 | 5/2001 | Tokar |
| 6,258,145 B1 | 7/2001 | Engel et al. |
| 6,261,334 B1 | 7/2001 | Morgan et al. |
| 6,290,739 B1 | 9/2001 | Gieseke et al. |
| 6,299,661 B1 | 10/2001 | Bloomer |
| 6,322,602 B2 | 11/2001 | Engel et al. |
| 6,348,084 B1 | 2/2002 | Tokar et al. |
| 6,348,085 B1 | 2/2002 | Tokar et al. |
| 6,350,291 B1 | 2/2002 | Gieseke et al. |
| 6,350,296 B1 | 2/2002 | Warner |
| 6,413,289 B2 | 2/2002 | Engel et al. |
| 6,368,374 B1 | 4/2002 | Tokar et al. |
| 6,383,244 B1 | 5/2002 | Wake et al. |
| 6,387,162 B1 | 5/2002 | Kosmider et al. |
| 6,398,832 B2 | 6/2002 | Morgan et al. |
| 6,402,798 B1 | 6/2002 | Kallsen et al. |
| 6,416,561 B1 | 7/2002 | Kallsen et al. |
| 6,419,718 B1 | 7/2002 | Klug et al. |
| 6,436,162 B1 | 8/2002 | Wake et al. |
| 6,447,567 B1 | 9/2002 | Ehrenberg |
| 6,485,535 B1 | 11/2002 | Linnersten et al. |
| D467,654 S | 12/2002 | Klug et al. |
| 6,517,598 B2 | 2/2003 | Anderson et al. |
| 6,521,009 B2 | 2/2003 | Engel et al. |
| D471,623 S | 3/2003 | Gieseke et al. |
| 6,547,857 B2 | 4/2003 | Gieseke et al. |
| D475,129 S | 5/2003 | Ward et al. |
| 6,558,453 B2 | 5/2003 | Sepke et al. |
| 6,572,667 B1 | 6/2003 | Greif et al. |
| D477,659 S | 7/2003 | Gieseke et al. |
| 6,585,792 B2 | 7/2003 | Schneider et al. |
| 6,585,838 B1 | 7/2003 | Mullins et al. |
| 6,598,580 B2 | 7/2003 | Baumann et al. |
| 6,599,342 B2 | 7/2003 | Andress et al. |
| 6,599,344 B2 | 7/2003 | Tokar et al. |
| 6,610,117 B2 | 8/2003 | Gieseke et al. |
| 6,610,126 B2 | 8/2003 | Xu et al. |
| D481,101 S | 10/2003 | Boehrs |
| 6,652,614 B2 | 11/2003 | Gieseke et al. |
| D483,459 S | 12/2003 | DeWit et al. |
| D485,339 S | 1/2004 | Klug et al. |
| 6,673,136 B2 | 1/2004 | Gilingham et al. |
| 6,676,721 B1 | 1/2004 | Gillingham et al. |
| 6,726,735 B1 | 4/2004 | Oussoren et al. |
| 6,736,874 B2 | 5/2004 | Rieger et al. |
| 6,743,317 B2 | 6/2004 | Wydeven |
| 6,746,518 B2 | 6/2004 | Gieseke et al. |
| 6,837,920 B2 | 1/2005 | Gieseke et al. |
| 6,872,237 B2 | 3/2005 | Gillingham et al. |
| 6,878,190 B1 | 4/2005 | Xu et al. |
| 6,908,494 B2 | 6/2005 | Gillingham et al. |
| 6,936,084 B2 | 8/2005 | Schlensker et al. |
| 6,966,940 B2 | 11/2005 | Krisko et al. |
| D513,314 S | 12/2005 | Iddings et al. |
| 6,986,805 B2 | 1/2006 | Gieseke et al. |
| 7,001,450 B2 | 2/2006 | Gieseke et al. |
| 7,004,986 B2 | 2/2006 | Kopec et al. |
| 7,070,642 B2 | 7/2006 | Scott et al. |
| 7,115,156 B2 | 10/2006 | Schaerlund et al. |
| 7,211,124 B2 | 5/2007 | Gieseke et al. |
| 7,252,704 B2 | 8/2007 | Tokar et al. |
| 7,291,198 B2 | 11/2007 | Gieseke et al. |
| 7,329,326 B2 | 2/2008 | Wagner et al. |
| 7,332,009 B2 | 2/2008 | Casey et al. |
| 7,351,270 B2 | 4/2008 | Engelland et al. |
| 7,413,588 B2 | 8/2008 | Holzmann et al. |
| 7,520,913 B2 | 4/2009 | Mills et al. |
| 7,524,349 B2 | 4/2009 | Schrage et al. |
| 7,537,631 B2 | 5/2009 | Scott et al. |
| 7,572,310 B2 | 8/2009 | Gieseke |
| 7,641,708 B2 | 1/2010 | Kosmider et al. |
| 7,655,074 B2 | 2/2010 | Nepsund et al. |
| 7,662,203 B2 | 2/2010 | Scott et al. |
| 7,682,416 B2 | 3/2010 | Engelland et al. |
| 7,713,321 B2 | 5/2010 | Kuempel et al. |
| 7,736,410 B2 | 6/2010 | Kuempel et al. |
| RE41,713 E | 9/2010 | Gunderson et al. |
| RE42,174 E | 3/2011 | Gunderson et al. |
| 7,972,404 B2 | 7/2011 | Kuempel et al. |
| 7,981,183 B2 | 7/2011 | Nepsund et al. |
| 7,981,186 B2 | 7/2011 | Schrage et al. |
| 7,988,757 B2 | 8/2011 | Scott et al. |
| 7,993,422 B2 | 8/2011 | Krisko et al. |
| 8,012,233 B2 | 9/2011 | Kuempel et al. |
| 8,034,145 B2 | 10/2011 | Boehrs et al. |
| 8,038,756 B2 | 10/2011 | Iddings et al. |
| 8,066,791 B2 | 11/2011 | Baseotto et al. |
| 8,128,724 B2 | 3/2012 | Mills et al. |
| 8,142,533 B2 | 3/2012 | Gillenberg et al. |
| 8,147,576 B2 | 4/2012 | Gillenberg et al. |
| 8,147,582 B2 | 4/2012 | Engelland et al. |
| 8,152,876 B2 | 4/2012 | Gillenberg et al. |
| 8,163,056 B2 | 4/2012 | Coulonvaux et al. |
| 8,182,569 B2 | 5/2012 | Casey et al. |
| 8,216,334 B2 | 7/2012 | Nelson et al. |
| 8,216,335 B2 | 7/2012 | Scott et al. |
| 8,241,384 B2 | 8/2012 | Schrage et al. |
| 8,273,143 B2 | 9/2012 | Coulonvaux et al. |
| 8,277,532 B2 | 10/2012 | Reichter et al. |
| 8,292,983 B2 | 10/2012 | Reichter et al. |
| 8,292,984 B2 | 10/2012 | Baseotto et al. |
| 8,382,875 B2 | 2/2013 | Engelland et al. |
| 8,382,876 B2 | 2/2013 | Widerski et al. |
| 8,394,166 B2 | 3/2013 | Scott et al. |
| 8,409,316 B2 | 4/2013 | Nelson et al. |
| 8,414,675 B2 | 4/2013 | Iddings et al. |
| 8,460,425 B2 | 6/2013 | Scott et al. |
| 8,480,778 B2 | 7/2013 | Baseotto et al. |
| 8,518,141 B2 | 8/2013 | Schrage et al. |
| 8,545,588 B2 | 10/2013 | Iddings et al. |
| 8,562,707 B2 | 10/2013 | Nepsund et al. |
| 8,574,333 B2 | 11/2013 | Nelson |
| 8,636,820 B2 | 1/2014 | Reichter et al. |
| 8,641,795 B2 | 2/2014 | Coulonvaux et al. |
| 8,702,831 B2 | 4/2014 | Scott et al. |
| 8,747,512 B2 | 6/2014 | Mills et al. |
| 8,784,523 B2 | 7/2014 | Coulonvaux et al. |
| 8,814,973 B2 | 8/2014 | Baseotto |

(56) References Cited

U.S. PATENT DOCUMENTS

| | | | |
|---|---|---|---|
| 8,852,309 | B2 | 10/2014 | Scott et al. |
| 8,864,866 | B2 | 10/2014 | Sendoff et al. |
| 8,916,044 | B2 | 12/2014 | Rapin |
| 9,039,802 | B2 | 5/2015 | Scott et al. |
| 9,221,004 | B2 | 12/2015 | Iddings et al. |
| 9,238,189 | B2 | 1/2016 | Baseotto et al. |
| 9,353,657 | B2 | 5/2016 | Scott et al. |
| 9,586,166 | B2 | 3/2017 | Coulonvaux et al. |
| 9,636,615 | B2 | 5/2017 | Osendorf et al. |
| 9,718,019 | B2 | 8/2017 | Baseotto et al. |
| 10,029,199 | B2 | 7/2018 | Scott et al. |
| 10,124,285 | B2 * | 11/2018 | Baseotto ............ B01D 46/0004 |
| 10,245,544 | B2 * | 4/2019 | Iddings .............. B01D 46/0005 |
| 10,307,704 | B2 | 6/2019 | Scott et al. |
| 2002/0014058 | A1 | 2/2002 | Engel et al. |
| 2002/0040569 | A1 | 4/2002 | Reinhold |
| 2002/0112458 | A1 | 8/2002 | Schneider et al. |
| 2002/0184864 | A1 | 12/2002 | Bishop et al. |
| 2003/0051455 | A1 | 3/2003 | Gieseke et al. |
| 2003/0146149 | A1 | 8/2003 | Binder et al. |
| 2004/0020177 | A1 | 2/2004 | Ota et al. |
| 2004/0134171 | A1 | 7/2004 | Scott et al. |
| 2004/0261383 | A1 | 12/2004 | Schaerlund et al. |
| 2006/0086075 | A1 | 4/2006 | Scott et al. |
| 2008/0190082 | A1 | 8/2008 | Scott et al. |
| 2008/0257161 | A1 | 10/2008 | Read |
| 2008/0307759 | A1 | 12/2008 | Reichter et al. |
| 2009/0094951 | A1 | 4/2009 | Baseotto et al. |
| 2009/0100813 | A1 | 4/2009 | Baseotto et al. |
| 2009/0217632 | A1 | 9/2009 | Coulonvaux et al. |
| 2010/0146917 | A1 | 6/2010 | Coulonvaux et al. |
| 2010/0146919 | A1 | 6/2010 | Nelson et al. |
| 2010/0146920 | A1 | 6/2010 | Iddings et al. |
| 2011/0017657 | A1 | 1/2011 | Jokschas et al. |
| 2011/0094197 | A1 | 4/2011 | Ruhland et al. |
| 2011/0173937 | A1 | 7/2011 | Nelson |
| 2011/0308212 | A1 | 12/2011 | Ruhland et al. |
| 2014/0059986 | A1 | 3/2014 | Kaufmann et al. |
| 2014/0102058 | A1 | 4/2014 | Kaufmann et al. |

FOREIGN PATENT DOCUMENTS

| | | |
|---|---|---|
| DE | 195 19 438 | 11/1996 |
| DE | 198 49 089 A1 | 4/2000 |
| DE | 100 20 538 | 10/2001 |
| EP | 0 230 991 A2 | 8/1987 |
| EP | 0 480 991 B1 | 4/1992 |
| EP | 0 562 502 | 9/1993 |
| EP | 1 023 933 | 8/2000 |
| EP | 1 123 460 B1 | 8/2003 |
| EP | 1 174 171 B1 | 8/2004 |
| EP | 1 357 997 B1 | 9/2006 |
| EP | 1 754 525 | 2/2007 |
| FR | 1 569 913 | 6/1969 |
| FR | 2 665 217 | 1/1992 |
| GB | 1 125 335 | 4/1919 |
| GB | 1 124 735 | 8/1968 |
| GB | 1 499 922 | 2/1978 |
| GB | 1 511 904 | 5/1978 |
| GB | 2 110 110 | 6/1983 |
| GB | 2 119 674 | 11/1983 |
| GB | 2 163 368 | 2/1986 |
| JP | H08252417 | 10/1996 |
| JP | 2004/0136203 | 5/2004 |
| WO | WO 89/01818 | 3/1989 |
| WO | WO 98/11977 | 3/1998 |
| WO | WO 99/42719 | 8/1999 |
| WO | WO 2000/ 23166 | 4/2000 |
| WO | WO 2001/091884 | 12/2001 |
| WO | WO 2002/45819 | 6/2002 |
| WO | WO 2002/078816 A1 | 10/2002 |
| WO | WO 2004/039476 | 5/2004 |
| WO | WO 2005/092475 | 10/2005 |
| WO | WO 2006/026241 | 3/2006 |
| WO | WO 2006/119414 | 11/2006 |
| WO | WO 2007/009040 A1 | 1/2007 |
| WO | WO 2009/014982 | 1/2009 |
| WO | WO 2009/014986 | 1/2009 |
| WO | WO 2008/124437 | 2/2009 |
| WO | WO 2010/091917 | 8/2010 |

OTHER PUBLICATIONS

European Search Report for Application No. 12179532.2 dated Feb. 14, 2013.
European Search Report for Application No. 12179536.3 dated Feb. 14, 2013.
Declaration with Exhibits of Daniel E. Adamek dated Sep. 7, 2016.
Exhibit A, Pending claims of U.S. Appl. No. 15/663,997 dated Nov. 12, 2018.
Exhibit B, Pending claims of U.S. Appl. No. 14/977,930 dated Nov. 12, 2018.
Exhibit C, Pending claims of U.S. Appl. No. 16/041,984 dated Nov. 12, 2018.
Exhibit D, Pending claims of U.S. Appl. No. 14/717,251 dated Nov. 12, 2018.
Exhibit E, Pending claims of U.S. Appl. No. 15/450,625 dated Nov. 12, 2018.
Exhibit X, Pending Claims of U.S. Appl. No. 14/996,491 dated Nov. 12, 2018.
Exhibit A, Pending claims of U.S. Appl. No. 15/663,997 dated May 14, 2020.
Exhibit B, Pending claims of U.S. Appl. No. 16/291,164 dated May 14, 2020.
Exhibit C, Pending claims of U.S. Appl. No. 16/041,984 dated May 14, 2020.
Exhibit E, Pending claims of U.S. Appl. No. 15/450,625 dated May 14, 2020.

* cited by examiner

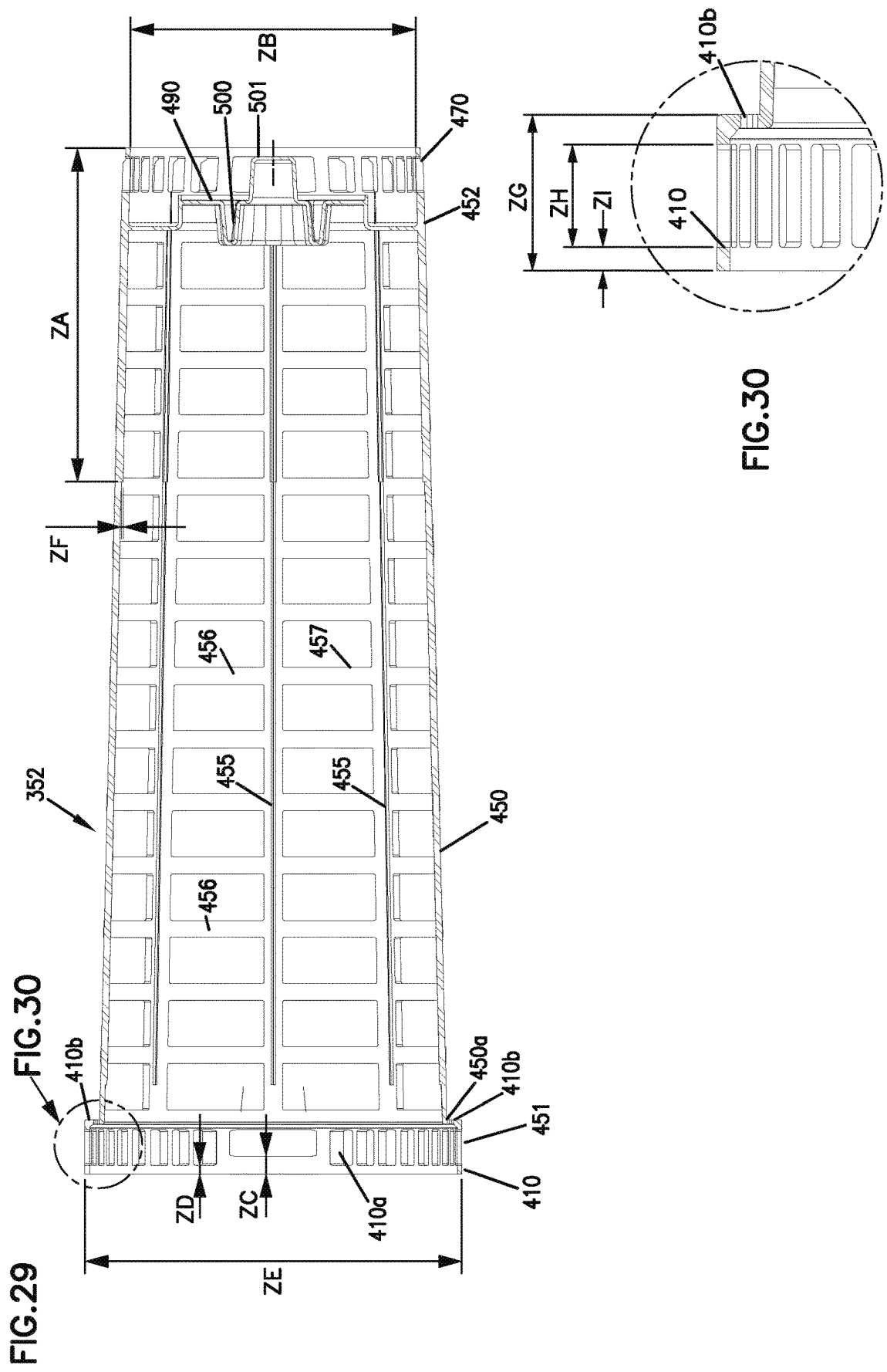

AIR CLEANER ARRANGEMENTS; COMPONENTS; AND, METHODS

CROSS-REFERENCE TO RELATED APPLICATION

The present application is a continuing application of U.S. Ser. No. 14/996,491, filed Jan. 15, 2016. U.S. Ser. No. 14/996,491 is a continuation of U.S. Ser. No. 13/936,525, filed Jul. 8, 2013, which issued as U.S. Pat. No. 9,238,189. U.S. Ser. No. 13/936,525 is a continuation of U.S. Ser. No. 13/305,230, filed Nov. 28, 2011, which issued as U.S. Pat. No. 8,480,778. U.S. Ser. No. 13/305,230 is a continuing application of U.S. Ser. No. 12/218,822, filed Jul. 16, 2008, which issued as U.S. Pat. No. 8,066,791. U.S. Ser. No. 12/218,822 includes the disclosure of U.S. Ser. No. 60/961,521, filed Jul. 20, 2007. The complete disclosures of U.S. Ser. Nos. 14/996,491; 13/936,525; 13/305,230; 12/218,822; and, 60/961,521 are incorporated herein by reference. This application also includes various features described in U.S. Ser. No. 61/126,222, filed Apr. 30, 2008. The complete disclosure of U.S. Ser. No. 61/126,222 is incorporated herein by reference.

Claims of priority to each of U.S. Ser. Nos. 14/996,491; 13/936,525; 13/305,230; 12/218,822; 60/961,521; and, 61/126,222, are made to the extent appropriate.

FIELD OF DISCLOSURE

The present disclosure relates to air cleaners. It particularly concerns air cleaners in which a main filter cartridge is provided that includes an open end with a seal thereat; and, an opposite closed end. Features described include a filter cartridge providing supporting engagement with an access cover of a housing and an internal filter support, when installed. Other features relate to support for the seal at the open end. The disclosure also concerns filter cartridges for such arrangements and methods of assembly and use.

BACKGROUND OF THE INVENTION

Air cleaners are used to filter combustion intake air for internal combustion engines on a variety of vehicles and other equipment such as: trucks; buses; off-road construction equipment; agricultural equipment; generator sets; etc. Such air cleaners typically include a housing with a removable and replaceable main filter cartridge positioned therein. The housing includes a service or access cover, for selected access to the internally received filter cartridge, for servicing. The filter cartridge is typically serviced by being removed and either: by being replaced with a factory new cartridge; by being refurbished and being reinstalled; or, by being replaced with a previously used, but refurbished, cartridge.

Issues relating to air cleaner arrangements with a serviceable filter cartridge include: ensuring proper installation and sealing; obtaining appropriate support for the filter cartridge within the air cleaner, against unintended motion or movement; and/or ensuring that the air cleaner housing is protected against improper installation of filter cartridges.

Improvements in air cleaner assemblies and filter cartridges therefor, which are directed to these issues, are described herein.

SUMMARY OF THE INVENTION

According to the present disclosure, an air cleaner arrangement and components therefore is provided. The air cleaner arrangement depicted includes a plurality of features. There is no specific requirement that an air cleaner assembly and/or components include all of the features characterized herein, to obtain some advantage.

An example air cleaner arrangement is depicted which provides for internal support for the primary filter cartridge, as a result of cartridge support mounted in the housing to extend into the open cartridge interior, during installation of the primary filter cartridge. The inner support can be used as a media support for a secondary or a safety filter. Engagement between the filter cartridge and the cartridge support can be selected to provide for both: cantilevered support at a closed end of the filter cartridge; and, anti-rotational support between the filter cartridge and the cartridge support.

An access cover is provided for engagement with the closed end of the filter cartridge. The access cover can be provided with structural arrangements allowing for both cantilevered support and anti-rotational support of the cartridge.

Herein components for use in an air cleaner are described. Example components described include a primary filter cartridge, an optional secondary filter cartridge, and an access cover.

An example primary filter cartridge is provided, which includes a second end cap or closed end cap remote from the first, open, end cap. The second end cap includes an outer surface with a receiving groove therein, typically a serpentine receiving groove. Another surface can also be provided with a projection that extends into a receiver on an access cover.

An internal surface of the second end cap is configured for engagement with a cartridge support. The internal surface can be configured to provide for one or both of: cantilevered support of the filter cartridge of the second end by the cartridge support; and, anti-rotational engagement between the filter cartridge and the cartridge support.

In another aspect of the present disclosure, a filter cartridge is provided which includes an open end with a seal projection thereon. A seal support is embedded in the seal projection. In the example, the seal projection is integral with the remainder of an end cap having an air flow opening therein. In a specific example depicted, the seal support is integral with an inner liner around which the media pack is provided. The inner liner can further include a media support shoulder, against which an end of the media pack is positioned.

BRIEF DESCRIPTION OF THE DRAWINGS

in FIG. 10, the filter cartridge being shown partially in cross-sectional view.

in FIG. 12 line 11-11 indicating the cross-sectional view of FIG. 11.

FIG. 29 is an enlarged, schematic, cross-sectional view of an inner liner member of the cartridge depicted in FIG. 26.

FIG. 30 is an enlarged, fragmentary view of a portion of FIG. 29.

DETAILED DESCRIPTION

I. Example Assemblies

Figure 1:
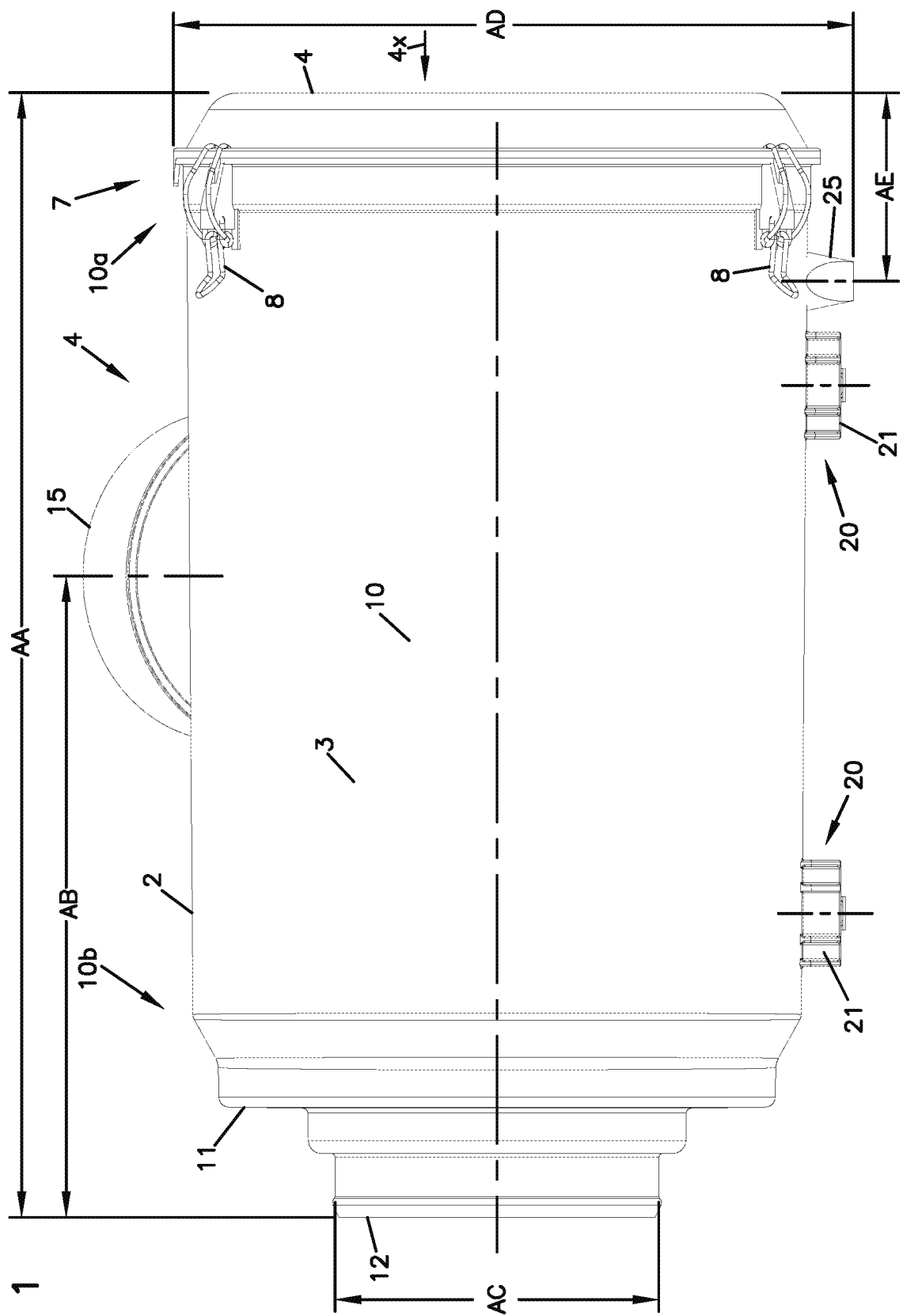
FIG. 1 is a schematic side elevational view of an air cleaner assembly according to the present disclosure.

The reference numeral 1, FIG. 1, generally designates an example air cleaner assembly according to the present disclosure. The air cleaner assembly 1 includes a housing 2 comprising a housing body 3 and an access cover 4. Access cover 4 is secured in place on the housing body 3 by a connection arrangement 7. For the example shown, the connection arrangement 7 comprises a plurality of latches 8.

The housing body 3 includes a side wall 10 having a first open end 10a, over which access cover 4 is mounted. Opposite the first end 10a, the housing side wall includes a second end 10b. The second end 10b includes a housing end wall 11 thereon, having air flow aperture or port 12 therethrough. End wall 11 is typically not removable from side wall 10, and in some instances it is formed integral with wall 10. In typical examples, access cover 4 and housing body 3 comprise glass filled polypropylene molded to the selected configuration.

In general, the access cover 4 is mounted in such a manner that when connection arrangement 7 (i.e., latches 8) is released, access cover 4 can either be removed from housing body 3, or be moved to a position allowing access to an interior of the housing body 3 through end 10a. For the particular example air cleaner assembly depicted in FIG. 1, access cover 4 is removably mounted to housing body 3, by latches 8.

The air cleaner assembly 1 further includes an air flow port or aperture 15 providing air flow communication with an interior of the housing 2. For the particular example shown, air flow aperture 15 is an air flow inlet in side wall 10; and, air flow aperture port 12 is an air flow outlet, although alternatives are possible.

Still referring to FIG. 1, the housing body 3 includes a mounting arrangement 20 thereon, by which the air cleaner 1 can be secured to the equipment on which it will be installed during use, for example a vehicle frame or equipment frame. The particular mounting arrangement 20 depicted comprises a plurality of mounting pads 21.

Mounting pads 21 can be located at various places on a housing body 2, for convenient securement to a frame or other portion of the equipment with which the air cleaner assembly 1 is to be used. It is noted that the pads 21 can be positioned at a variety of locations, such that not all are used; which ones being used being dependent on the particular equipment configuration. Thus, housing body 2 may include some mounting pads 21 that are not actually used, in a selected mounting.

In FIG. 1, some sample dimensions for an example arrangement are depicted as follows: AA=607 mm; AB=346.1 mm; AC=174.5 mm; AD=366.6 mm; and, AE=102 mm. Of course, principles of the present disclosure can be applied in a variety of sizes of units, the dimensions provided merely indicating the example.

Figure 2:
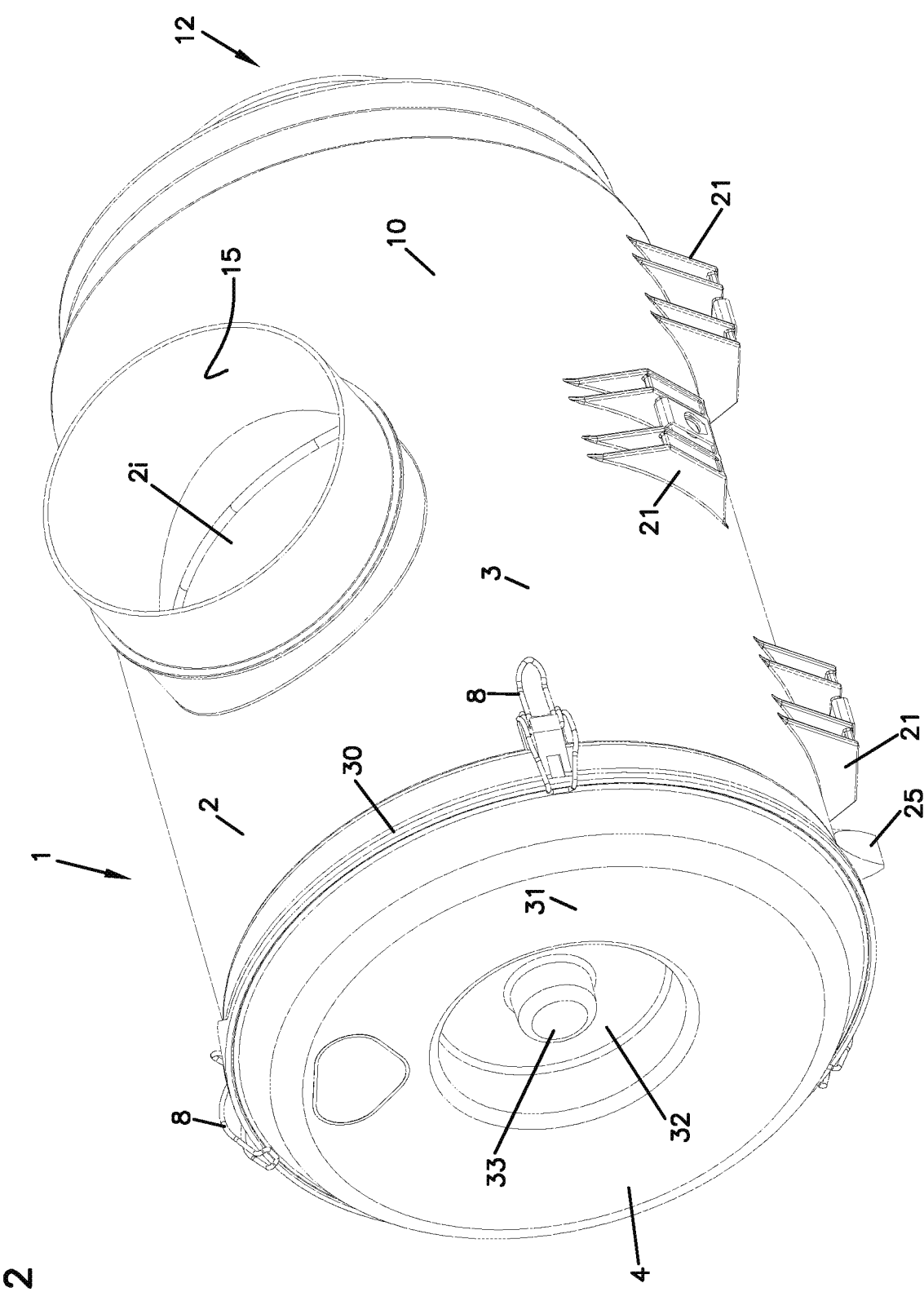
FIG. 2 is a schematic access end perspective view of the air cleaner assembly of FIG. 1.

Referring to FIG. 2, the air cleaner assembly 1 is depicted in perspective view, the view being directed toward access cover 4 and inlet aperture 15. Again, the housing 2, e.g., side wall 10, can be provided with mounting pads 21 at a variety of locations, allowing for variability in the type of equipment to which the air cleaner 1 can be secured, when installed, or orientation of installation.

Still referring to FIG. 2, the air cleaner assembly 1 depicted includes an evacuator valve arrangement 25 thereon. The evacuator valve arrangement 25 comprises a diaphragm or other valve member through which water and/or pre-separated dust can be ejected from an interior 2i of housing 2, during use.

Still referring to FIG. 2, it is noted that access cover 4 includes a peripheral rim 30 and end surface 31. The end surface 31 includes a central recess 32 with an outwardly directed central projection 33 therein. These features are discussed further below.

Figure 3:
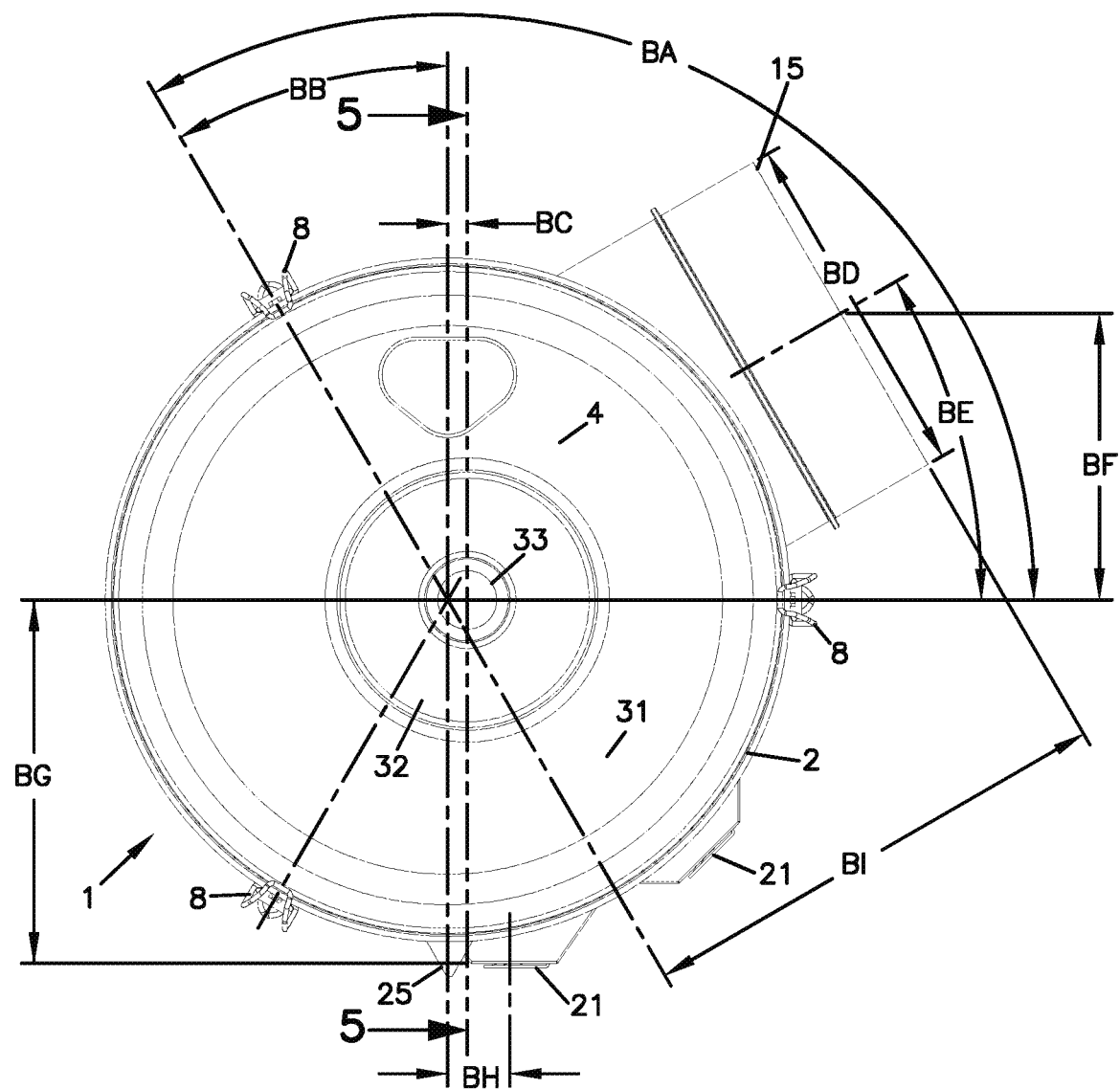
FIG. 3 is a schematic end elevational view of the assembly of FIG. 1, the depiction of FIG. 3 being taken toward an access cover.

In FIG. 3, an end elevational view of the air cleaner 1 is depicted; the view of FIG. 3 being taken toward access cover 4. Normally, when the air cleaner 1 is installed, the evacuator valve 25 is directed downwardly. Thus, the end view of FIG. 3 is generally in the orientation of typical installation.

In FIG. 3, example dimensions and angles for the sample system depicted are as follows: BA=120°; BB=30°; BC=10 mm; BD=178 mm; BE=30°; BF=146.3 mm; BG=185.5 mm; and, BH=31.7 mm; and BI=246.5 mm.

Figure 4:
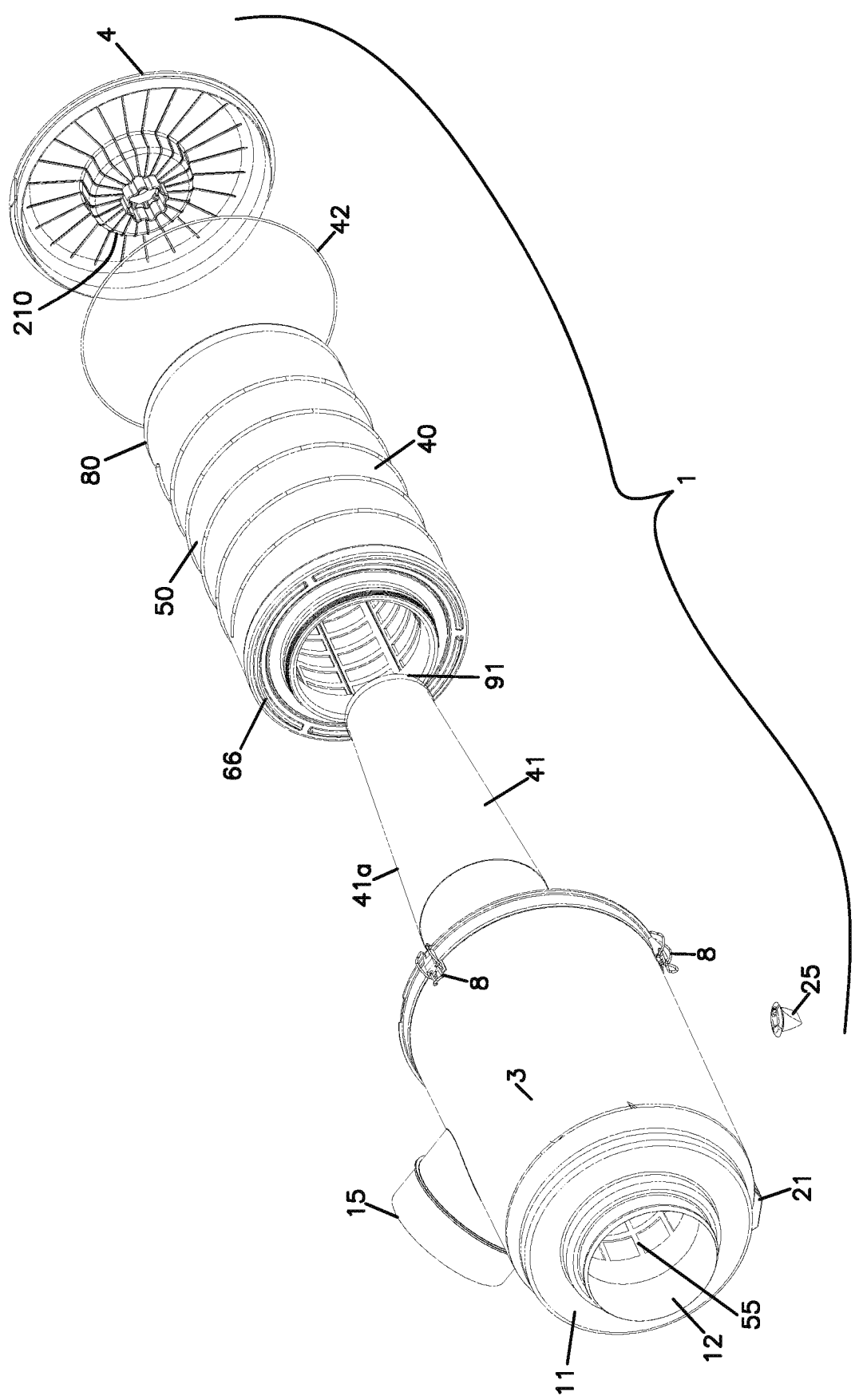
FIG. 4 is a schematic, exploded, perspective view of the air cleaner assembly of FIGS. 1-3.

Attention is now directed to FIG. 4, in which air cleaner assembly 1 is depicted in exploded view. Viewable in FIG. 1 are interiorly received components of the air cleaner assembly 1. In particular, primary filter cartridge 40 is viewable. Optional safety filter 41 is also shown. Finally, O-ring 42, which is positioned between access cover 4 and housing body 3, when air cleaner assembly 1 is assembled, is shown.

Figure 5:
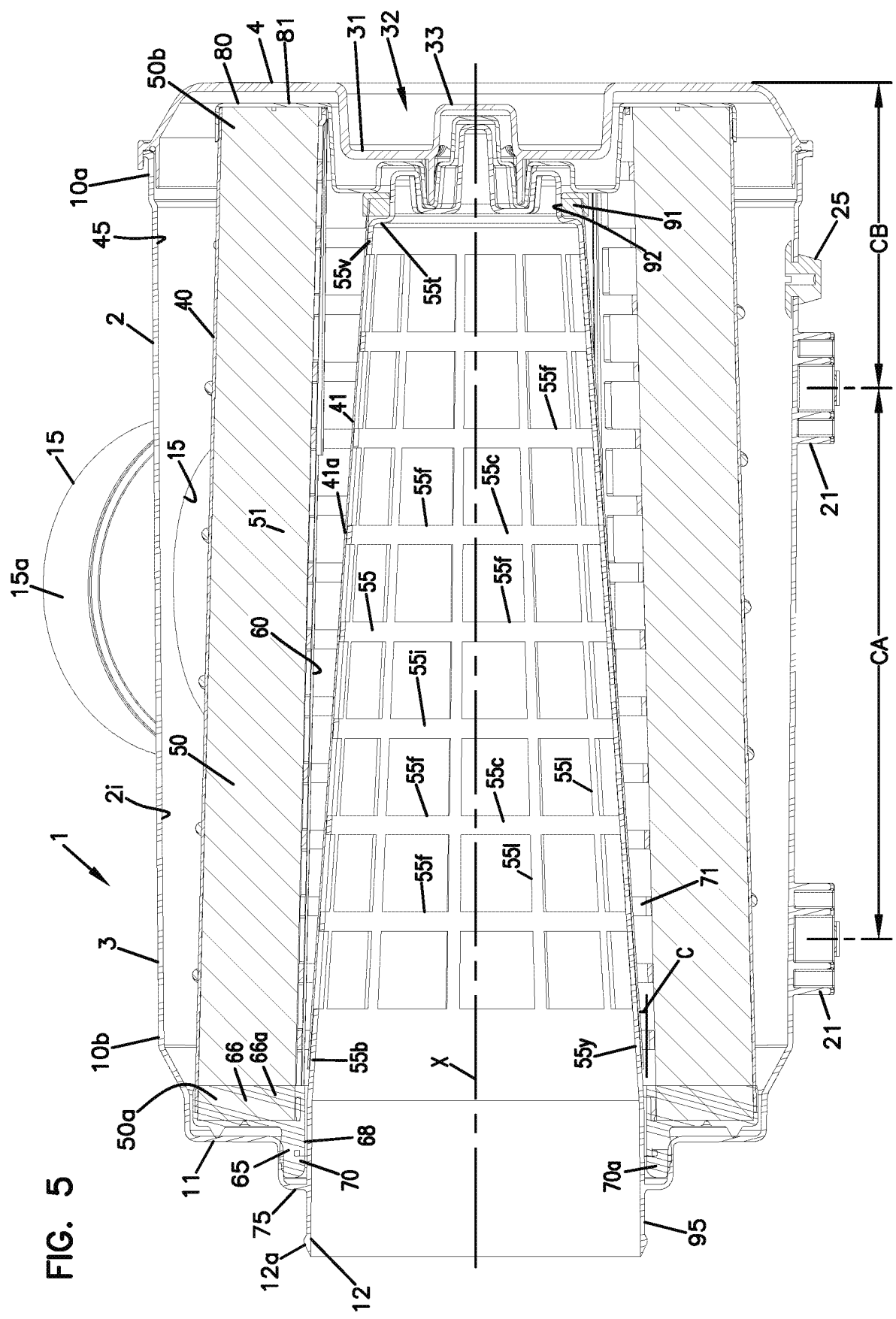
FIG. 5 is a schematic cross-sectional view of the air cleaner assembly of FIGS. 1-4, FIG. 5 being taken along line 5-5, of FIG. 3.

In FIG. 5, a cross-sectional view of the air cleaner assembly 1 is provided, allowing for viewing of selected, internal, structural detail. In general, the housing 2 defines a housing interior 2i in which the main or primary air filter cartridge 40 is received. The air enters the interior 2i through inlet 15, and is directed into an air flow annulus 45 surrounding the air filter cartridge 40. The air is directed through the air filter cartridge 40, in an out-to-in flow pattern, during filtering. The cartridge 40 generally includes a media pack 50 having air filtration media 51 therein. Upon passage through the media pack 50, the air is filtered. The filtered air passes into an internal cartridge support 55 and then outwardly through outlet 12.

The internal cartridge support 55 is surrounded by media 41a of an optional safety filter 41, in some applications. In such applications, as the air passes into cartridge support 55, it passes through media 41a of the safety filter 41. The safety filter 41 can be left off in those applications in which a safety or secondary filter is not desired.

The general description provided is of a "forward flow" arrangement. By this it is meant that, during filtering, air flow passes from an outside of the primary filter cartridge 40 through to an open interior 60 defined by the media pack 50 (i.e., out-to-in.) Selected principles described herein can be applied in alternate or reverse flow arrangements, in which an opposite direction of flow during filtering occurs; i.e., in which air flow, during filtering, is from inner region 60 through the media pack 50.

In a typical air cleaner, the inlet port 15 is surrounded by structure 15a (and the outlet port 12 is surrounded by structure 12a) to which duct work or other flow passageway equipment can be attached, for use.

It is noted that in FIG. 5 the air cleaner assembly 1 is depicted without latches 8 mounted thereon, for convenience.

Referring still to FIG. 5, the main cartridge 40 is a service component, i.e., it is removable and replaceable within interior 2i without damage to either the cartridge 40 or the housing 2. Service access to interior 2i is provided by opening access cover 4. Typically this is conducted by removing access 4 from end 10a of side wall 10.

Because cartridge 40 is a service component, it needs to be removably sealed in the air cleaner housing 2, to avoid flow into outlet 12 of unfiltered air. The filter cartridge 40 is provided with a housing seal arrangement 65, for this.

More specifically, media pack 50 includes opposite ends 50a, 50b. End 50a is secured to end cap 66. For the particular example shown, end cap 66 is a molded-in-place end cap 66a. By this it is meant that the end cap 66 is molded onto the media pack 50. A typical material useable for molded in place end caps, is a foamed polyurethane such as described in U.S. Pat. No. 6,955,701; US 2007/009040; and U.S. Pat. No. 7,070,642 each being incorporated herein by reference.

End cap 66 is an open end cap, i.e., it includes a central opening 68 therethrough. Central opening 68 fits over support structure 55, during installation of cartridge 40 into air cleaner body 3. End cap 66 includes seal projection 70 thereon. The seal projection 70 is sized and shaped to be received within a receiver pocket 75 in the housing body 3, to form a housing seal therewith. Thus, projection 70 defines the housing seal or seal member 65, for the example shown. Further example shown, seal projection 70 is molded integral with a remainder of end cap 66.

Still referring to FIG. 5, it is noted that within seal projection 70 is embedded seal support member 70a. Seal support member 70a is a rigid structural member which, by being embedded within seal projection 70, provides support to a radially outwardly directed seal formed by seal projection 70. Seal support 70a can comprise structure integral with inner liner 71 of cartridge 40; or, it can be a separate member embedded within projection 70.

End 50b of media pack 50 includes second end cap 80 thereon. The second end cap 80 is a closed end cap; meaning it has no central apertures therethrough. The example end cap 80 depicted is not molded-in-place, but rather comprises a preform 81 first formed (typically by molding) and then secured to the end 50b of media pack 50; for example with a potting adhesive. An example material for end cap 80 is a molded ABS potted with a hard polyurethane.

It is noted that as depicted below in the example embodiment of FIGS. 20-31, the second end cap 80 can comprise a composite including a preform member secured in place with an overmold, to end 10b of the media pack 50.

Still referring to FIG. 5, the cleaner assembly 1 is depicted including optional safety cartridge 41 having an end cap, end piece or ring 91 and safety filter media 41a. Safety filter media 41a is embedded in the end ring 91. The end ring 91 includes an open central aperture 92 by which it can fit around a portion of cartridge support 55.

In general terms, the safety filter media 41a is positioned between the main cartridge 50 and interior 55i of cartridge support 55. Thus, to reach interior 55i of support 55 and be directed outwardly through outlet 12, the filtered air from cartridge 50 passes through safety media 41a.

Still referring to FIG. 5, attention is directed to internal cartridge support 55. The cartridge support 55 has a side frame 55s which extends from a base region 55b (adjacent housing end 11) to an opposite outer end 55v (adjacent housing sidewall end 10a). The side frame 55s generally includes flow apertures 55f therethrough. The particular example support 55 depicted comprises a side frame 55s which includes a grid of longitudinal extensions 551 and radial, hoop, cross-extensions 55c.

For the example shown, the side wall 55s extends with a narrowing taper from base 55b to end 55t; i.e., side frame 55s has a generally conical shape in this region. The conical angle, c, i.e., internal acute angle of slant, is typically at least 1°, usually at least 2° and often within the range of 2° to 10° inclusive.

Referring to FIG. 5, it is noted that base 55b, of support 55 includes an imperforate region 55y in base 55b.

For the particular example arrangement 1 depicted in FIG. 5, the support 55 is molded integral with tube 95 that defines air flow aperture 12. Indeed, the particular example housing body 3 depicted is a single (plastic) molded component comprising side wall 10, inlet 15, tube 95 and cartridge support 55.

In FIG. 5, some example dimensions are provided as follows: CA=285 mm; and, CB=157.8 mm. In FIG. 5, a central longitudinal axis for support 55 is indicated at X.

Figure 5A:
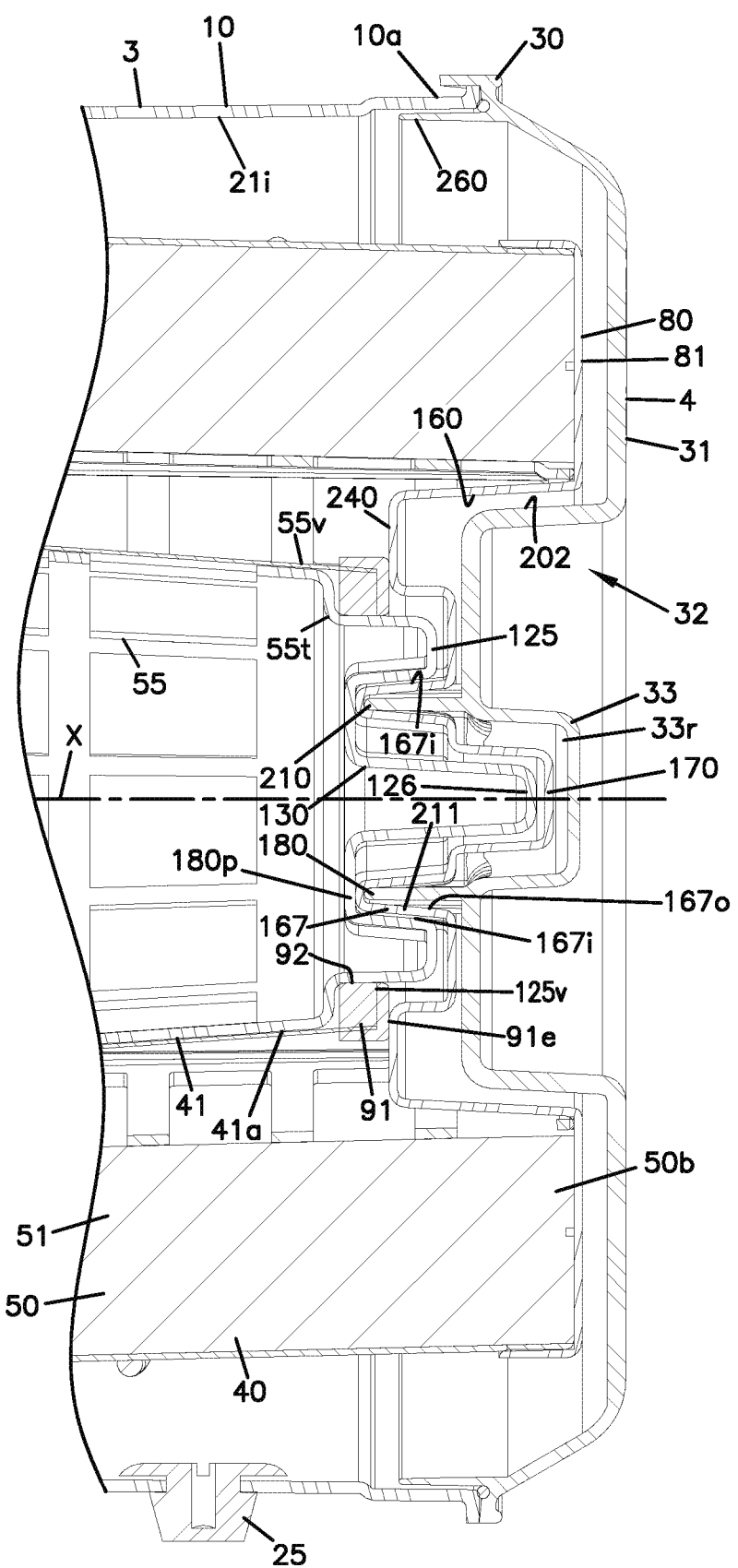
FIG. 5A is an enlarged, fragmentary, schematic, view of a first selected, portion of FIG. 5.
Figure 5B:
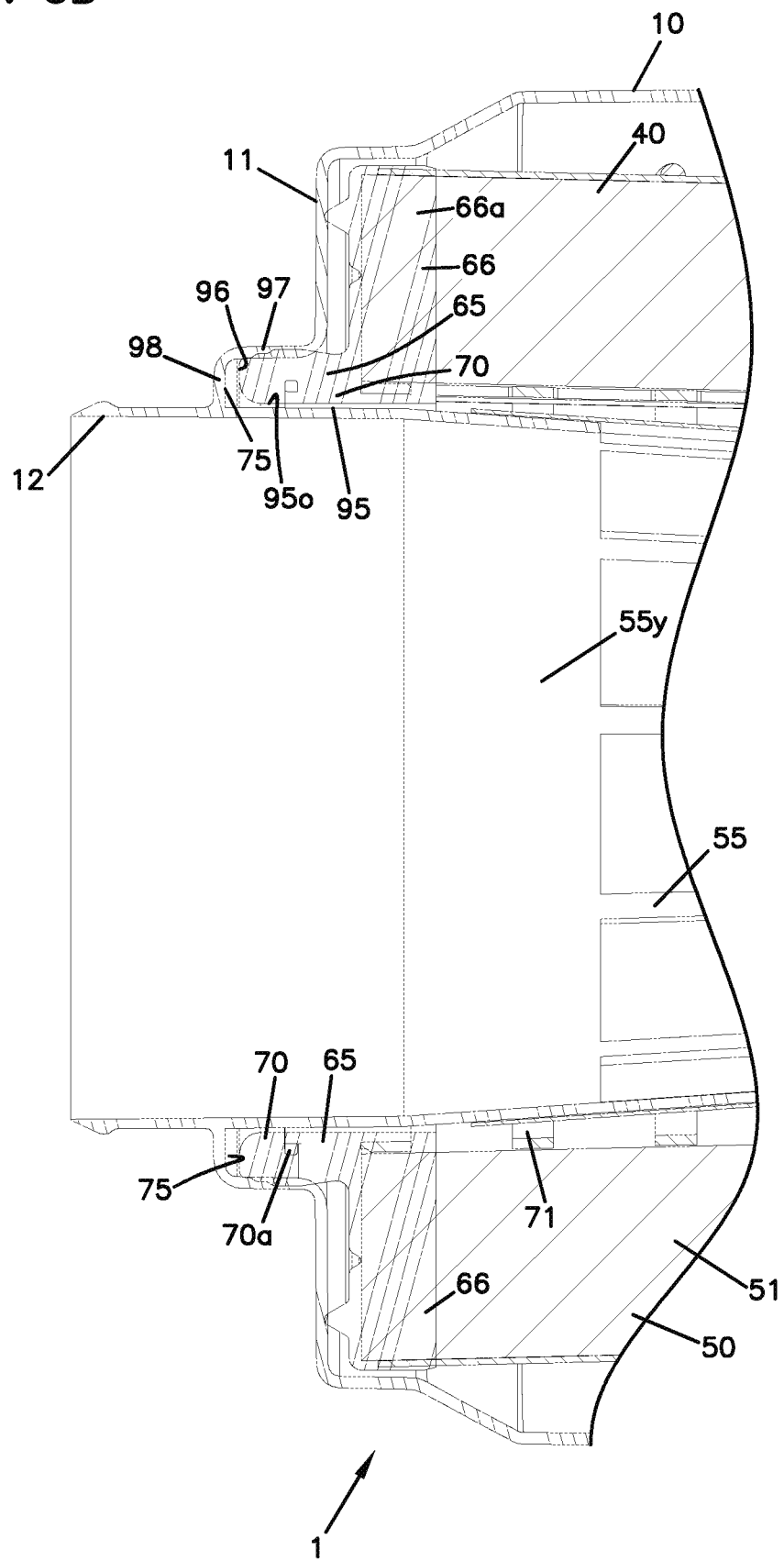
FIG. 5B is an enlarged, fragmentary, schematic, view of a second, selected, portion of FIG. 5.

Attention is now directed to FIG. 5A, an enlarged fragmentary portion of FIG. 5; and, to FIG. 5B, a second enlarged fragmentary portion of FIG. 5.

Referring first to FIG. 5B, housing 3 includes a tube 95 defining outlet 12. Surrounding tube 95, the housing body 3 defines a seal receiving pocket 96. The pocket 96 is formed between an outer surface portion 95o of tube 95 and an outer wall 97, with a pocket end closed by wall section 98 extending therebetween. Housing seal 70 of cartridge 5 is pushed into the pocket 96 to form a seal therewith. In particular, housing seal 70 is pressed radially outwardly against wall 97, by seal support 70, and/or wall 95o, to form an outwardly directed, peripheral, radial housing seal 65. (Pocket 96 corresponds to pocket 75, FIG. 5.)

Alternate seals can be used on cartridges in accord with the present disclosure, including ones having an internal radial seal in general accord with U.S. Pat. Nos. 5,547,480; 6,652,614; WO 2007/022171; U.S. Pat. Nos. 6,039,778; and 6,955,701, each of which is incorporated herein by reference. For example, base section 55b of support 55 can be configured to accommodate an internally, radially, directed seal in general accord with these references.

Referring now to FIG. 5A, extending across end 55v of side wall 55s, support 55 includes end member 55t. There is no specific requirement that end member 55t be closed, i.e., closed against passage therethrough of air flow. However in a typical application end member 55t will be closed, so as to not provide for an air flow bypass route around media 41a of safety cartridge 41 (when used).

Figure 6:
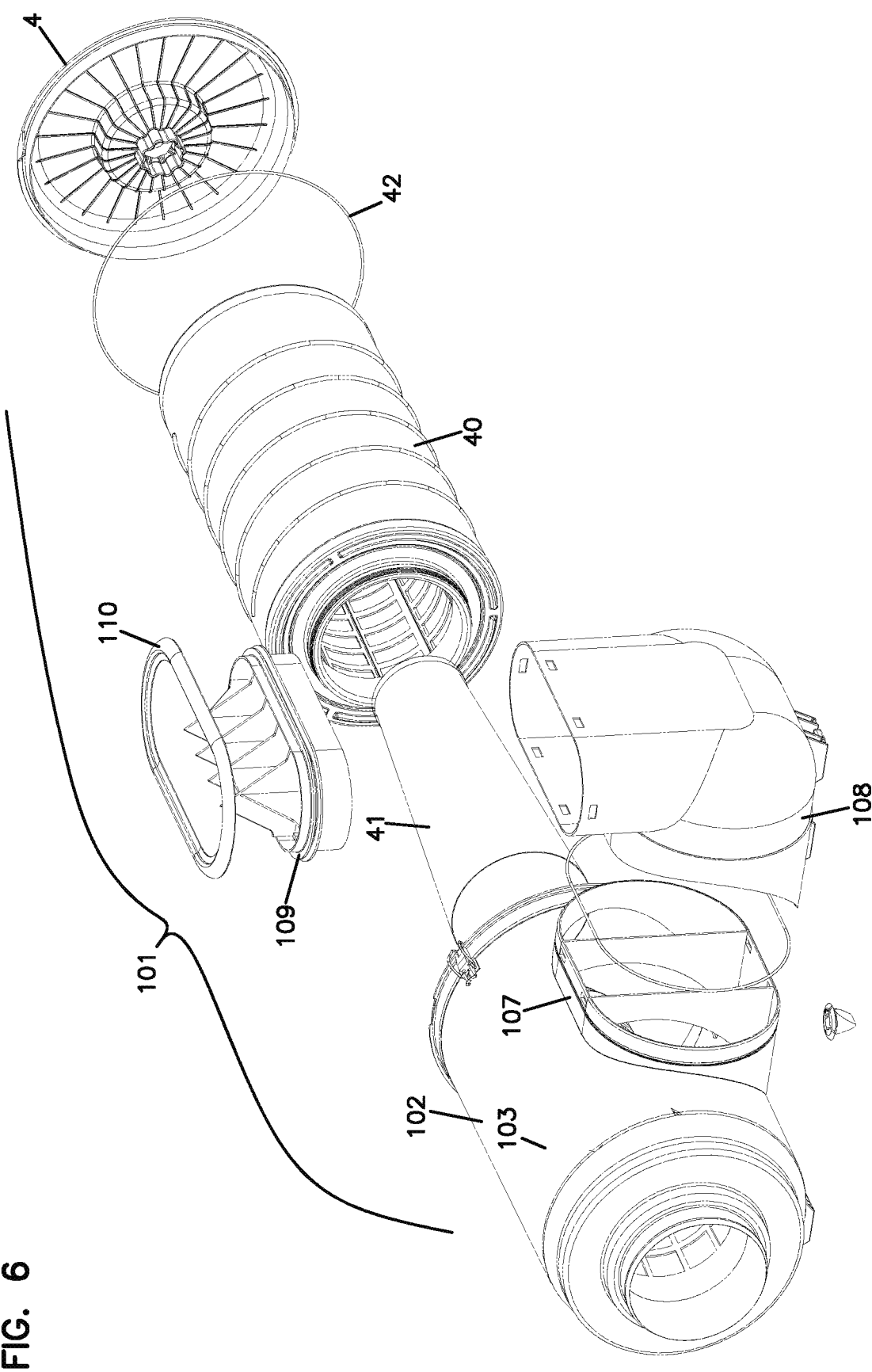
FIG. 6 is a schematic exploded view of a second embodiment of an air cleaner assembly including features described herein.
Figure 7:
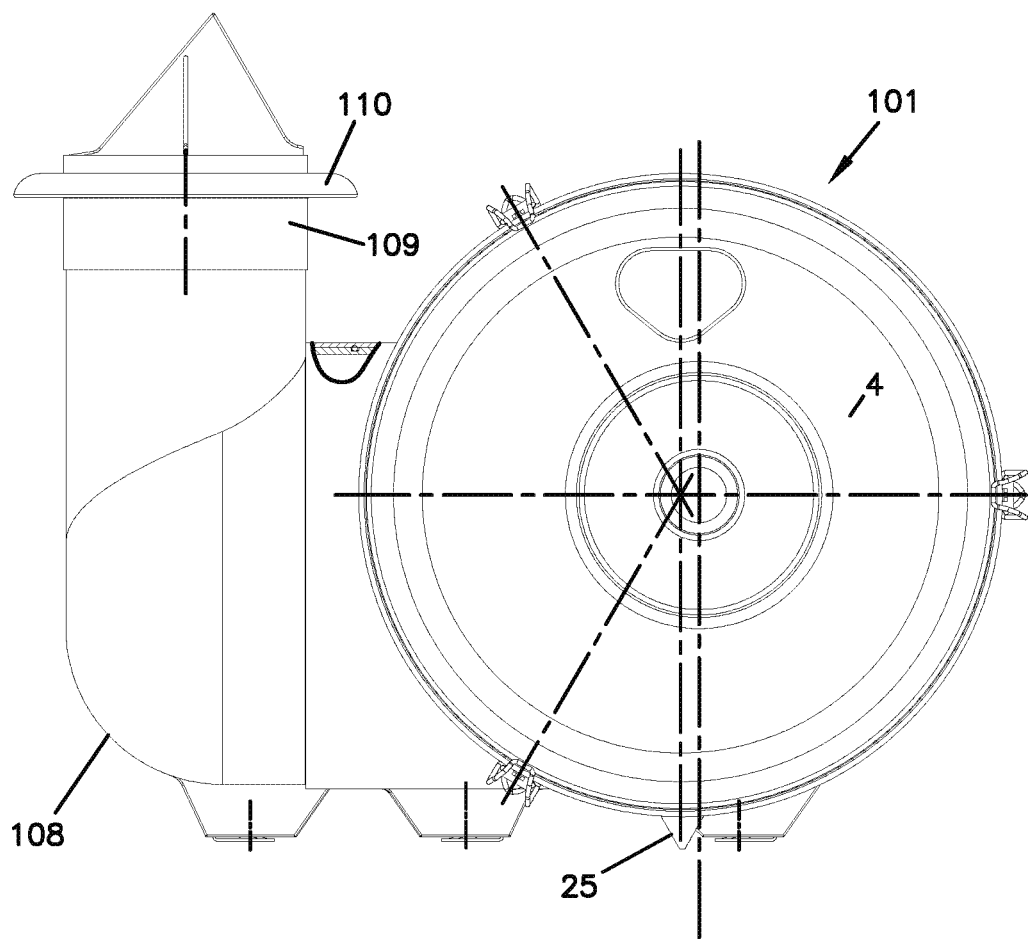
FIG. 7 is a schematic access cover end elevational view of the assembly depicted in FIG. 6.

Before further detail is provided with respect to assembly 1, attention is directed to FIGS. 6 and 7, in which an alternate embodiment incorporating principles of the present disclosure is depicted. Referring to FIG. 6, air cleaner 101 is depicted in exploded view. The air cleaner 101 includes housing 102 comprising housing body 103 and access cover 4. Cartridge 40 is positionable within housing body 103. Optional safety filter media 41 is viewable. Also viewable is O-ring 42.

In general, the only differences necessary between air cleaner assembly 101 and air cleaner assembly 1 relate to the specific configuration of the housing body 103 with respect to inlet 107. Inlet 107 in the housing body includes an inlet duct 108 attached thereto, with an end piece 109 and a rim 110. Air cleaner 1 is differently configured with respect to such features.

Internal features, however, for air cleaner 101, including the replacement part features concerning the cartridge 40 can be the same. Each of the air cleaners 1, 101 can be configured to use the same access cover 4.

In FIG. 7 an end view of air cleaner assembly 101, taken toward access cover 4, is depicted.

Figure 8A:
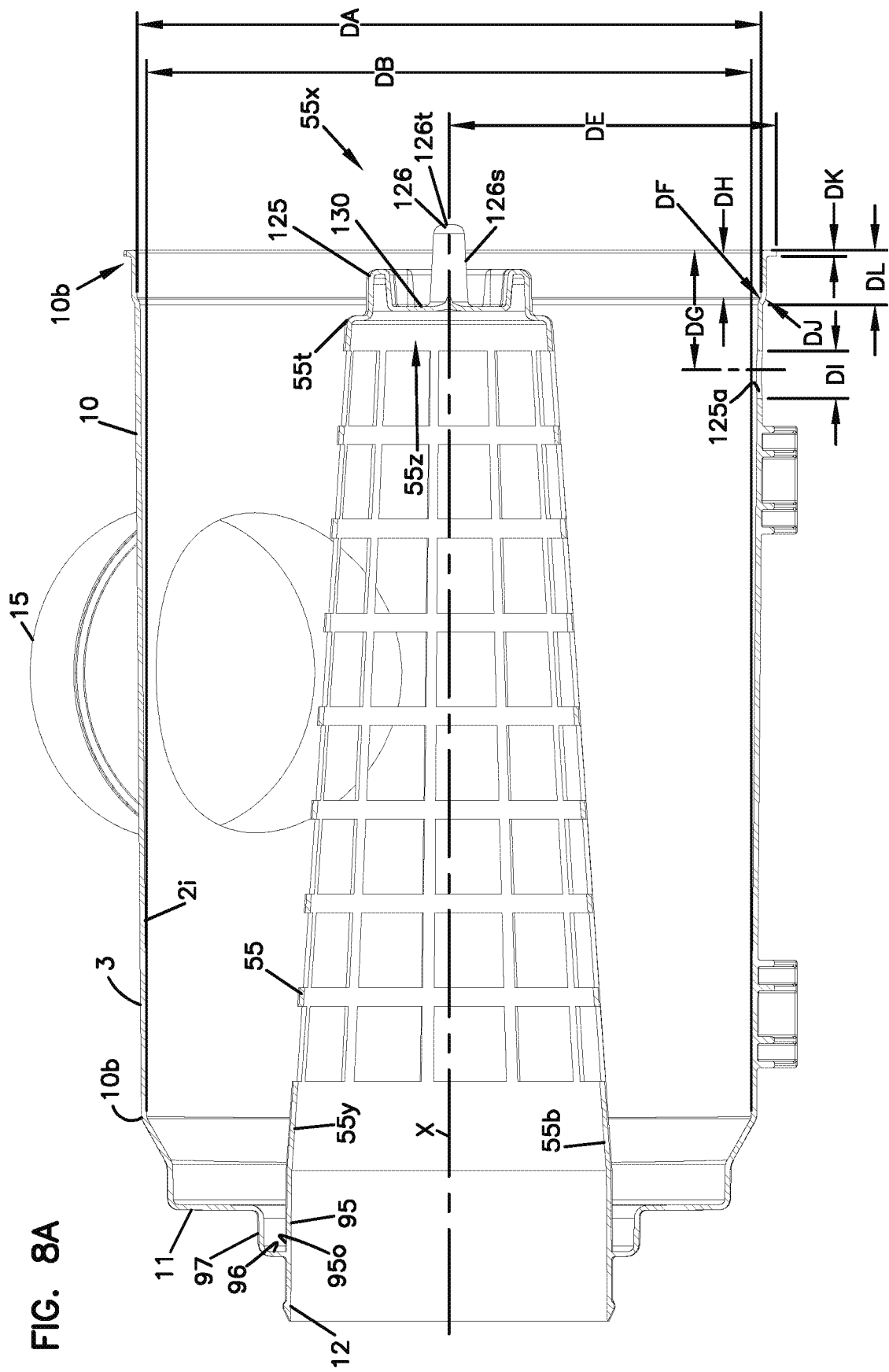
FIG. 8A is a schematic cross-sectional view of a portion of the assembly depicted in FIG. 5; the view of FIG. 8 depicting the housing with an internal support and without a primary filter cartridge installed or a safety filter installed; and, without an access cover installed.

Returning to assembly 1, attention is now directed to FIG. 8A, a cross-sectional view of housing body 3 (of air cleaner 2, FIGS. 1-5) analogous to FIG. 5, but pictured without: access cover 4; cartridge 40; and safety element 41. Also, relative to FIG. 1, latches 8 are not shown on the housing body 3, of FIG. 8A. Further, in FIG. 8A, an evacuator valve 25 (FIG. 1) is not positioned on body 3, of FIG. 8; however, evacuator aperture 25a, across which evacuator valve 25 would be positioned for use, is viewable.

Figure 8B:
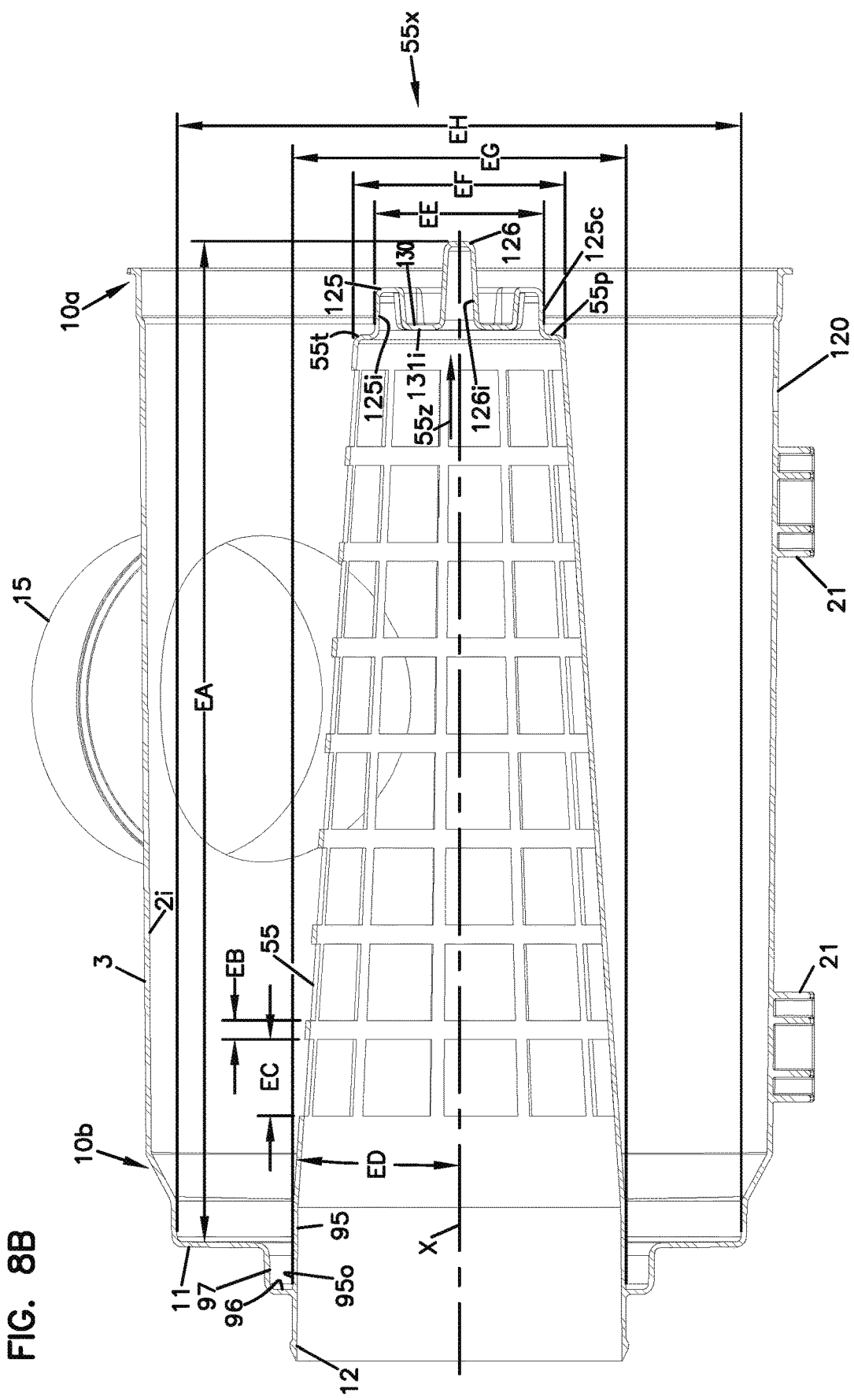
FIG. 8B is a schematic cross-sectional view analogous to FIG. 8A, but taken at a different location.

It is noted that cross section FIG. 8A is not through a center of center support 55, but rather slightly toward the viewer from center. FIG. 8B, on the other hand, is an analogous cross section, but taken through a center of center support 55.

In general, the structure (housing body 3) viewable in FIGS. 8A, 8B comprises a single, molded, structural piece. Of course it can be alternately constructed. In a typical application, housing body 3, including support 55, will be made as a single, integral, piece from a plastic.

Referring to FIG. 8A, attention is directed to the end member 55t on support 55. End member 55t is, again, opposite base 55b. End 55t projects in a direction away from outlet 12 toward open end 10a. Indeed, in some applications of the techniques described herein, including the examples shown for housing body 3, FIG. 8A, a portion of end member 55t can project outwardly beyond end 10a of side wall 10, in a direction opposite end wall 11 and outlet 12; i.e., in a direction toward access cover 4, when installed.

For the example depicted, end member 55t includes two projection sections: first (perimeter ring) projection 125; and, second (central) projection member 126. Each of projection sections 125 and 126 project axially away from adjacent portions of end member 55t in a direction away from housing end 11. By "axially" in this context, it is meant that the projections are in the same general direction as longitudinal axis X. For the example shown, first (ring) projection 125 is separated from second (center) projection 126 by outer surface recess region 130 which extends around projection 126. Also, in the example shown, second ring projection 125 is continuous and circumscribes (surrounds) center projection 126.

End 55t member includes an outer surface 55x and an inner 55z. Recess 130 is in outer surface 55x.

Herein and when it is said that the projection is "axial" or extends "axially", it is not meant that the projection is necessarily perfectly co-linear with central longitudinal axis X, but rather it is in the same general longitudinal direction.

In the particular example depicted, central projection 126 is conical in shape and would have a circular cross section in a plane perpendicular to axis X. More specifically, projection 126 has a conical side wall 126s, which tapers inwardly toward tip 126t. Tip 126t, however, is somewhat truncated, and does not necessarily come to either a sharp point or a completely flat end.

Referring to FIG. 8A, it is again noted that the cross-section taken is not through projection 126, but rather is through a portion of cartridge support 55 located toward the viewer from projection 126. In FIG. 8A, some example dimensions are provided as follows: DA=332.6 mm; DB=322.4 mm; DE=174.5 mm; DF=1.5 mm radius; DG=63.8 mm; DH=25.1 mm; DJ=5 mm radius; DK=3.2 mm; DL=29.2 mm; and DI=25.3 mm.

In FIG. 8B, a second cross-sectional view analogous to FIG. 8A is depicted, but in this instance taken through a center line of projection 126. Referring to FIG. 8B, projection 126 can be seen defined by hollow interior 126i projecting axially away from end 11. Still referring to FIG. 8B, projection ring 125 can also be seen as having a hollow interior 125i also projecting axially away from end 11.

In more general terms, cartridge support end 55t has an outer surface 55x and inner surface 55z. The example cartridge support end 55t is contoured on both surfaces 55x, 55z. An example shape is such that there is a central (in the example shown conical) projection 126 spaced from a ring projection 125 by a recess 130, in the outer surface 55x. The inner surface 55z is defined with a central (for the example shown conical) outer projection recess 126i spaced from the recessed ring 125i by surface 131i, leaving the observation that surface 131i generally projects toward end wall 11 and recesses 125i, 126i project away from end wall 11.

Projection 125 includes an outer perimeter surface 125c, FIG. 8B. For the example shown, perimeter surface 125c is a smooth, non-contoured surface defining a circular perimeter, and thus has a generally cylindrical shape. The cylinder surface 125c may taper inwardly slightly in extension away from end wall 11 in some applications. End member 55t includes a peripheral shoulder 55p projecting radially outwardly from a base end of surface 125c. Surface 125c is defined to project through aperture 92 at end cap 91 of a safety element 41, FIG. 5, when used. Shoulder 55p is sized and positioned to receive end cap 91 abutting thereagainst, when the optional safety element 41 is installed.

Referring to FIG. 8B, example dimensions are indicated as follows: EA=523.2 mm; EB=10 mm; EC=40 mm; ED=4° conical angle; EE=88.5 mm; EF=110.6 mm; EG=174.5 mm; and EH=294.6 mm.

Figure 9:
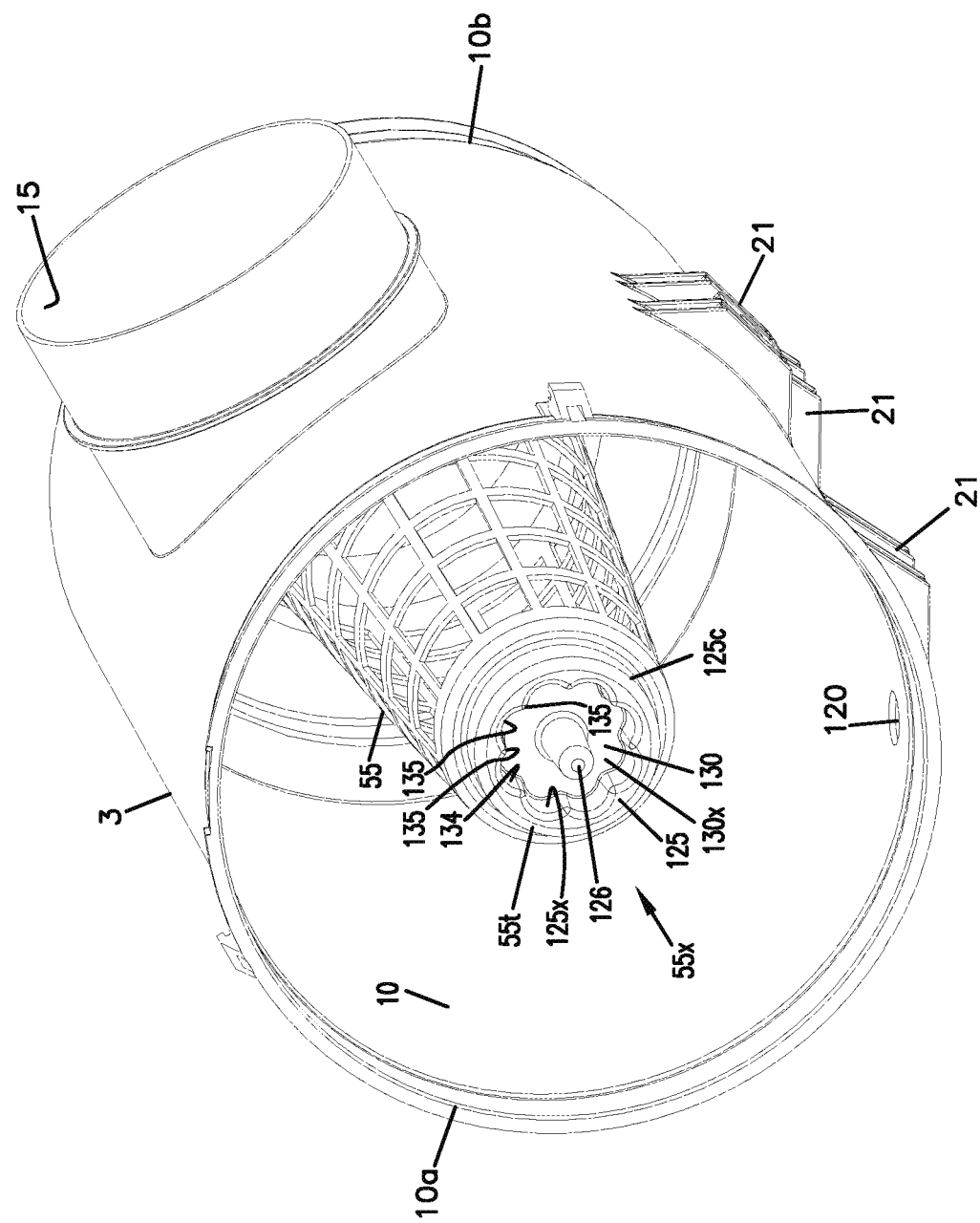
FIG. 9 is a schematic perspective view of the componentry depicted in FIGS. 8A and 8B.

Attention is now directed to FIG. 9. In FIG. 9 a perspective view of housing body 3 (FIGS. 8A, 8B) is provided; FIG. 9 being taken toward open end 10a. In FIG. 9, central cartridge support 55 is viewable. In particular, end member 55t of support 55 can be seen. Central projection 126 is viewable, surrounded by recess 130. Outer projection 125 is also viewable, including outer circular wall 125c and an opposite inner wall 125x.

Central projection 126, recessed surface 130 and ring projection 125 collectively define receiver recess 130x in outer surface 55x of end 55t. Receiver recess 130x is positioned to receive projecting therein a corresponding projection member on a primary filter cartridge 40 during installation, as discussed below.

In general terms, outer surface 55x, of end member 55t defines the first member of a first projection/receiver arrangement providing for engagement between the cartridge 5 and the central cartridge support 55. As will be understood from following descriptions, projections 125, 126, project into receiver sections of a corresponding primary filter cartridge 40; and, a portion of a primary filter cartridge 40 projects into receiver 130x on support 55.

For the example assembly depicted, the inner wall 125x of ring projection 125 can be seen to have a serpentine surface shape with alternating outwardly curved, concave, sections 134 and inwardly projecting convex portions 135.

Herein the term "serpentine" when used to refer to the definition of a surface or wall, it is meant to refer to a surface that does not define a circular definition, but rather includes alternating convex and concave sections therein.

For the particular example, serpentine wall surface 125x, eight (8) concave sections 134 are separated by eight (8) convex portions 135, in extension of wall 125x around center projection 126. For the example depicted, each concave section 134 is the same shape and size as the other concave sections; and, each convex portion 135 is the same shape and size as the other convex portions. Thus, an eight (8) petal arrangement is defined by wall 125x. For the particular example, serpentine wall surface 125x depicted, and the petal arrangement has 8-fold rotational symmetry, i.e., each petal is the same size and shape as each other petal, and the petals are evenly, radially, spaced. In this context, the term "8-fold rotational symmetry" is used to refer to a shape definition which can be rotated around a central axis with eight evenly radially, spaced positions, in which it can align with itself. Thus, an octagon has 8-fold rotational symmetry, whereas (in contrast) a square has 4-fold rotational symmetry.

In more general terms, serpentine surface 125X comprises alternating convex and concave sections, usually at least three concave sections and typically at least five concave sections and usually 6-10 concave sections.

Figure 10:
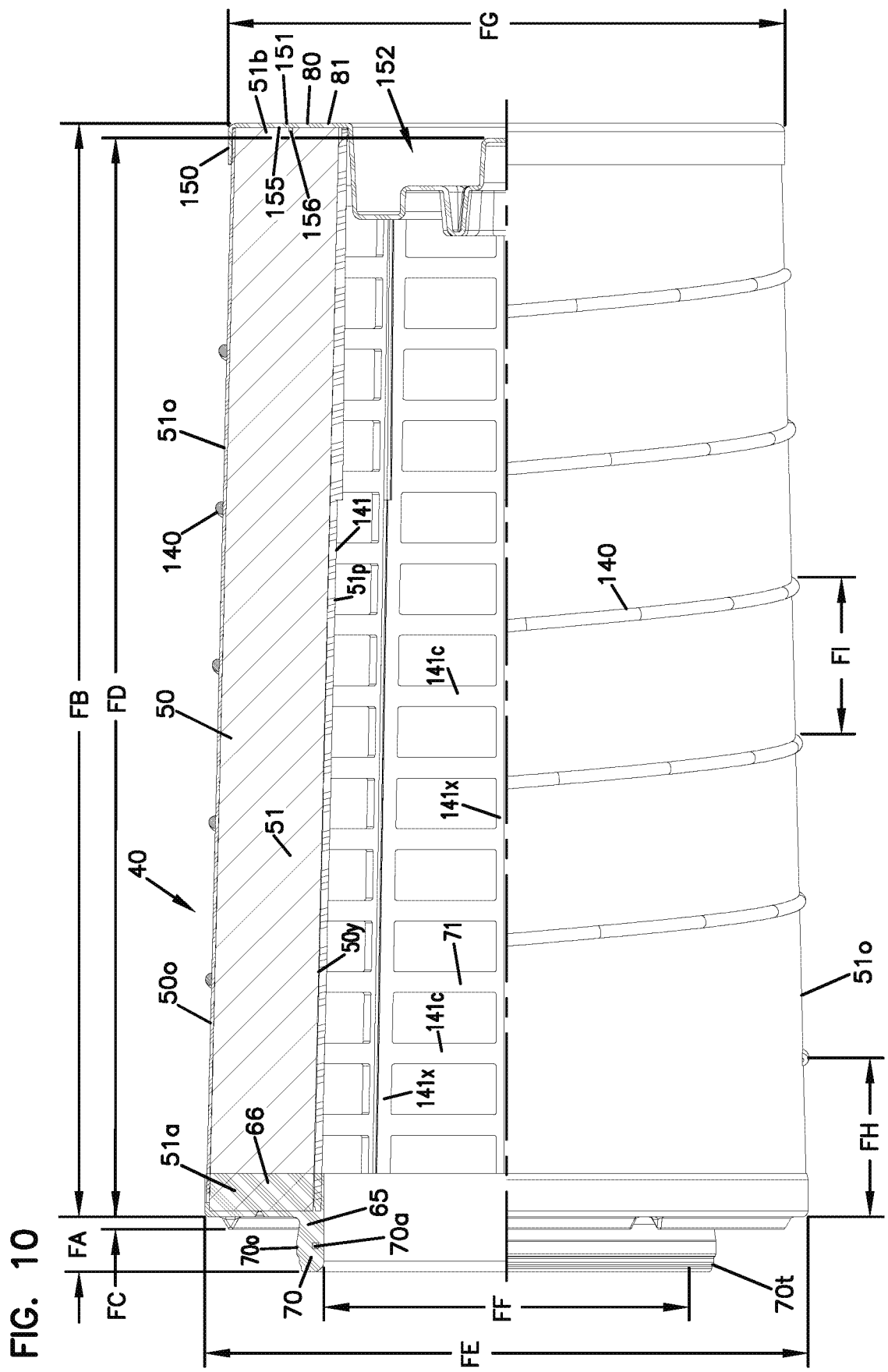
FIG. 10 is an enlarged, schematic, side view of a filter cartridge usable in the air cleaner assemblies of FIGS. 1 and 6.

Attention is now directed to FIG. 10. In FIG. 10, cartridge 40 is shown separate from air cleaner assembly 1. In FIG. 10, a portion of cartridge 40 is shown in cross-section, facilitating understanding of internal detail.

Referring to FIG. 10, cartridge 40 comprises media pack 50. The media pack 50 includes air filtration media 51. A variety of types of media can be used for the cartridge 40. The particular example media 51 depicted comprises pleated media, with inner pleat tips 51p and outer pleat tips 51o. The media 51 extends between first and second opposite media ends 51a, 51b. The pleated media 51 can be selected from a variety of filtered media of which are used for air filtration. The particular efficiency, physical and operational perimeters for the media 51 are a matter of choice for the application intended. Generally, known filtration media can be used.

The media pack 50 defines an outer perimeter 50o and an inner perimeter 50i. The outer perimeter 50o is defined by outer pleat tips 51o. Extending around the outer pleat tips 510 in a helical pattern, is adhesive bead 140, which helps maintain pleat spacing and provides pleat support.

The media pack 50 further includes an inner liner 141, corresponding to liner 71, FIG. 5. The inner liner 141 is a support liner for the media 51, along inner pleat tips 51p. The inner liner 141 is porous and can comprise a plastic or metal structure. For the particular example cartridge 40 depicted, the inner liner 141 is a plastic structure comprising a plurality of longitudinal or axial strips 141x and cross or radial hoops or strips 141c.

In some applications of the techniques described herein, the media pack 51 can include an outer liner, for example a plastic or metal liner.

At end 51a of the media 51, media pack 50 (i.e., media 51 and liner 41) is embedded in end cap 66. End cap 66 again, is typically a molded-in-place end cap 66a, including, molded integral therewith, housing seal member 65, which, in the example shown, comprises projection 70. Seal support 70a, again, is embedded in projection 70.

The housing seal member 70 includes an outer (peripheral) seal surface 70o configured with a stepped or tapered section 70t to facilitate insertion into pocket 96 with compression against wall 97, FIG. 8A, during installation, see FIG. 5B.

Still referring to FIG. 10, attention is directed to end cap 80; in the example depicted comprising pre-form 81. By "preform" in this context, it is meant that the example end cap 80 is formed (for example from a molded plastic) and then media pack 50 is potted thereto, for example with adhesive. A typical material is molded ABS potted with hard polyurethane. The example end cap 80 includes outer peripheral rim 150, outer end ring section 151 and central recess section 152.

As cartridge 5 is assembled, media pack 50 is potted to end cap 80 by being positioned to project into recess 155 formed between outer peripheral rim 150 and central recess section 152. Rib 156 is a circular standoff rib for the media pack 50, during potting.

Referring to FIG. 10, it is noted that recess 155 is generally positioned on an opposite side of end cap 80 from ring 151.

In FIG. 10, example dimensions for the sample system depicted are provided as follows: FA=26.5 mm; FB=529 mm; FC=6 mm; FD=522 mm; FE=291.6 mm; FF=176.4 mm; FG=269 mm; FH=76 mm; and FI=76 mm.

It is noted that for the sample cartridge 40 depicted in FIG. 10, the outer pleat tips 510 form a generally conical shape, tapering downwardly in extension from media end 51$a$ toward media end 51$b$. Principles described herein can be implemented in a variety of shapes of arrangements including cylindrical ones and conical ones. When a conical shape is used, typically the angle of taper will be at least 0.5°, typically at least 1° and often within the range of 1-4°.

Preferably, when the cartridge 40 has a conical shape, the conical taper for the media pack 51 has a smaller angle of taper, than the conical taper to support 55, FIG. 5, as shown.

Figure 11:
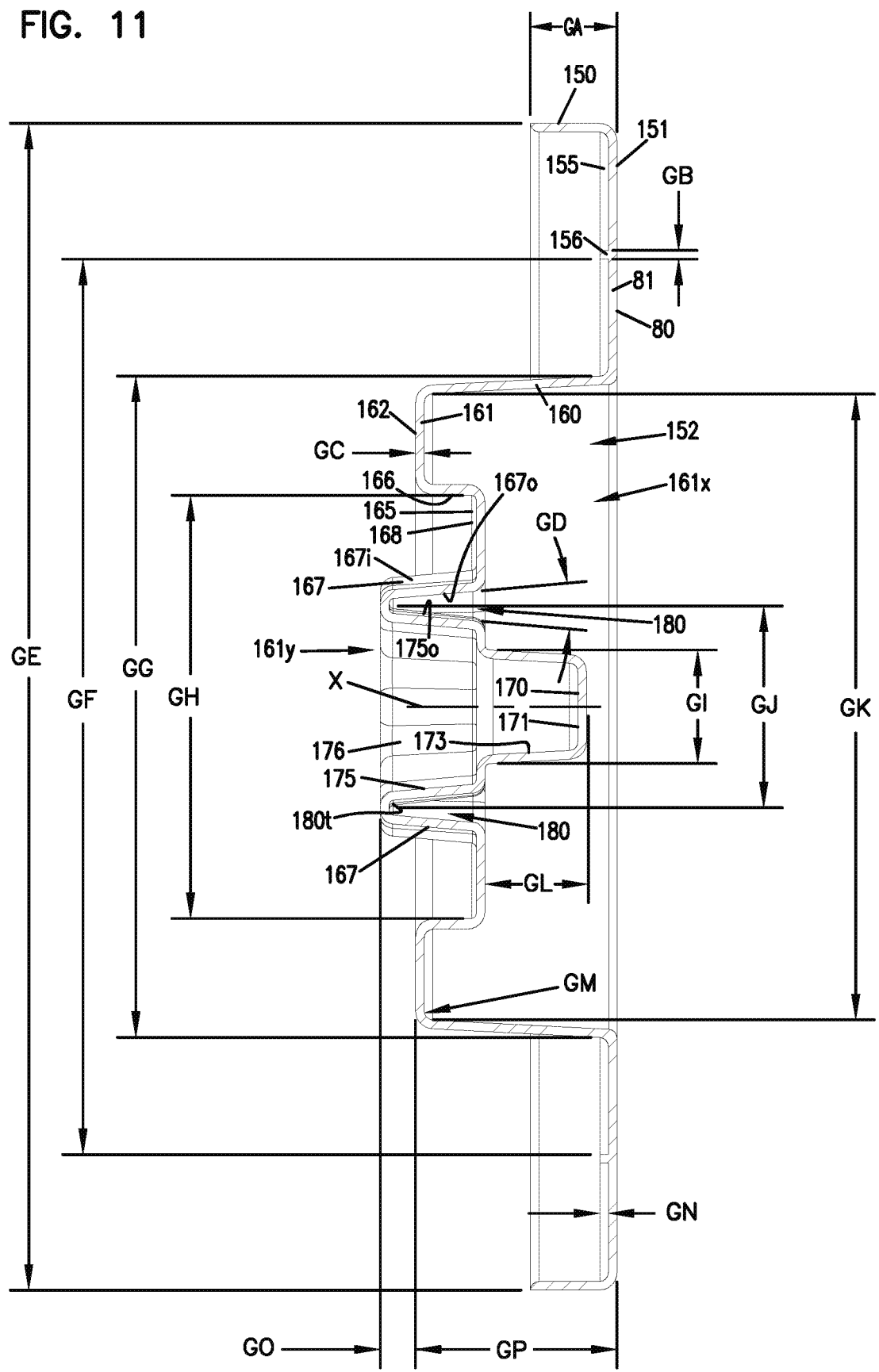
FIG. 11 is an enlarged cross-sectional, schematic, view of a closed end cap member of the filter cartridge of FIG. 10.

Attention is now directed to FIG. 11, an enlarged cross sectional view of the end cap 80 depicted in FIG. 10. In FIG. 11, the cross sectional view is of the end cap 80 only, as it would be viewed before being secured to the media pack 50, FIG. 10.

Referring to FIG. 11, central recess portion 152 includes the following features: outer peripheral wall 160 and end wall 161. The outer wall 160 generally projects into interior 60 of the media pack 50, of FIG. 10. Adjacent or slightly spaced from media pack interior 50$i$, inner wall 161 generally extends across the interior 60.

End wall 161 includes inner surface 161$y$ and outer surface 161$x$. The inner surface 161$y$ is generally directed toward end cap 66 in cartridge 40. Surface 161$x$ is generally opposite surface 161$y$, and is directed away from end cap 66.

Figure 16:
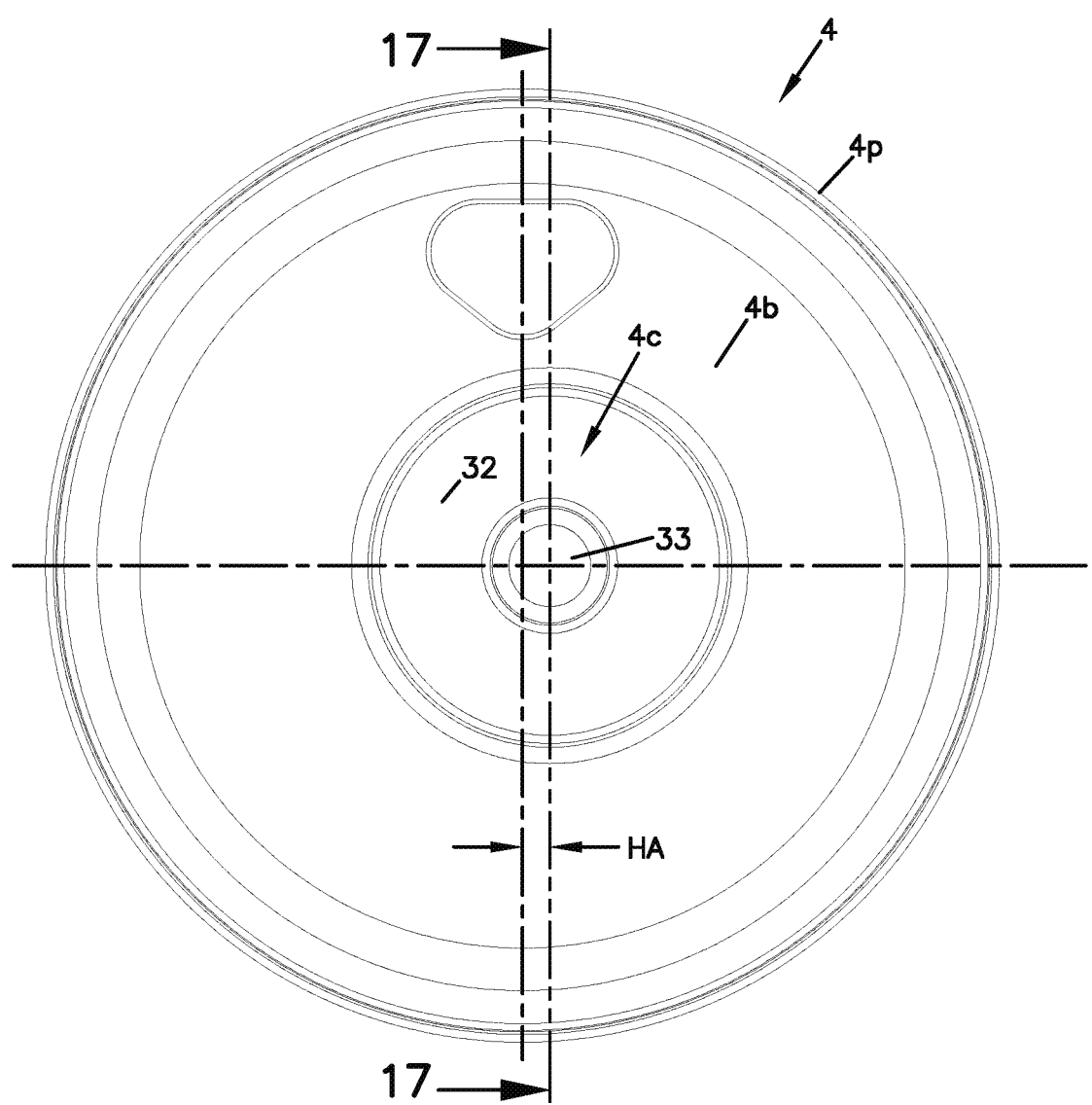
FIG. 16 is an enlarged, schematic, end view of an access cover usable with the air cleaner assemblies of FIGS. 1 and 6.

First, inner surface 161$y$ includes outer ring section 162. Radially inwardly from ring section 162 is provided circular, axially outwardly projecting receiving pocket or ring recess or receiver 165 defined by outer wall section 166, inner wall section 167 and end wall section 168. By "axially outwardly projecting" in this context, it is meant that ring receiver 165 generally projects in a direction opposite end cap 66, FIG. 8A. Ring recess 165 is sized and shaped to receive, projecting therein, ring projection 125 on the central cartridge support end 55$t$, during installation. Ring recess 165 is typically continuous in extension around central axis X. Referring to FIG. 16, it is noted that central section 4$c$ is not necessarily centered on a center point for perimeter 4$p$, but rather is depicted as eccentrically positioned.

Wall section 167 typically has an surface 167$i$ in side 161$y$ which has a serpentine shape of alternating outwardly directed convex and outwardly directed concave (or inwardly directed convex) sections, which engage wall 125$x$, FIG. 9. That is, serpentine surface 125$x$, FIG. 9, pushes around and engages serpentine surface 167$i$, FIG. 11, in surface-to-surface engagement. As a result of the petal structure on surface 125$x$ receiving outwardly projected petals on serpentine wall 167$i$, when engagement occurs, end cap 80, and thus cartridge 40, will not readily rotate relative to central cartridge support 55.

Alternately stated, once cartridge 40 is installed over port 55, rotational motion of cartridge 40 around support 55 is inhibited, as a result of an interference interaction between the petal shape of serpentine wall 125$x$, and the petal shape of serpentine surface of 167$i$. Together, these surfaces form an anti-rotational engagement between cartridge 40 and central cartridge support 55. This helps insure that the cartridge 40 can only be installed in one of selected rotational orientations relative to support 55. When eight (8) petals are present in each of walls 125$x$, 167$i$, with 8-fold symmetry, eight rotational positions are possible.

Spaced radially inwardly of wall 167, surface 161$y$ includes a central outer projection 170. The central outer projection 170 includes an outer end section 171 and side wall 173. For the example depicted, the side wall 173 is generally conical and surrounds central axis x.

Still referring to FIG. 11, central outer projection 170 is sized to receive projecting therein, central projection 126 on end 55$t$ of central cartridge support 55, when the cartridge 40 is installed in the housing 2.

Central projection 170 further includes base section 175 with internal surface 176. In general, base section 125 projects into recess 130$x$, FIG. 9, during installation. Attention is now directed to outer surface 161$x$, FIG. 11. Outer surface 161$x$ includes, defined therein, receiver groove 180, between walls 167, 175. Outer surface 167$o$ and outer surface 175$o$ of surfaces 167, 175 respectively, are generally each serpentine, forming a serpentine receiving groove 180 having an outer serpentine surface along wall 167$o$ defined by alternating outwardly projecting concave and inwardly projecting convex sections; and, an inner surface along wall 175$o$ defined by outwardly projecting convex and inwardly projecting concave sections. Typically, outwardly projecting concave sections of walls 167 are aligned radially with outwardly projecting convex sections of wall 175; and, inwardly projecting convex sections of wall 167 are aligned radially with inwardly projecting concave sections of wall 175, to form a serpentine receiver groove 180. Groove 180 is a receiver groove for a projection on access cover 4, as discussed below.

In FIG. 11, example dimension angles are provided as follows: GA=20 mm; GB=2 mm; GC=2 mm; GD=10°, GE=269 mm; GF=206 mm; GG=152 mm; GH=97.5 mm; GI=26 mm; GJ=46.5 mm; GK=144.2 mm; GL=23.8 mm; GM=2 mm radius; GN=2 mm; GO=8.1 mm; and GP=46.4 mm.

Figure 12:
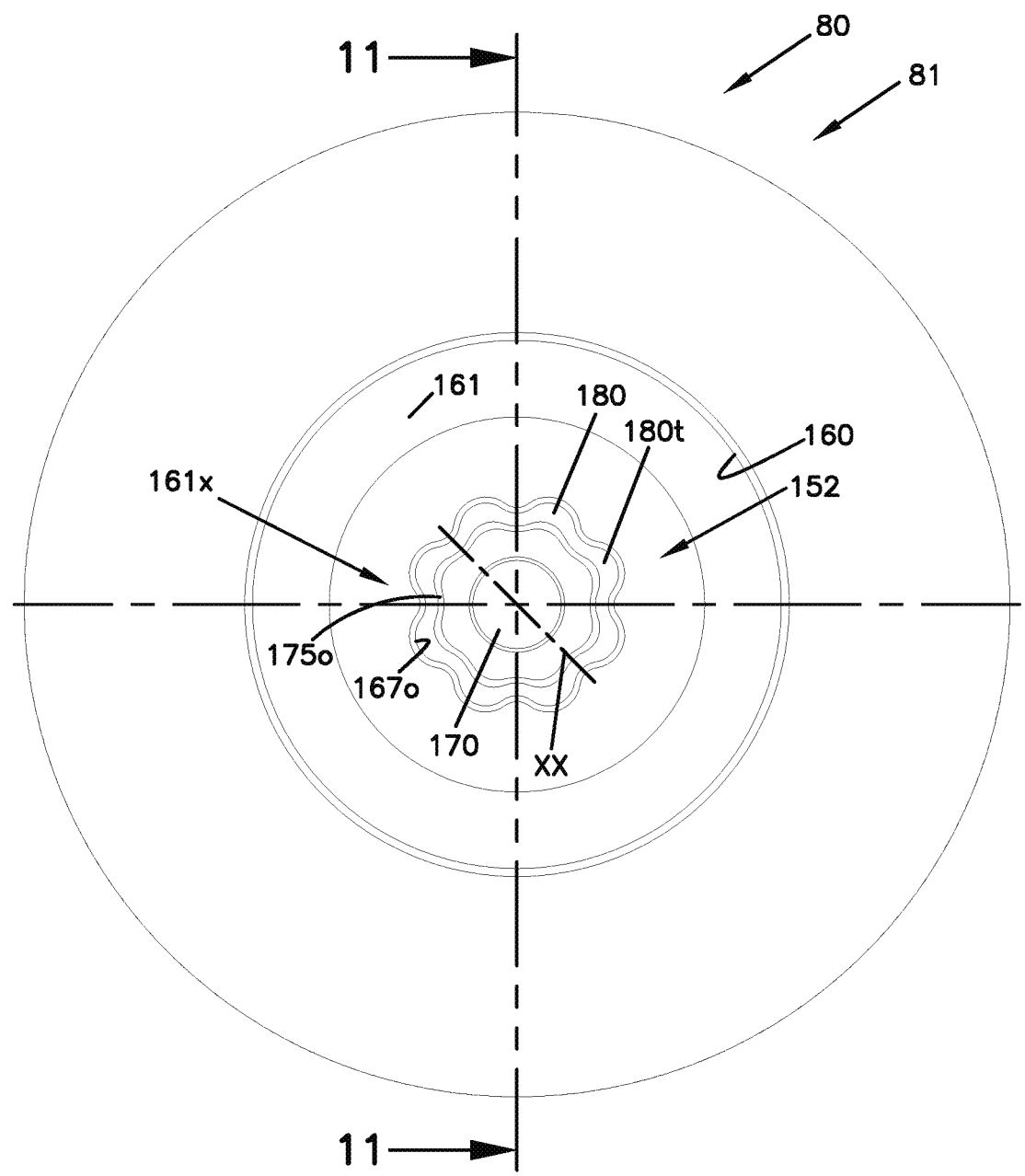
FIG. 12 is a schematic, outside end, view of the end cap member of FIG. 11.

In a typical example, the receiver groove 180 has a dimension such that a smallest internal dimension across a space ornregion surrounded by the receiver groove, as measured for example at XX, FIG. 12, is at least 10 mm, typically at least 15 mm and often at least 20 mm; for example, the example typically being with in the range of 20-40 mm, inclusive.

Attention is directed now to FIG. 12, a schematic, outer, plan view of pre-form 81, in particular directed towards surface 161$x$. Central groove 180 is viewable. It is noted that in FIG. 12, groove 180 is depicted in a simplified, schematic, view. Surfaces of walls 167$o$, 175$o$ can be seen from FIG. 11, to taper away from one another, from tip 180$t$ of groove 180 outwardly. Contour lines to depict this are not shown in FIG. 12.

Figure 13:
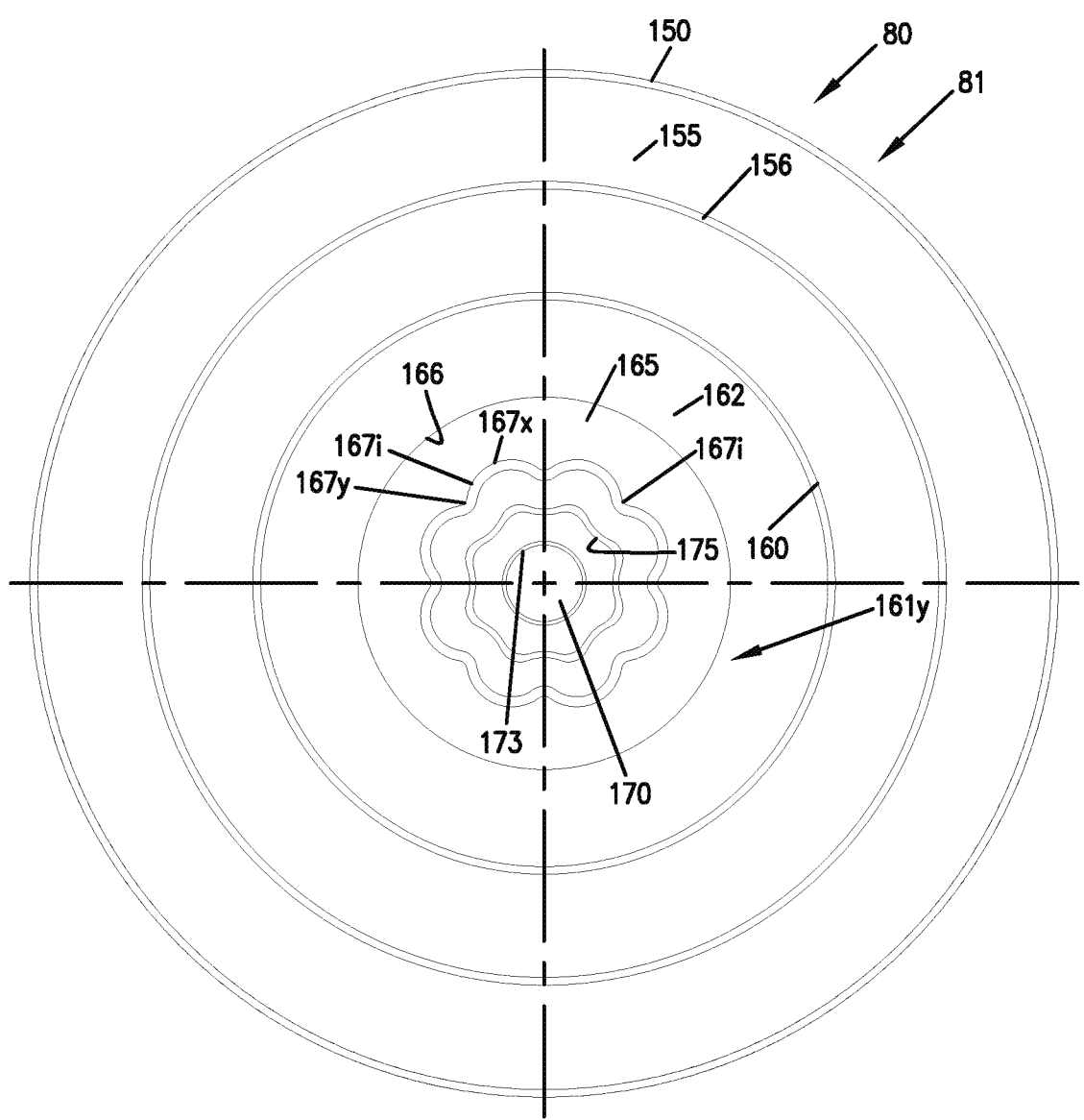
FIG. 13 is a schematic view of an inside surface of the end cap of FIG. 11.

In FIG. 13 an inside end view of end cap 80 is depicted, i.e., toward surface 161$y$.

Figure 14:
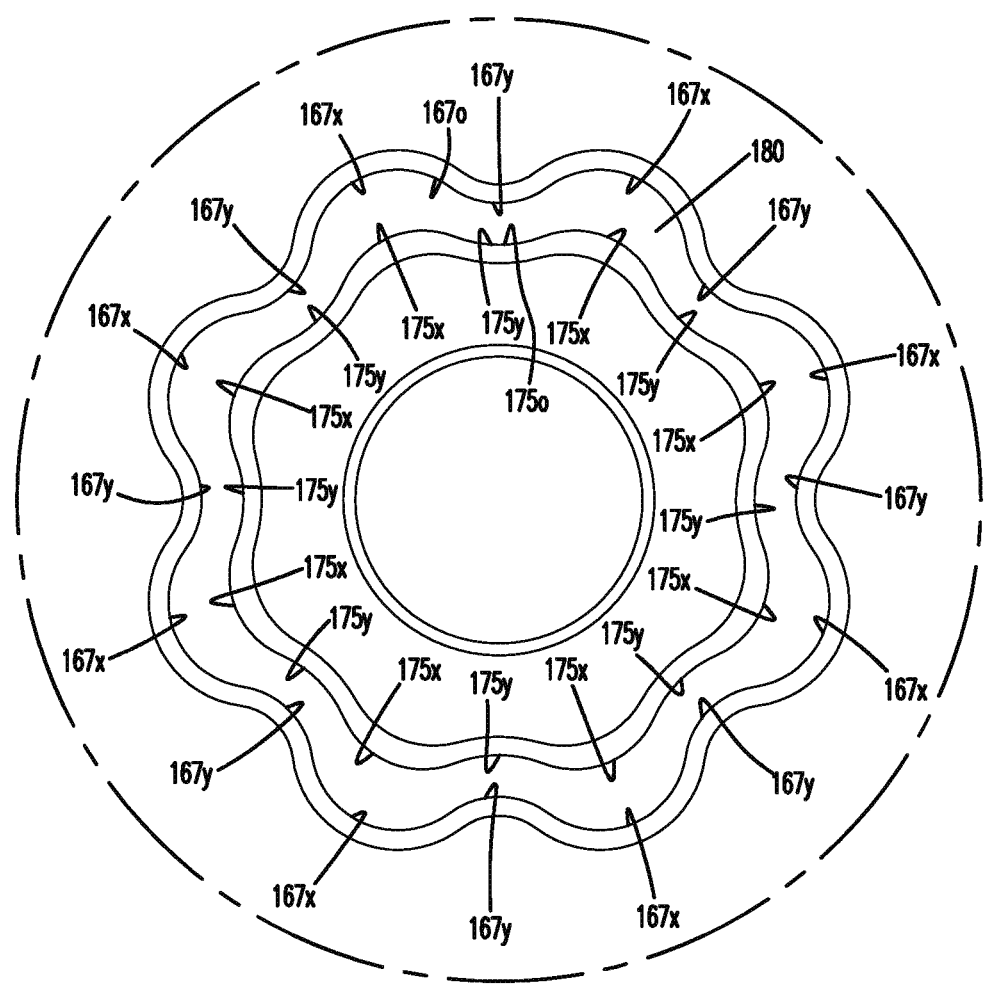
FIG. 14 is a fragmentary, enlarged, schematic view of a portion of the end cap depicted in FIG. 12.

Attention is now directed to FIG. 14, an enlarged, fragmentary, view of a portion of FIG. 12. Groove 180 can be viewed between walls 167$o$ and 175$o$. Wall 167$o$ can be seen to define a serpentine surface, with outwardly directed concave sections 167$x$ with inwardly projecting convex sections 167$y$. The inner surface 175$o$ can be seen define a serpentine wall with outwardly projecting convex sections 175$x$ and inwardly projecting concave sections 175$y$. In general, concave sections 167x are aligned with convex sections 175x; and concave sections 175y are aligned with convex sections 167y. The result is a serpentine groove 180. In a typical preferred application groove 180 is sized and shaped such that a continuous circular projection will not project into groove 180, but rather such that a continuous projection extending into groove 180 would preferably have a serpentine shape.

Figure 15:
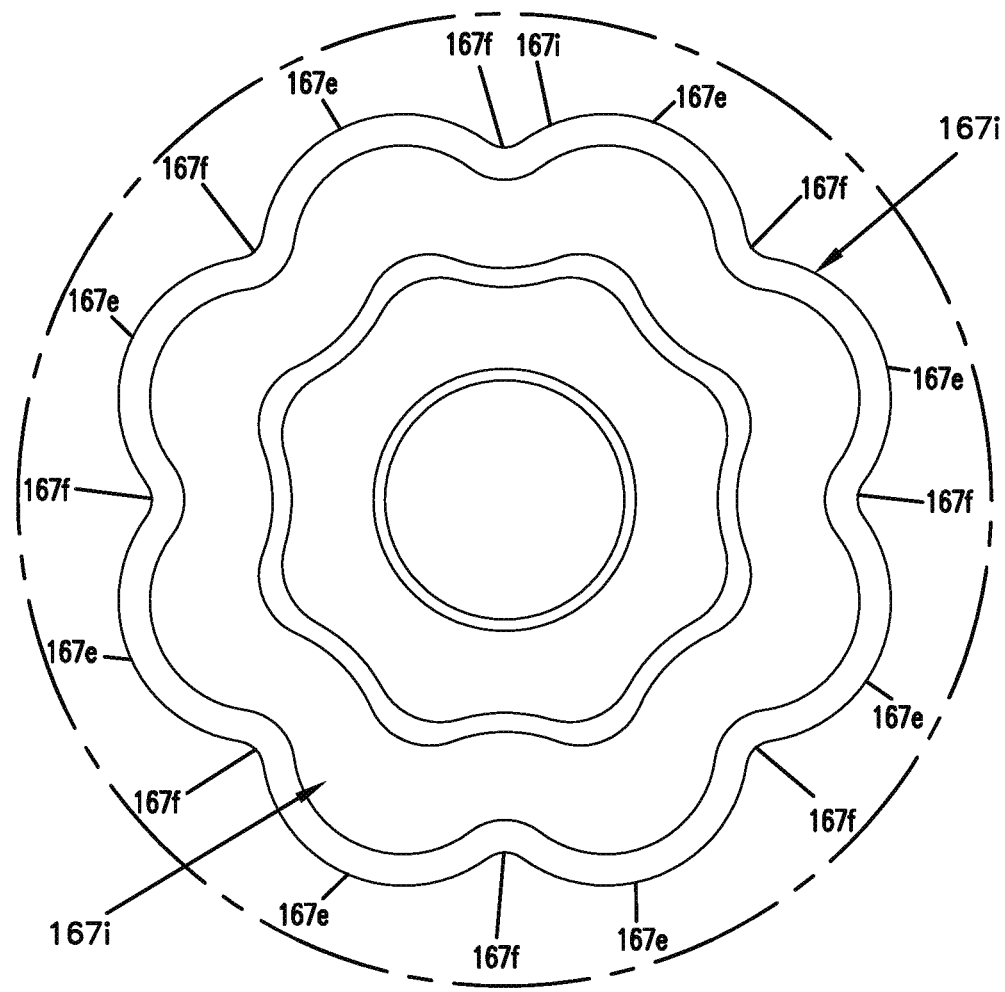
FIG. 15 is a fragmentary, enlarged, schematic view of a portion of the end cap depicted in FIG. 13.

In FIG. 15, an enlarged, fragmentary, view of portion surface 161y is provided. Inner surface 167i comprising convex sections 167e and concave sections 167f is viewable. This surface 167i is configured to engage surface 125x on support 55, as discussed previously.

Attention is now directed to FIG. 16. FIG. 16 is an outer plan view of access cover 4. That is, the view of FIG. 16 is generally in the direction of arrow 4x, FIG. 1. Access cover 4 includes a peripheral rim 4p and outer end surface 4b with central section 4c.

Figure 17:
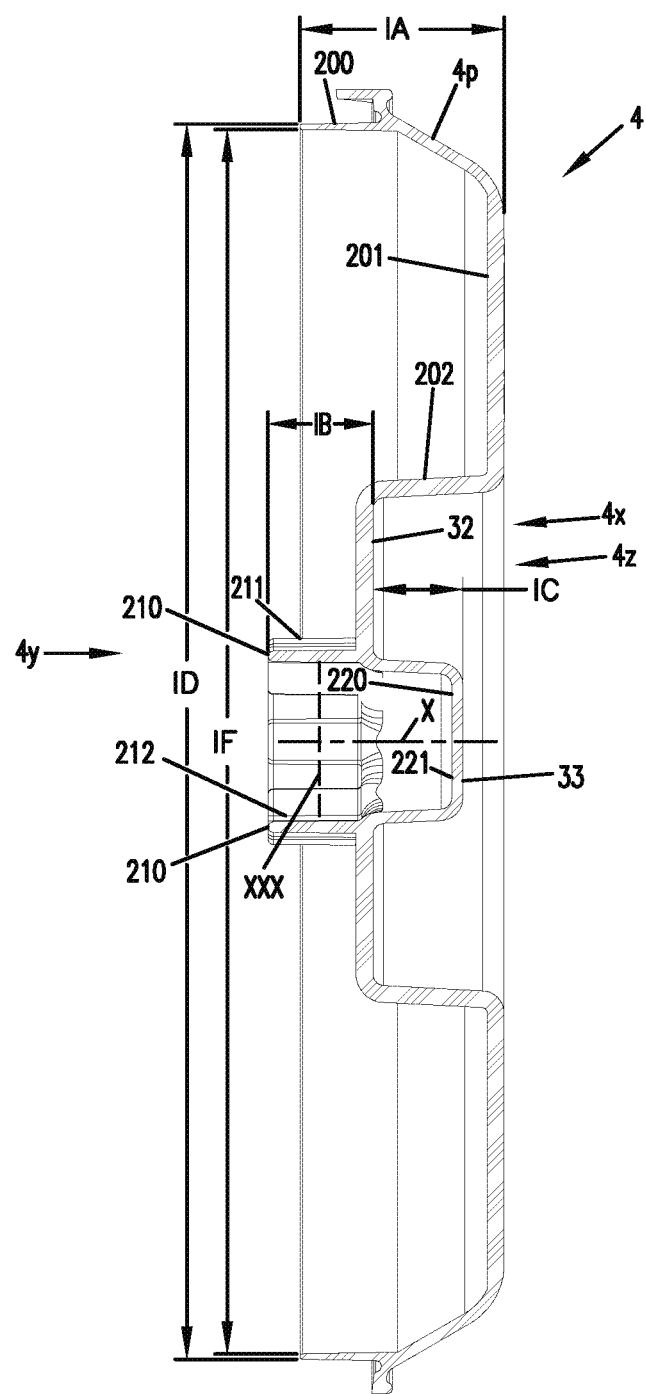
FIG. 17 is a schematic cross-sectional view taken along line 17-17, FIG. 16.

Referring to FIG. 17, access cover 4 is shown in cross-sectional view, taken generally along line 17-17, FIG. 16. Access cover 4 includes interior surface 4y, which faces in interior of housing 2; and, exterior 4z, which is opposite. Referring to FIG. 17, at peripheral rim 4p, access cover 4 includes perimeter rim section 200. Perimeter rim section 200 is sized and positioned to engage sidewall 10, during installation, FIG. 5.

Referring to FIG. 17, inner surface 4y comprises a surface which engages cartridge 40, during installation. Inner surface 4y includes outer ring section 201, which overlaps an end 50b of the media pack 50 during installation, of FIG. 5. Further, radially inwardly from region 201 is inwardly projecting wall 202. Inwardly projecting wall 202 generally projects into interior 60 of cartridge 40, during installation. Alternately stated, wall 202 is generally surrounded by end 50b of media pack 50, during installation.

Radially inwardly from wall 202, and on surface 4y, is provided projection 210. Projection 210 is sized and shaped to project within receiving groove 180, FIG. 11, during installation. The projection 210 is typically continuous in extension around axis X, although alternatives are possible. Further, projection 210 is typically solid (non-hollow) and typically includes no apertures therethrough.

The projection 210 has a radial outer surface 211 and a radial inward surface 212. For the example shown, the outer surface 211 is generally serpentine, comprising alternating outwardly convex and inwardly concave sections; and, inner wall 212 is generally serpentine having corresponding inwardly projecting convex and outwardly projecting concave regions, which alternate with respect to one another. Outwardly projecting convex sections of wall 211 are aligned radially with inwardly projecting concave sections of wall 212; and, inwardly projecting concave sections of wall 211 are radially aligned with inwardly projecting convex sections of wall 212.

As result of the serpentine shape to projection 210, in extension around axis x, the wall 210 is sized and shaped to be received within serpentine receiving groove 180, FIG. 11.

Typically the dimension across projection 210, between opposite portions of inner surface 212, is at least 10 mm, usually at least 15 mm often at least 20 mm, for example 20-40 mm inclusive. This dimension would correspond to dimension XXX, FIG. 17.

Due to the serpentine projection to groove 180, non-rotational engagement is obtainable. That is, when appropriately sized, cartridge 40 and access cover 4 are inhibited from rotating relative to one another, once projection 210 is extended into groove 180. Access cover 4 can be indexed to be mounted in a selected rotational orientation with respect to the housing side wall 10, to ensure that the rotational orientation of access cover 4 is such that projection 210 will extend into groove 180, when the cartridge 40 has been pre-positioned on support 55.

Still referring to FIG. 17, wall 210 surrounds central outer projection 220, which forms projection 33, FIG. 2. Central outer projection 220, in surface 4y, generally extends away from wall 11, FIG. 5, and defines a receiving space 221 for projection 170, FIG. 11.

Figure 18:
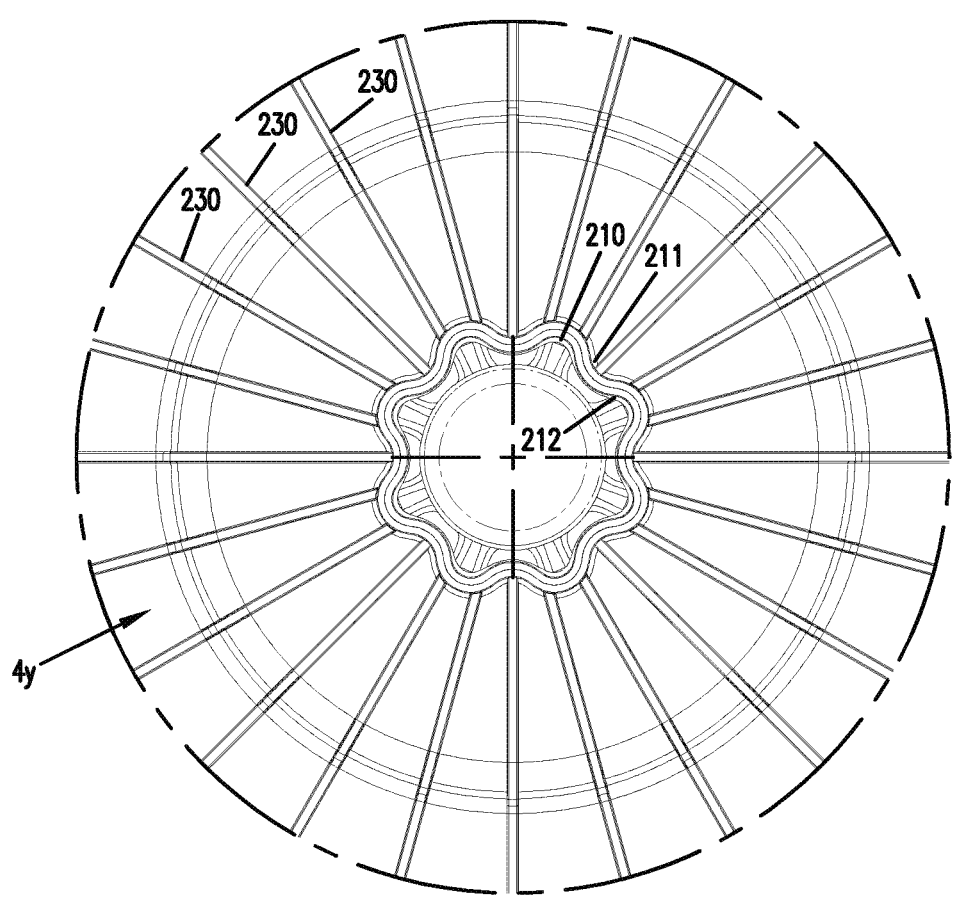
FIG. 18 is a fragmentary, schematic, view of a portion of an inside surface of the access cover of FIGS. 16 and 17.

In FIG. 18, a fragmentary plan view is provided of a portion of internal surface 4y. Projection 210 is viewable, as well as surfaces 211, 212. It is noted that surfaces 211, 212 generally converge toward one another in extension to tip 210t, FIG. 17; and diverge away from one another in extension therefrom.

In FIG. 18, reinforcing ribs 230 are viewable on surface 4y.

Figure 19:
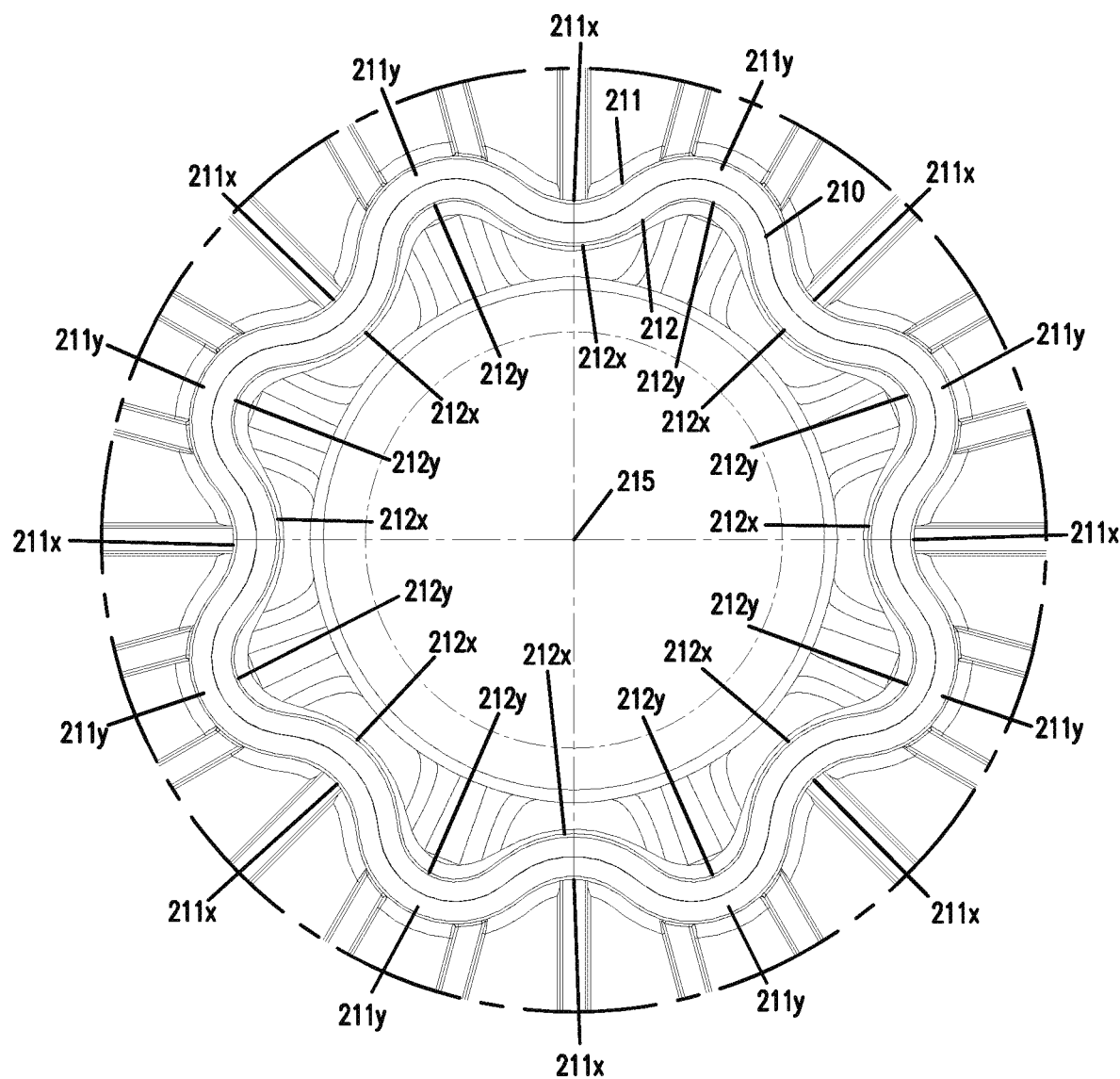
FIG. 19 is an enlarged, fragmentary, schematic, view of a portion of FIG. 18.

In FIG. 19 an enlarged, schematic, view of wall 210 is provided, to facilitate an understanding of the contouring or serpentine shape to surfaces 211, 212.

Referring to FIG. 19, outer surface 211 of projection 210 can be seen to comprise a serpentine shape with alternating contours comprising inwardly directed concave sections 211x and outwardly projecting convex sections 211y. Surface 212 can also be seen to be serpentine, having outwardly projecting concave sections 212y and inwardly projecting convex sections 212x. Each section 212x is aligned radially with a section 211x, and each section 212y is aligned radially with a section 211y. As a result, wall 210 has an 8 petal shape, with 8-fold radial symmetry around center 215.

Referring back to FIG. 17, example dimensions are indicated as follows: IA=54.5 mm; D3=28 mm; IC=24 mm; ID=329.9 mm; and IF=327 mm.

II. Advantageous Interaction Arrangements of Features of: The Central Cartridge Support 55: Main Cartridge 40; and, the Access Cover 4

From a review of the figures above, advantageous interaction among central cartridge support 55 (in housing body 3); main filter cartridge 40; and, the access cover 4 can be understood. In general, the features are as follows.

The cartridge 40 is positioned with an anti-rotational interaction with the support 55. This anti-rotational was depicted in FIG. 5A, and results from structure on outer surface 55x of end 55t (FIG. 8A) engaging structure on inner surface 161y of end cap 80. In particular, the anti-rotational interaction results from serpentine wall 125x of ring projection 125 extending around and engaging outwardly directed serpentine wall 167i, in surface 161y of end cap 80. As described, as a result of the serpentine engagement, cartridge 40 could readily be positioned in one of a plurality of selected rotational orientations relative to the central cartridge support 55, when the cartridge 40 is installed.

For the particular example system depicted, as a result of the serpentine shape comprising alternating convex and concave sections, there are eight rotational orientations for the cartridge 40 on the central cartridge support 55. An alternate number is possible.

Thus, among other things, the anti-rotational engagement between the cartridge 40 and the support 55, ensures that the cartridge 40 is secured in only one of certain pre-selected orientations for engagement with the access cover 4.

Access cover 4 includes projection 210 which extends into a groove 180 defined in outer surface 161x end piece or cap 80. Projection of the projection 210 into the groove 180 provides that the access cover 4 supports cartridge 40 against undesirable levels of cantilevered motion of end 50b, i.e., the adjacent end piece 80. That is, the cartridge end 50b will not undesirably move, FIG. 5A, in either an up-down or in-out motion (or mix thereof) relative to the viewer. The amount of motion allowed, will depend upon the relative thickness of the projection 210 and the width of the groove 180. Typically they are selected to allow only minimal motion, i.e., that amount of clearance which allows for ease of assembly.

It is noted, then, that for the example shown the cartridge 40 is supported at media pack end 50b against undesirable levels of cantilevered motion, without any portion of the access cover 4, other than perimeter region 30 and projection 200 surrounding the media pack end 50b, i.e., with no portion surrounding the media pack 50b that also engages cartridge 40, i.e., the media pack 50. Alternately stated, the cartridge 40 is not supported at end 50b by support around the exterior of the cartridge 40, but rather only interiorily.

For the support, preferably the projection 210 extends into groove 180 a distance of at least 5 mm, usually at least 12 mm, and typically in the range of 15 to 30 mm.

Preferably groove 180 has a width, along its depth of extension, of no greater than 10 mm, typically no greater than 9 mm and usually within the range of 4 to 7 mm. Preferably the groove 180 is at least 6 mm deep, usually at least 12 mm deep and typically within the range of 12-25 mm deep.

In a typical application, radial outer wall 167o of groove 180 is positioned at least 20 mm, usually at least 30 mm, from the media pack 50.

Preferably the thickness of projection 210, along its length, is at least 1 mm, typically at least 1.5 mm and usually within the range of 1.5 to 4 mm.

With these example dimensions, the projection/receiver arrangement comprising projection 210 and groove 180 will be convenient to protect cartridge 40 against cantilever motion.

In addition, serpentine outer surface 211 of projection 210 will engage surface 167o on projection 167 in a manner inhibiting relative rotation between access cover 4 cartridge 40. Indeed, an overall anti-rotational arrangement is created by the sandwiching of wall 167 between surface 125x and surface 211.

The above-described interactions provide support for cartridge 40, at media pack end 50b against cantilevered motion; and, for support of cartridge 40 against rotational movement, once installed.

In addition, arrangements as described herein are usable to help ensure that the installed cartridge 40 is a selected, preferred cartridge 40 for the air cleaner assembly 1. Referring to FIG. 5A, projection 33 in access cover 4, acts a receiver 33r for projection 170 in cartridge 40. Projection 170 on cartridge 40 acts, along an inside surface, as a receiver for projection 126, on support 55. These features, combined with: projection 210 being received in groove 180; and, projection 180p, (which defines groove 180, being received within receiver 130 between ring projection 125 and projection 126, on central cartridge support 55) form an arrangement inhibiting installation in an inappropriate or unapproved cartridge 40 with an interior 2i of housing body 2, for use. To facilitate this, preferably projection 170 extends into receiver 33r a distance of at least 10 mm, usually within the range of 15 mm to 50 mm, inclusive; and, projection 126 extends into receiver 170 a distance of at least 10 mm and usually 15 to 50 mm, inclusive.

Typically, receiver groove 168 formed between walls 167, 166, FIG. 11, is at least 10 mm wide, usually at least 20 mm wide, and often within the range of 20-30 mm, inclusive, wide. It is typically not more than 40 mm wide.

It is further noted that the various interactions described, help ensure that the cartridge 40 is properly installed within the housing 2, in particular, as the cartridge 40 is installed, engagement with the housing central support 55 occurs. This helps ensure that the cartridge 40 is properly aligned along its length, within the housing body 3. When the access cover 4 is positioned, further engagement occurs, again ensuring that the cartridge 40 is properly longitudinally aligned around access X within the housing body 2.

Also, the access cover 4 will typically not readily be installed in the housing side wall 10, unless the cartridge 40 is properly sealed in position.

III. The Optional Safety Element 41

Referring now to FIG. 5A, mounting of the optional safety element 41 will be reviewed. End piece 91 has an internal aperture 92 which fits over wall 125c of ring projection 125. The cartridge end piece 80 includes a ring projection directed inwardly, identified at 240. The ring projection 240 engages end 91e of end piece 91 to inhibit safety element 41 from moving toward access cover 4, once installed.

Safety element 41 does not include, in the example shown, an end cap at an opposite end from end 91. Rather, being conically shaped in the example shown, the media 41 is pushed over conical support 55 until a snug engagement is obtained.

It is noted that the configuration depicted, provides for a support of cartridge 40 by internal cartridge support 55, whether optional safety cartridge 41 is present or not. This is advantageous, since it allows, in use, for the optional presence or absence of the safety filter 41.

IV. A Third Embodiment, FIGS. 20-31

In FIGS. 20-31, a further alternate embodiment of the principles of the present disclosure is shown. The general principles of operation remain the same; however, certain specific details are modified, as described.

Figure 20:
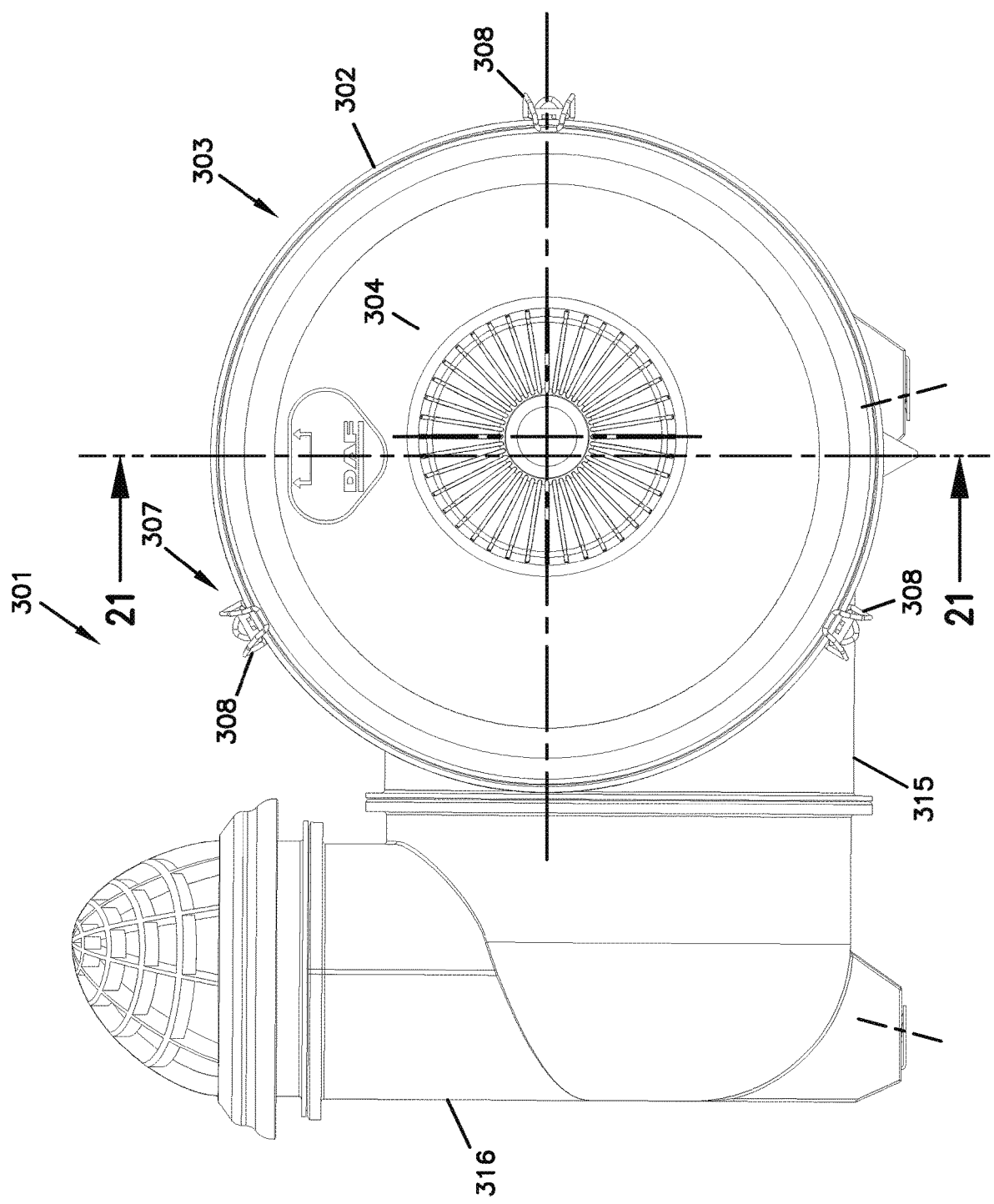
FIG. 20 is schematic end elevational view of a third embodiment of an air cleaner according to the present disclosure.
Figure 21:
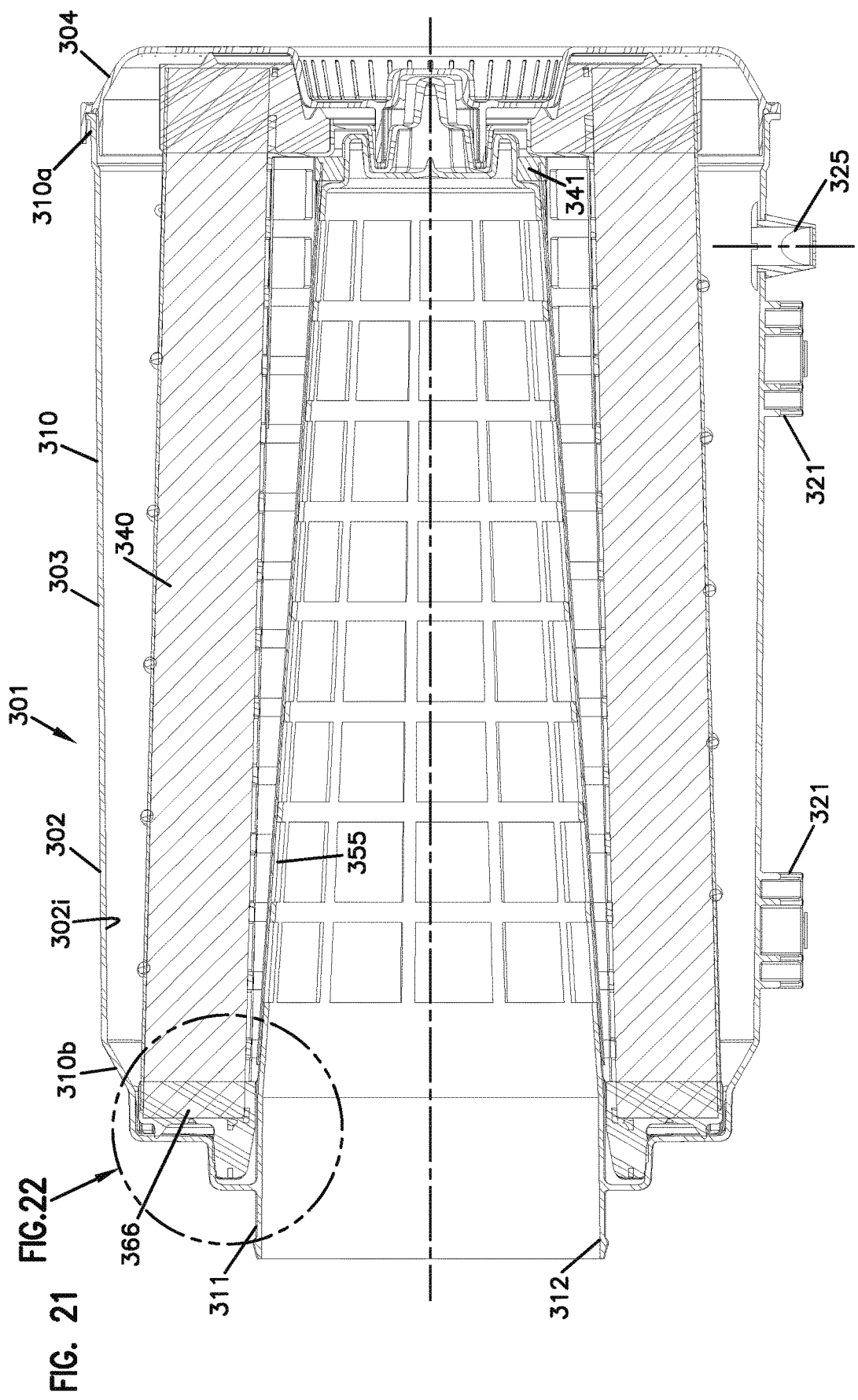
FIG. 21 is a schematic, cross-sectional view taken along line 21-21, FIG. 20.

Referring to FIG. 20, reference 301 generally indicates the air cleaner assembly. The air cleaner assembly 301 includes housing 302 comprising a housing body of 303 and access cover 304. The access cover of 304 is secured in place on the housing body 303 by a connection arrangement 307 comprising latches 308. Referring to FIG. 21, the housing body includes a side wall 310 having a first open end in 310a over which access cover 304 is mounted. Opposite the first end 310a, the housing side wall includes a second end 310b having a housing end wall 311 thereon, with air flow aperture 312 therethrough.

It is noted that in the depiction of FIG. 21, that latches 308 are not shown mounted.

Referring to FIG. 20, the air cleaner 301 includes an air inlet aperture arrangement 315 receiving air from inlet assembly 316.

Referring to FIG. 21, the assembly includes mounting pads 321 and evacuator valve arrangement 325.

Further, the assembly, 301 includes a cartridge support 355 and safety cartridge 341.

The components thus far described, can be, in general, the same as those previously described with respect to first and second embodiments discussed. In this context, like characterized features have similar function and operation.

Indeed, air cleaner body and access cover 303, 304 can be the same for air cleaner assembly 301 as for assembly 301, FIG. 6, or assembly 1, FIG. 1, depending on the specific application of principles.

Still referring to FIG. 21, cartridge 340 is depicted mounted within interior 302i of housing 302. Cartridge 340 can be the same as cartridge 40, FIG. 5 except modified as described. In particular, end cap 366, FIG. 21, is modified from end cap 66, FIG. 5, and end cap 367 is modified from end cap 80.

Figure 22:
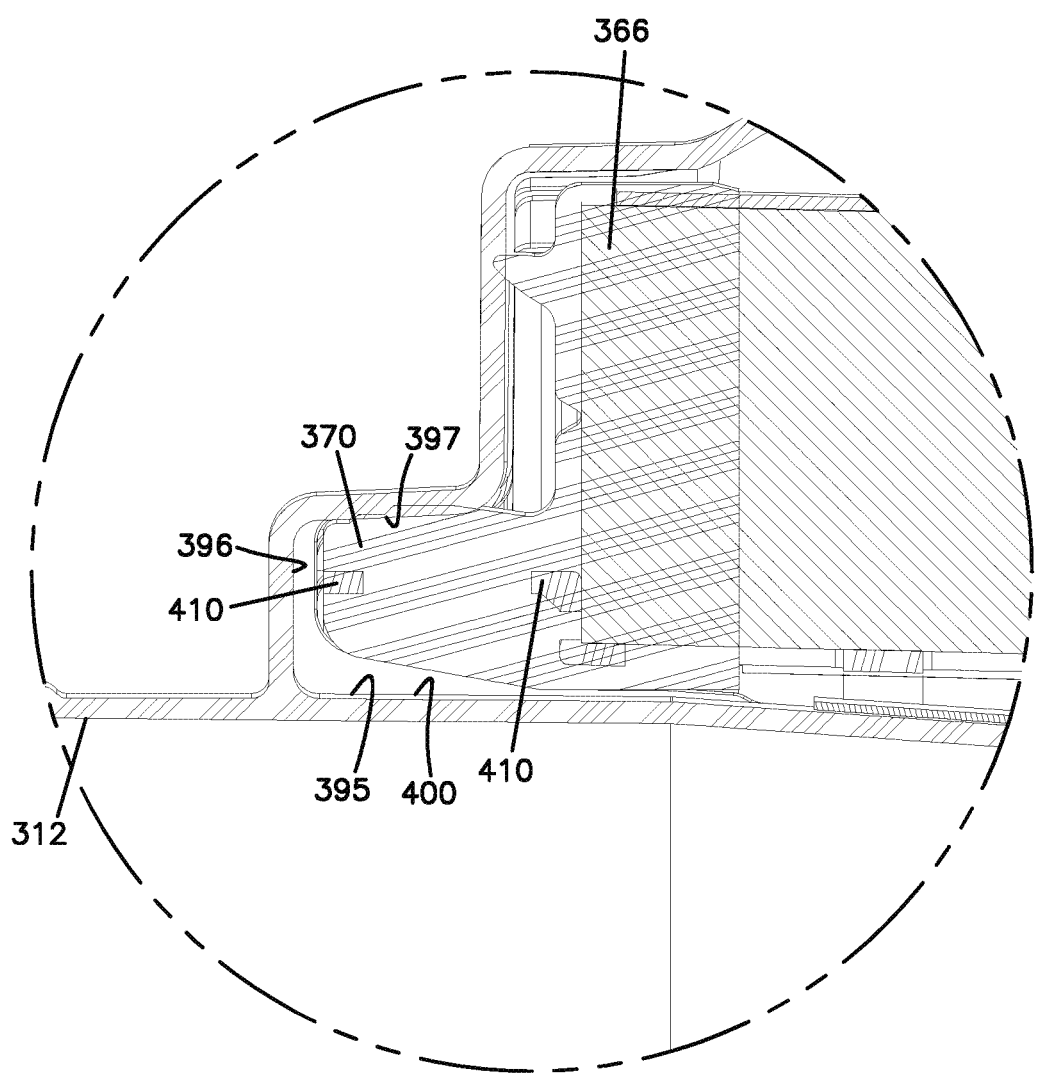
FIG. 22 is an enlarged, fragmentary, schematic view of a portion of the assembly depicted in FIG. 21.

Referring to FIG. 22, end cap 366 is molded in place and includes seal projection 370 thereon molded integral therewith. Seal projection 370 engages, and seals against wall 397, of pocket 396.

Pressure of the seal projection 370 against wall 397, to form the outwardly directed peripheral radial seal at end cap 366, is provided by a seal support member 410 embedded within projection 370. Projection 410 is discussed further below, in connection FIGS. 29-31.

Figure 23:
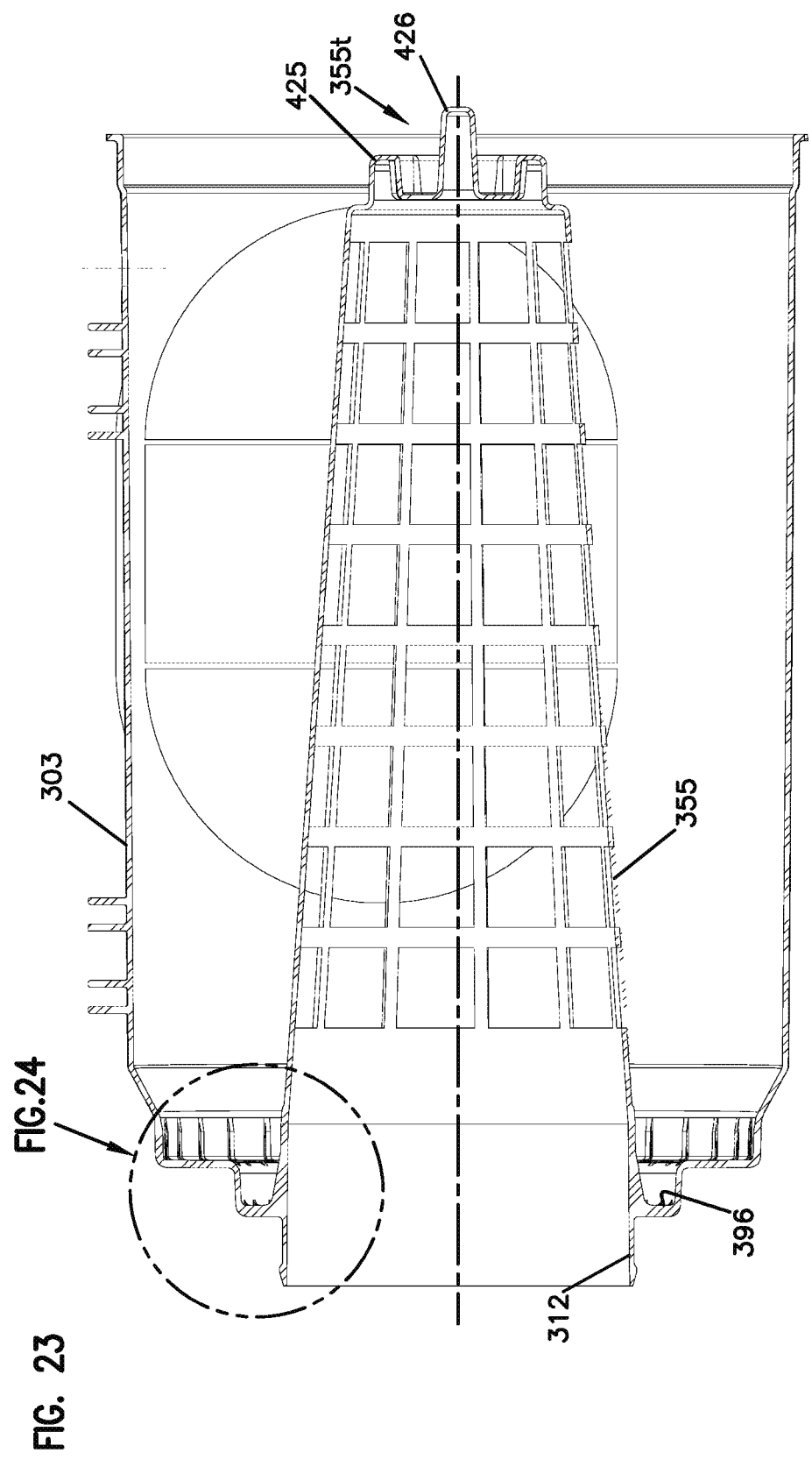
FIG. 23 is an enlarged, schematic, cross-sectional view of a housing body component of the air cleaner depicted in FIG. 20; the view of FIG. 23 being generally along line 21-21, FIG. 20.

In FIG. 23, housing body 303 is depicted. It can be seen that support 355 and support end 355t can be generally analogous to analogous features described previously, in connection with embodiment of FIGS. 1-5.

Thus, end 355t includes ring projection 425 and central projection 426.

Figure 24:
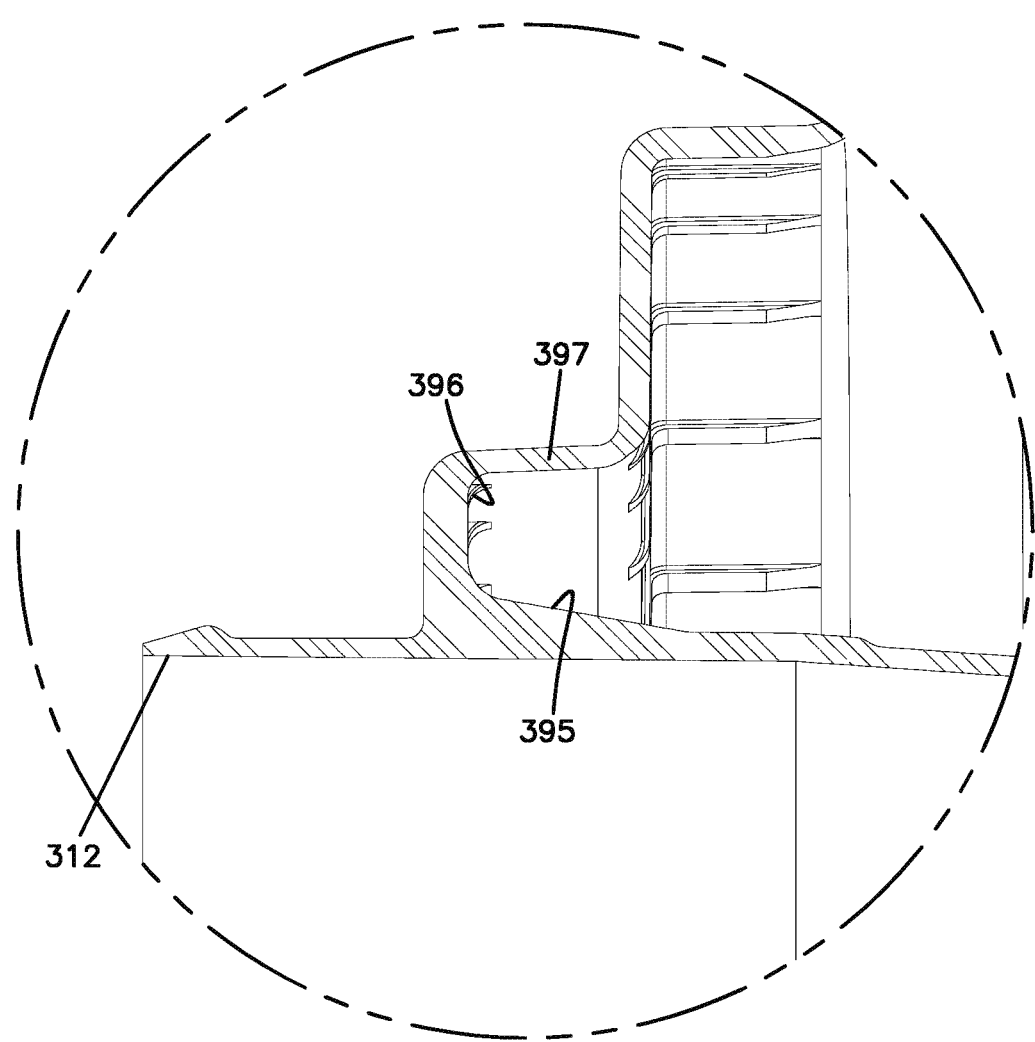
FIG. 24 is an enlarged, fragmentary, schematic view of a portion of FIG. 23.

In FIG. 24 an enlarged, fragmentary, portion of FIG. 23, is indicated. Here pocket 396 with opposite walls 397 and 395 is viewable.

Figure 25:
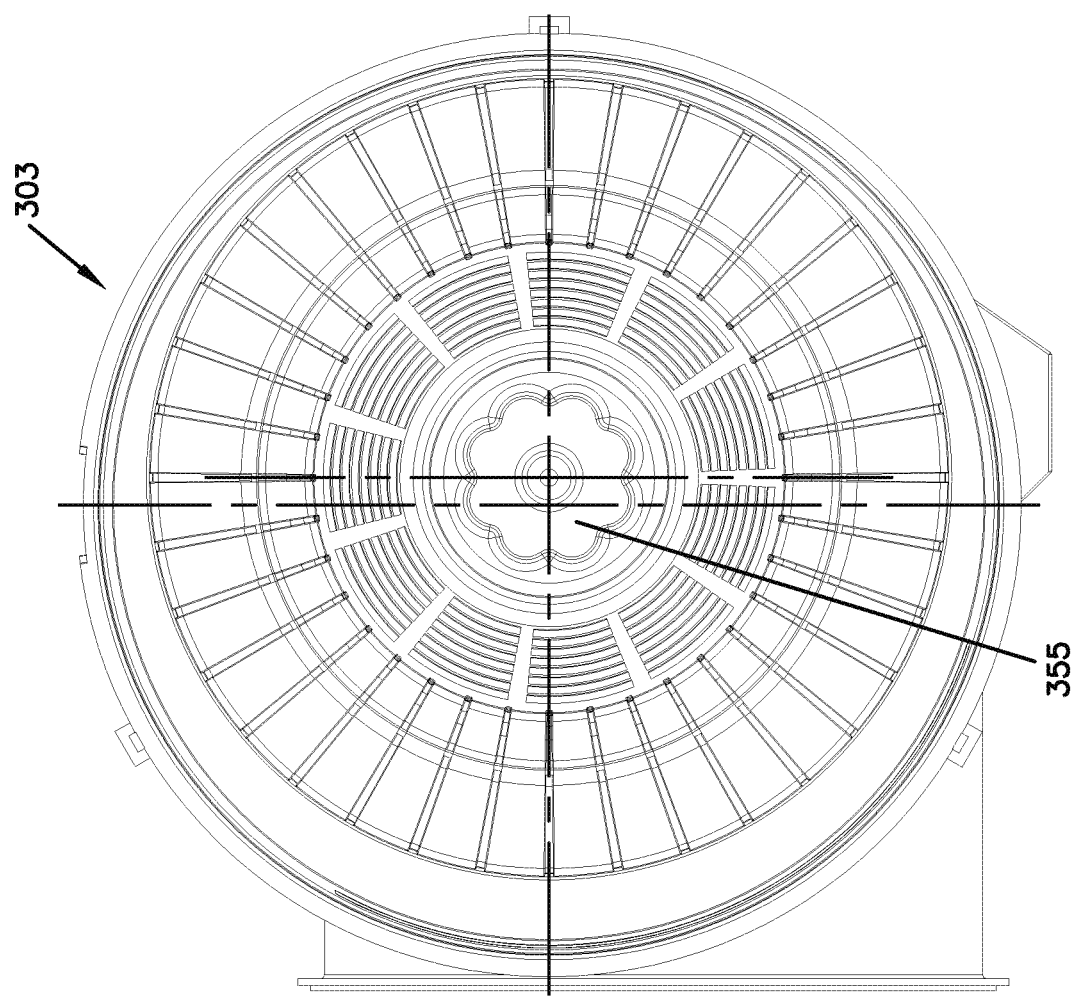
FIG. 25 is an elevational view of the housing body of FIG. 23.

In FIG. 25 an end view of housing body 303 is shown, with access cover 304 removed.

Figure 26:
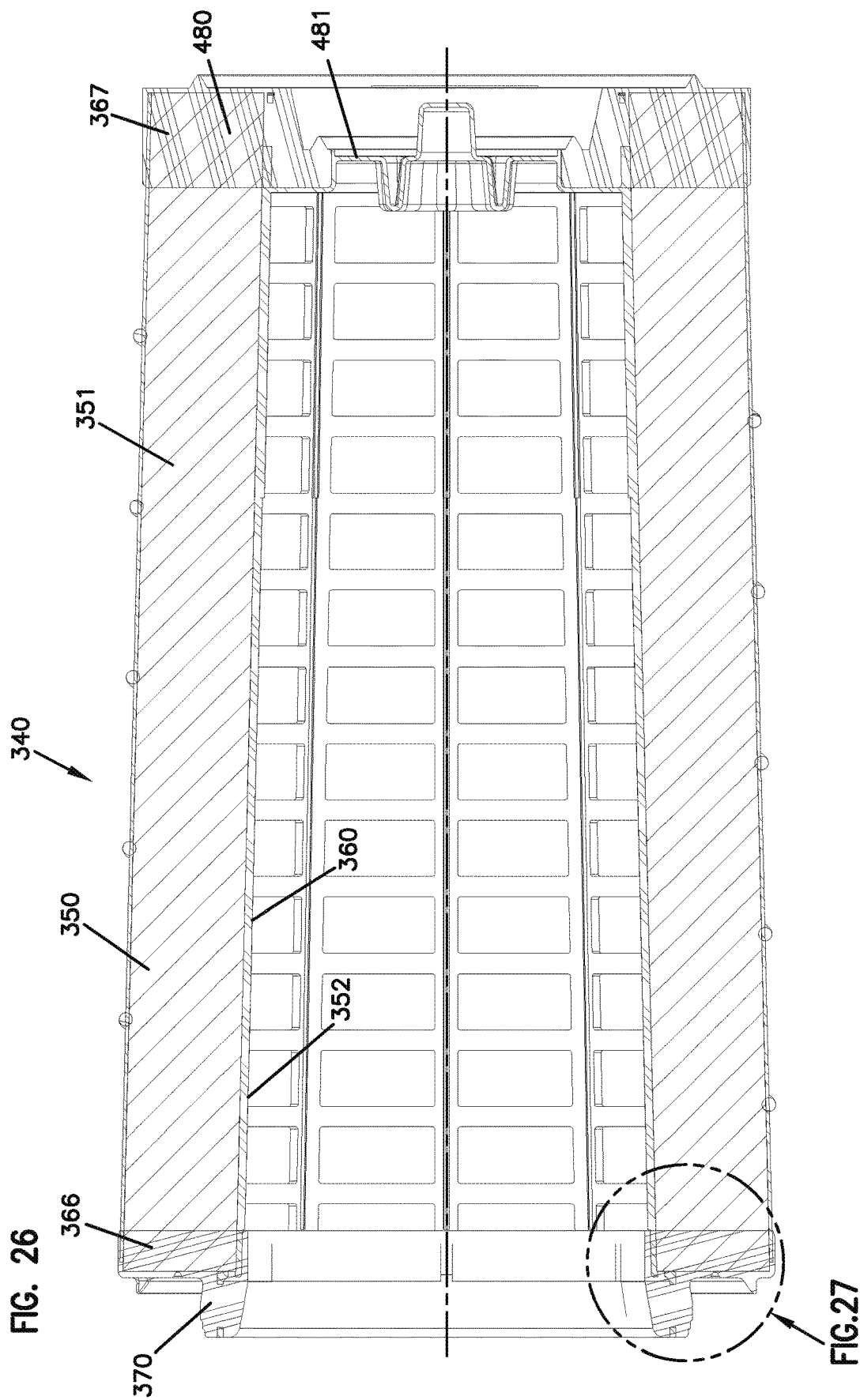
FIG. 26 is schematic, enlarged, cross-sectional view of a filter cartridge component of the assembly depicted in FIGS. 20 and 21.

In FIG. 26, cross-sectional view of cartridge 340 is depicted. The cartridge 340 comprises a media pack 350 including media 351 surrounding an inner liner 352 to define open interior 360. The inner liner 352 extends between end cap 366 and 367. For the embodiment, end caps 366 and 367 are both molded into place, each typically comprising molded foamed, compressible, polyurethane. Liner 352, is embedded in and extends between the end caps 366 and 367. Seal projection 370 is integral and molded as part of end cap 366.

Figure 27:
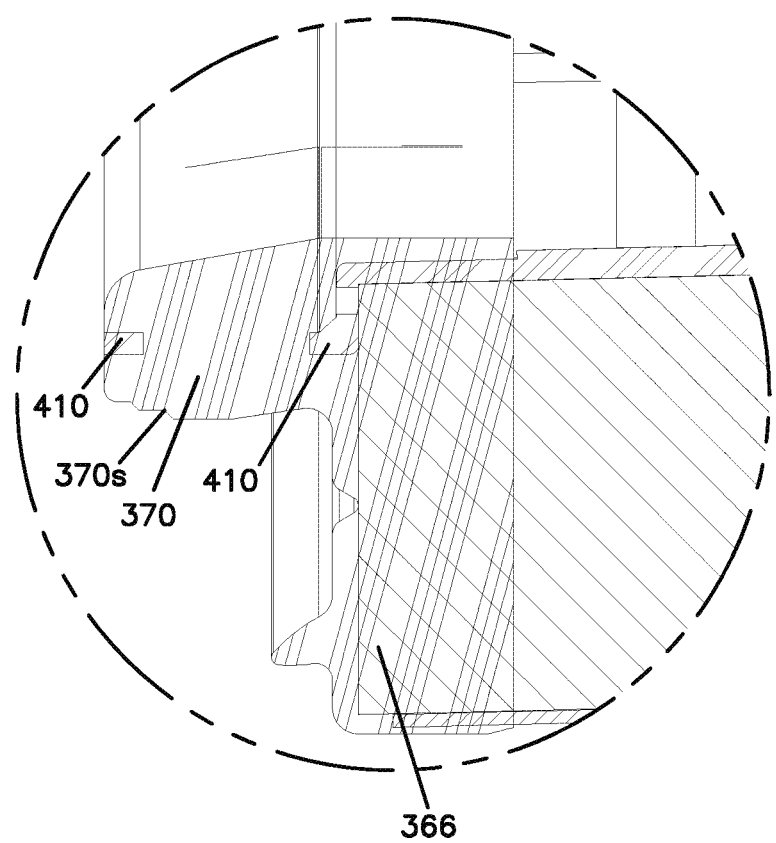
FIG. 27 is a schematic, enlarged, fragmentary view of a portion of FIG. 26.

FIG. 27 is a enlarged, fragmentary view of a portion of FIG. 26. Here projection 370 molded integral with a remainder of end cap 366, is viewable. Further projection 410, embedded in projection 370 can be seen. Projection 410 is part of liner 352 and will provide support to seal member 370 along sealing surface 370s during installation of the cartridge 340 into the housing 302.

Figure 28:
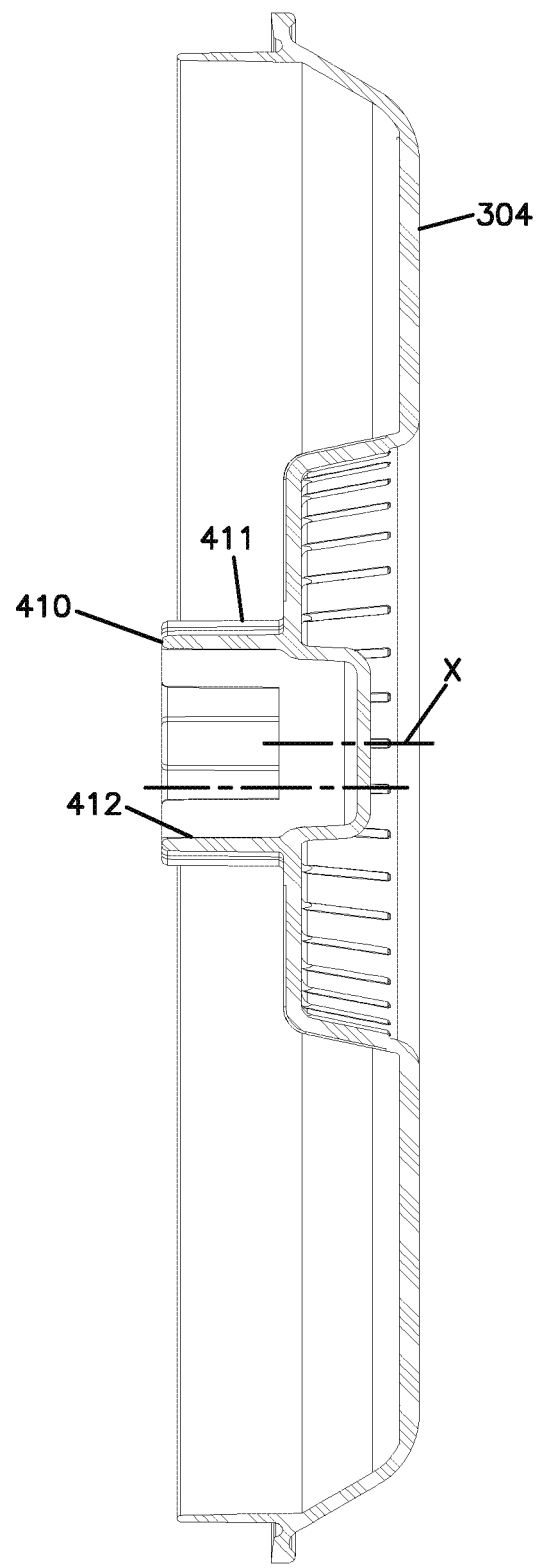
FIG. 28 is a side, cross-sectional view of an access cover component usable in the assembly FIG. 21.

Attention is now directed to FIG. 28, in which access cover 304 is depicted. Access cover 304 can be seen to include a projection 410 with a serpentine outer surface 411 and a serpentine inner surface 412. Access cover 304 can be identical to access cover 4, FIG. 17.

Attention is now directed to FIG. 29, in which liner 352 is depicted. Liner 352 can be seen to include media support section 450 extending between ends 451 and 452. Media support section 450 comprises longitudinal strips 455 and cross strips 456 defining apertures 457 for air flow.

At 451, support 450 includes a seal support region 410 integral with the remainder of 450. The seal support region 410 comprises a region of larger diameter than immediate adjacent portion 450a of support 450. Thus, outwardly extending shoulder 410b is adjacent to region 410 between region 410 and media support section 450. Region 410 includes a plurality of apertures 410a therethrough. When embedded in end cap 366, during molding of end cap 366, end cap material can flow through apertures 410a, engulfing support 410 within the projection 370, FIG. 27. The framework at end 451 will provide seal support.

It is noted that shoulder 410b will provide a media stop to the media 351, when positioned around media support 450. That is, shoulder 410b will extend across an end of the media 351, during assembly, for convenient support of the media 351.

At end 452, an extension 470 which will be embedded within end cap 367 is shown. Extending across end 452, and surrounded by support 470, is provided an end piece 490 with a configuration analogous to central portions of end cap 151, FIG. 11. Thus, serpentine receiving groove 500 and central projection receiver 401 are present.

Thus, it will be understood that end cap 367 comprises a composite end cap including a molded-in-place outer ring portion, FIG. 27, and a central portion 481 comprising preformed material having an appropriate configuration for the anti-cantilevered and anti-rotational support; in this example the central portion 481 being integral with liner 352.

Figure 31:
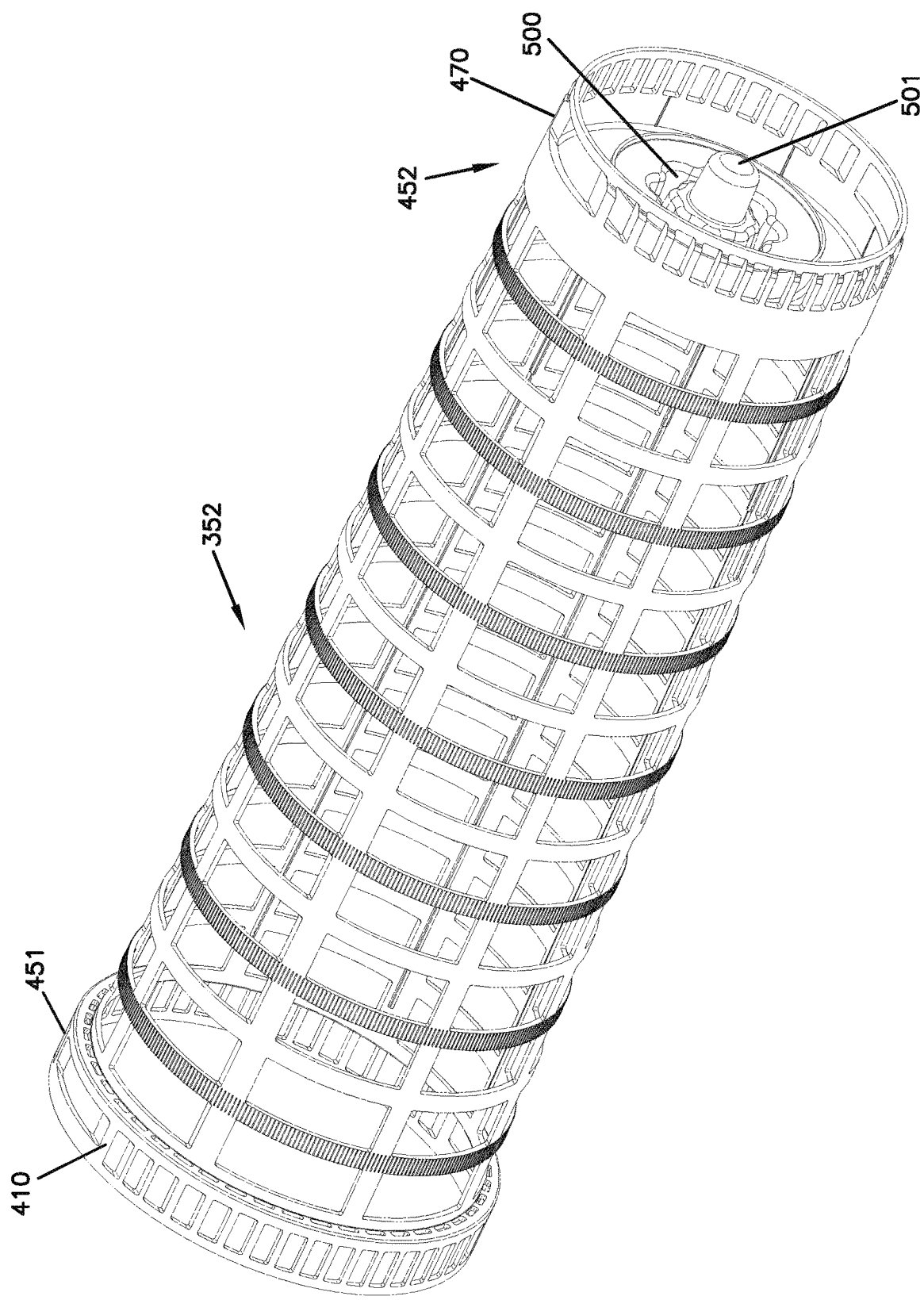
FIG. 31 is a perspective view of the component depicted in FIG. 30.

In FIG. 30, an enlarged, fragmentary view of a portion of FIG. 29 is shown. In FIG. 31, a perspective view of support 352 is shown.

In FIGS. 29-31, example dimensions are as follows: ZA=180 mm; ZB=154.1 mm; ZC=9.5 mm; ZD=4.5 mm; ZE=203.4 mm; ZF=1 mm; In FIG. 30: ZG=29.5 mm; ZH=19.32 mm; ZI=4.5 mm.

V. Concluding Review

Herein, in previous descriptions and in the presented figures, air cleaner assemblies and components are described and shown in detail. There is no specific requirement that an air cleaner assembly or component include all of the features characterized described herein, in order to obtain some benefit under the principles of the present disclosure.

According to one aspect of the present disclosure, an air cleaner assembly is provided. The air cleaner assembly includes a housing and a serviceable primary filter cartridge positionable within the housing and removable therefrom, without damage to the housing or the serviceable filter cartridge. An optional safety element is also provided.

The housing generally includes a housing body and an access cover. The housing body includes a sidewall and a central cartridge support. The sidewall generally defines a housing body interior. The housing body typically includes an end wall with an air flow aperture therethrough, and an open end opposite the end wall. The central support extends from a support base surrounding the air flow aperture in a direction toward the housing open end.

In general, the housing end wall and the open end, are at opposite ends of the housing side wall.

In a typical arrangement, the housing includes an air inlet arrangement. In an example shown, the inlet arrangement is an air inlet flow aperture in a side wall of the housing body. Thus, in a typical application, the flow aperture in the side wall is an inlet flow aperture, and the air flow aperture in the end wall is an outlet aperture, for out-to-in flow with respect to a receive filter cartridge, during use. It is noted, however, that many of the principles described herein can be used in association with in-to-out flow (opposite flow) if desired, in some applications.

The central cartridge support includes a support end remote from the base. The support end remote from the base includes a first (ring) projection spaced from, a second (central) projection to define a receiving space therebetween. For the particular example system shown, the first projection is an outer ring projection that extends around, (in the example shown continuously) the second projection (which is a central projection). Each of the first ring projection and the second central projection generally project in a direction away from support base and the end wall.

Typically, the ring projection extends at least 5 mm, usually 7 mm, and often an amount within the range of 7 to 25 mm, inclusive, from immediately adjacent portions of the support end; and the central projection extends at least 10 mm, usually 15 mm, and often an amount within the range of 18 to 40 mm, inclusive, from immediately adjacent portions of the support end.

In the example shown, the second, central, projection projects outwardly from the open end of the side wall.

The serviceable primary air filter cartridge is positioned within the housing body interior. The air filter cartridge comprises a media pack surrounding an open filter interior and extending between first and second end caps. The first end cap is an open end cap with a central aperture therethrough. The cartridge is positioned with the central cartridge support on the housing projecting through the open central aperture of the first end cap and into the open filter interior.

A housing seal is positioned at the first end cap. Typically, the housing seal is molded integral to the first end cap, for example from foamed polyurethane, although alternatives are possible. The housing seal can be configured, for example, as a radial seal, either inwardly or outwardly directed. In a specific example shown, the housing seal is a projection extending axially away from the remainder of the first end cap, in a direction away from the media pack; and, the housing seal includes a radially outwardly directed radial seal surface. In examples shown, an embedded support is provided in the housing seal. The embedded support can comprise a portion of an inner liner. In some instances it can also form an end stop for the media. Alternate housing seal arrangements are possible.

The second end cap is a closed end cap including an inner surface with a central receiver projecting away from the first end cap. The central receiver projecting away from the first end cap, in the second end cap, receives the central projection of the cartridge support projecting therein, when the cartridge is installed.

The inner surface of the second end cap also typically includes a first ring receiver which surrounds, and is spaced from, the central receiver. The first ring receiver in the second end cap is configured to receive, projecting therein, the ring projection of the housing central cartridge support, when the cartridge is installed in the housing. In am example such arrangement, an inwardly projecting wall or section of the first end cap separates the ring receiver and the central receiver.

The second end cap of a depicted embodiment includes an outer surface with a receiving groove therein. In the example, the receiving groove is positioned opposite the inwardly projecting section of the inner surface located between the ring receiver and the central receiver; i.e., the receiving groove is formed on the outer surface of the end cap by structure surrounding the central receiver in the inner surface.

The serviceable primary air filter cartridge is positioned in the housing body interior with: the housing seal of the primary air filter cartridge sealed to a portion of the housing body; the central cartridge support projecting through the first end cap open aperture and into the open filter interior; and, with the central projection on the support end of the housing body support projecting into the central receiver on the second end cap. Typically, a first ring projection on the support end of the central cartridge support also projects into the ring receiver on the second end cap.

An access cover is secured over the open end of the housing body. The access cover includes an inside surface with a first ring projection. The access cover is positioned with the first ring projection on the inside surface projecting into the receiving groove on the outer surface of the second end cap of the primary filter cartridge.

In typical arrangements, the first end cap is a molded-in-place end cap, for example from polyurethane foam. The second end cap is typically either a pre-formed end cap, for example from metal or plastic, to which the media pack is secured by an adhesive or potting arrangement; or; a composite end cap comprising a central preform section secured to the media pack by a molded-in-place ring. In the latter instances, the central preform section can comprise a portion of a cartridge media support liner.

The housing seal on the first end cap is typically formed integral with the end cap, and may comprise a radially directed seal. Either outwardly directed or inwardly directed radial seals are possible.

In example arrangements described, housing seal arrangement is provided which includes a seal projection integral with the remainder of the end cap. The seal projection includes embedded therein, a seal support. Seal support can comprise of portion integral with media inner liner. In example, the support embedded within the seal projection is not only integral with a media inner liner, but defines a support shoulder or end stop for an end of the media, embedded in the end cap.

In a typical assembly, the outer surface of the second cap of the primary filter cartridge includes a central outward projection thereon. This central outward projection defines, on an inside surface thereof, a central outwardly projecting receiver.

Typically, the access cover includes an inner surface with an outwardly projecting receiver. The outwardly projecting receiver on the inside surface of the access cover receives, projecting therein, the central outward projection of the second end cap of the primary air filter cartridge.

In some applications of the techniques described herein, the air cleaner assembly includes serviceable safety or secondary filter having a first end cap and an extension of media secured to the first end cap. The first end cap includes a central aperture therethrough. The secondary filter is positioned within the open filter interior of the primary air filter cartridge, with the media of the secondary filter surrounding positioned against the central cartridge support. The central aperture of the second air filter first end cap is sized and positioned around a portion of the support end of the central support, with ring projection of the central support projecting therethrough.

In an example described, the first ring projection on the access cover inner surface has a serpentine inner wall surface and a serpentine outer wall surface. Further, the receiving groove on the outer surface of the primary filter cartridge second end has at least one wall (either inner and outer) which is serpentine, and typically both walls are serpentine.

As a result of the serpentine shape to the ring projection on the access cover inner surface, and the serpentine shape to the receiving groove on the outer surface of the primary filter cartridge, the first ring projection in the access cover can be non-rotatably engaged in the receiving groove on the outer surface of the primary filter cartridge second end cap.

By "non-rotatably engaged" in this context, it is meant that the primary filter cartridge and access cover cannot be rotated dependently of one another, while engaged.

Further, as a result of the first ring projection of the access cover projecting into the receiving groove on the primary filter cartridge second end cap outer surface, the cartridge can be supported against cantilevered motion at the closed end cap, relative to the remainder of the housing. This anti-cantilevered motion support is facilitated also by engagement between the primary filter cartridge and the cartridge support.

Further, the remote (outer) end of the central support can be provided with the first ring projection which has an inwardly directed serpentine surface; and, the filter cartridge end cap can include a ring receiver with radially outwardly directed serpentine surface. These two serpentine surfaces can be engaged to provide for a non-rotable engagement between the primary filter cartridge and the cartridge support. This can be used to help position the cartridge when installed over the cartridge support in an appropriate orientation radially, for receiving the projection of the access cover, when the access cover is installed during completion of a service operation.

In examples depicted, the conical support includes a conical side wall section narrowing in diameter in extension toward the support end from a base region adjacent the housing end wall. The conical side wall section typically has a conical taper of at least 1°. The central support can include a porous the wall portion and an imperforate base portion; the base portion being adjacent the housing body end wall.

The media pack of the primary end filter cartridge can have a conical side wall section tapered downwardly in extension from the first end cap toward the second end cap. The conical side wall section of the primary filter cartridge media pack typically has a conical angle of at least 0.5°.

In those instances in which the conical support has a conical side wall section of a first conical angle, the media pack of the primary filter cartridge has a conical side wall section of a second conical angle, in some instances the first conical angle can be provided greater than the second conical angle. By this, it is meant that in those examples, the central support tapers downwardly at a sharper angle than does the media pack.

Also according to the present disclosure, componentry useable with air filter assemblies is provided. Included among the componentry is an air filter cartridge useable as a primary filter cartridge in an air cleaner assembly. The cartridge typically includes a media pack surrounding an open filter interior and having first and second ends. The first end cap is positioned in the media pack first end and includes a central aperture therein. A housing seal member is typically positioned on the first end cap and can be formed integrally with the first end cap. The seal member can include a seal support embedded therein, as described.

A second end cap is positioned on the media pack second end. The second end cap includes an inner surface and an outer surface. The second end cap can be provided as a perform, in some applications.

The outer surface of the second end cap includes a receiving groove therein. Typically the receiving groove is at least 6 mm deep. The receiving groove is formed between inner and outer radial walls, and is typically configured as a continuous ring. The outer wall receiving groove is typically spaced radially inwardly at least 20 mm from the media pack.

Inner surface of the second end cap includes a central receiver projecting outwardly away from the first end cap. The central receiver is surrounded by the receiving groove.

Typically the receiving groove in the outer surface of the second end cap is defined between walls spaced no more than 25 mm apart, and typically no more than 10 mm apart.

In examples shown, of the receiving groove in the outer surface of the second end cap is a serpentine receiving groove. It is formed by inner and outer walls at least one of which, and typically each of which, have a serpentine surface.

In an example shown, the inner surface of the second end cap includes an inward projection defining, at an opposite end of the end cap therefrom, the receiving groove. The inward projection in an example depicted has a serpentine outer side wall surface, directed radially outwardly.

The inner surface of the second end cap can define a ring receiver wherein the serpentine outer side wall surface of the inward projection defines a radially inner, outwardly facing, surface of the ring receiver. The ring receiver further includes a wall with a radially outer, inwardly facing, surface spaced from the radially inward, outwardly facing, surface on the ring receiver. The distance of spacing is typically at least 10 mm and typically not more than 40 mm.

In its example described, the media pack comprises a pleated media, and can include a conical shape tapering downwardly in extension from the first end cap to the second end cap. Further the media pack can include an inner liner. The media pack can also include an outer liner and/or be provided with an outside adhesive bead thereon, to maintain pleat integrity and spacing.

As characterized herein above, the principles described herein can be implemented by selected features assembled in a variety of specific configurations; and, there is no requirement that all of the features characterized be included in any given embodiment. Thus, a second aspect of the present disclosure an air cleaner assembly is provided which includes a housing including a housing body and an access cover. The housing body includes a side wall an end wall and an open end opposite the end wall. The end wall defines an air flow aperture therethrough and the housing body includes a housing body interior. The housing can include an air flow inlet arrangement therein, providing for air flow to an interior, during use.

A serviceable primary air filter cartridge is positioned within the housing body interior. The primary air filter cartridge comprises a media pack surrounding an open interior and extending between first and second end caps. The first end cap is an open end cap of the central aperture therethrough. A housing seal is positioned on the first end cap. The housing seal can comprise for example a radial seal formed integral with the remainder of the end cap, although alternatives are possible. In one example, the housing seal comprises a projection extending outwardly from (axially) from a remainder of the first end cap, the projection having an outwardly directed, stepped, radial seal portion thereon. The housing seal can include a seal support embedded therein, as described.

A second end cap of the primary filter cartridge is a closed end cap and has an outer surface with a receiving groove therein. The receiving groove is defined by radially inner and outer walls spaced no more than 25 mm apart, typically no more than 10 mm apart. Even in situations when the receiving groove is spaced greater than 10 mm apart, in some portion of its extension, preferably in the deepest at least 6 mm (and typically at least 10 mm) of the groove, the walls are spaced no more than 10 mm apart.

The typical receiving groove is spaced at least 20 mm radially inwardly from the media pack.

In the example embodiment described, the access cover is secured over the open end of the housing body, and includes an inside surface with a first ring projection. The access cover is positioned with the first ring projection projecting into the receiving groove in the second end of the primary filter cartridge. This can be used to provide for cantilevered support to the cartridge. The first ring projection can be a serpentine projection with serpentine inner and outer surfaces.

Typically at least one of the inward and outward walls of the receiving groove is a serpentine wall. In some instances both are. A serpentine wall can be used to engage serpentine projection on the access cover, to provide an anti-rotational engagement between the primary filter cartridge and the access cover.

In the example depicted, the second end cap outer surface includes a central outward projection surrounded by the receiving groove and the access cover inner surface includes a receiver into which the central projection on the primary filter cartridge projects.

The features described in connection with this embodiment can be implemented in an arrangement, as exemplified in the figures, in which the housing body includes a central cartridge support projecting into the open filter interior. The central cartridge support can include a support end, having features engaging the cartridge for one or both of cantilevered support end and anti-rotational port.

Also according to an alternate characterization of the principles described herein, an air filter cartridge is provided. The air filter cartridge can include a media pack surrounding an open filter interior and having first and second ends. The first end cap is positioned on the media pack first end. The first end cap includes a central aperture therein.

A housing seal member is positioned on the first end cap. The housing seal member can be formed integral with the remainder of the first end cap and can comprise, for example, an inwardly directed or an outwardly directed radial seal. The seal member can include a seal support embedded therein, as described.

A second end cap is positioned on the media pack second end. The second end cap includes an inner surface and an outer surface. The outer surface preferably includes a serpentine receiving groove. The outer surface also preferably includes an outwardly directed projection surrounded by the serpentine receiving groove.

The inner surface of the second end cap preferably includes a central receiver projecting away from the first end cap. The central receiver is surrounded, in this example, by the receiving groove.

In a specific example depicted, the receiving groove has an eight petal shape, i.e., eight fold symmetry.

In an example depicted, the media pack comprises pleated media. Also in an example shown, the media pack has a conical shape tapering downwardly in extension from the first end cap to the second end cap.

Again, there is no requirement that an arrangement would include all of the features characterized herein, to obtain some benefit according to the principles of the present disclosure. However, the features described provide, in combination, for an advantageous, relatively easy to assemble, air cleaner assembly.

What is claimed is:

1. An air filter cartridge comprising:
   (a) a media pack surrounding an open filter interior and having first and second ends;
   (b) a first end cap positioned on the media pack first end;
      (i) the first end cap having a central aperture therethrough;
   (c) a housing seal member positioned on the first end cap;
      (i) the housing seal member comprising a radially directed seal; and,
   (d) a second end cap on the media pack second end; the second end cap including an inner surface and an outer surface;
      (i) the outer surface defining a receiving groove having inner and outer side walls extending toward the first end; the outer sidewall of the receiving groove having a serpentine shape of radially facing, alternating, convex and concave portions; and, the inner sidewall having a serpentine shape of radially facing alternating convex and concave portions.

2. An air filter cartridge according to claim 1 wherein:
   (a) the receiving groove has a smallest internal dimension thereacross of no more than 25 mm.

3. An air filter cartridge according to claim 1 wherein:
   (a) the receiving groove has a smallest internal dimension thereacross of no more than 10 mm.

4. An air filter cartridge according to claim 1 wherein:
   (a) the housing seal member is a radially inwardly directed seal.

5. An air filter cartridge according to claim 1 wherein:
   (a) the outer sidewall of the receiving groove is spaced at least 20 mm from the media.

6. An air filter cartridge according to claim 4 wherein:
   (a) the outer sidewall of the receiving groove is spaced at least 30 mm from the media.

7. An air filter cartridge according to claim 1 wherein:
   (a) the inner surface of the second end cap includes a central receiving projection projecting away from the first end cap;
      (i) the central receiving projection being surrounded by the receiving groove.

8. An air filter cartridge according to claim 7 wherein:
   (a) the central projection extends further in a direction away from the first end piece, than the outer wall of the receiving groove.

9. An air filter cartridge according to claim 8 wherein:
   (a) the central projection terminates at a tip that does not extend to a location further than the media pack second end, in a direction away from the first end piece.

10. An air filter cartridge according to claim 1 wherein:
    (a) the media is pleated.

11. An air filter cartridge according to claim 1 wherein:
    (a) the media pack comprises pleated media; and,
    (b) the media pack is a conical media pack.

12. An air filter cartridge comprising:
    (a) a media pack surrounding an open filter interior and having first and second ends;
    (b) a first end cap positioned on the media pack first end;
       (i) the first end cap having a central aperture therethrough;
    (c) a housing seal member positioned on the first end cap;
       (i) the housing seal member comprising a radially directed seal; and,
    (d) a second end cap on the media pack second end; the second end cap including an inner surface and an outer surface;
       (i) the outer surface including a receiving groove having inner and outer side walls extending toward the first end of the media pack; the outer sidewall being spaced at least 20 mm from the media, at an end of the receiving groove furthest toward the first end cap;
(ii) the outer surface of the second end cap including an outwardly directed projection surrounded by the receiving groove; and,
(iii) the inner surface of the second end cap including a central receiving projection projecting away from the first end cap;
  (A) the central receiving projection being surrounded by the receiving groove; and,
  (B) the central projection extending further away from the first end piece than the outer wall of the receiving groove.

13. An air filter cartridge according to claim 12 wherein:
(a) the outer sidewall of the receiving groove is spaced at least 30 mm from the media.

14. An air filter cartridge according to claim 12 wherein:
(a) the housing seal member is a radially inwardly directed seal.

15. An air filter cartridge according to claim 12 wherein:
(a) the central projection terminates at a tip that does not extend to a location further than the media pack second end, in a direction away from the first end piece.

16. An air filter cartridge according to claim 12 wherein:
(a) the receiving groove has a smallest internal dimension thereacross of no more than 25 mm.

17. An air filter cartridge according to claim 16 wherein:
(a) the receiving groove has a smallest internal dimension thereacross of no more than 10 mm.

18. An air filter cartridge according to claim 12 wherein:
(a) the receiving groove has a serpentine sidewall.

19. An air filter cartridge according to claim 12 wherein:
(a) the media is pleated.

20. An air filter cartridge according to claim 12 wherein:
(a) the media pack comprises pleated media; and,
(b) the media pack is a conical media pack.

* * * * *